(12) United States Patent
Lee et al.

(10) Patent No.: US 9,963,637 B2
(45) Date of Patent: May 8, 2018

(54) LIQUID CRYSTAL MEDIUM

(71) Applicant: Merck Patent GmbH, Darmstadt (DE)

(72) Inventors: Eun-Kyu Lee, Gyeonggi-Do (KR);
Hyun-Jin Yoon, Gyeonggi-Do (KR);
Ji-Won Jeong, Gyeonggi-Do (KR);
Hye-Ryung Park, Gyeonggi-Do (KR);
Seung-Jai Kim, Gyeonggi-Do (KR);
Yong-Jun Ji, Gyeonggi-Do (KR);
Min-Ok Jin, Gyeonggi-Do (KR);
Yong-Kuk Yun, Gyeonggi-Do (KR)

(73) Assignee: Merck Patent GmbH, Darmstadt (DE)

( * ) Notice: Subject to any disclaimer, the term of this patent is extended or adjusted under 35 U.S.C. 154(b) by 0 days. days.

(21) Appl. No.: 15/200,201

(22) Filed: Jul. 1, 2016

(65) Prior Publication Data
US 2017/0002267 A1 Jan. 5, 2017

(30) Foreign Application Priority Data
Jul. 2, 2015 (EP) .................................. 15001984

(51) Int. Cl.
*G02F 1/1333* (2006.01)
*C09K 19/54* (2006.01)
*C09K 19/30* (2006.01)
*C09K 19/04* (2006.01)
*C09K 19/12* (2006.01)
*C09K 19/34* (2006.01)
*G02F 1/1337* (2006.01)

(52) U.S. Cl.
CPC ........ *C09K 19/542* (2013.01); *C09K 19/3098* (2013.01); *C09K 19/3405* (2013.01); *G02F 1/133365* (2013.01); *C09K 2019/0448* (2013.01); *C09K 2019/122* (2013.01); *C09K 2019/301* (2013.01); *C09K 2019/3004* (2013.01); *C09K 2019/3009* (2013.01); *C09K 2019/3016* (2013.01); *C09K 2019/3408* (2013.01); *C09K 2019/548* (2013.01); *G02F 1/1337* (2013.01); *G02F 2202/022* (2013.01)

(58) Field of Classification Search
CPC .............. C09K 19/542; C09K 19/3098; C09K 19/3405; C09K 2019/0448; C09K 2019/122; C09K 2019/3004; C09K 2019/3009; C09K 2019/301; C09K 2019/3016; C09K 2019/3408; C09K 2019/548; G02F 2202/022
USPC .............. 252/299.01, 299.6, 299.63; 428/1.1
See application file for complete search history.

(56) References Cited

U.S. PATENT DOCUMENTS

2013/0207038 A1  8/2013  Haensel et al.
2014/0028964 A1  1/2014  Klasen-Memmer et al.

FOREIGN PATENT DOCUMENTS

DE    102012004871 A1   10/2012
EP       2628779 A2      8/2013
WO    2015/139827 A1     9/2015

OTHER PUBLICATIONS

European Search Report dated Nov. 24, 2016 issued in corresponding EP16001256.3, 8 pages.
English translation Abstract of WO2015/139827A1 dated Sep. 24, 2015 (2 pages).

*Primary Examiner* — Geraldina Visconti
(74) *Attorney, Agent, or Firm* — Millen, White, Zelano and Branigan, P.C.

(57) ABSTRACT

The present invention relates to a liquid crystalline medium comprising a polymerizable compound, to a process for its preparation, to its use for optical, electro-optical and electronic purposes, in particular in liquid crystalline displays, especially in a liquid crystalline display of the polymer sustained alignment (PSA) type, and to a liquid crystalline display, especially a PSA display, comprising it.

20 Claims, No Drawings

LIQUID CRYSTAL MEDIUM

The present invention relates to a liquid crystal (LC) medium comprising a polymerizable compound, to a process for its preparation, to its use for optical, electro-optical and electronic purposes, in particular in LC displays, especially in an LC display of the polymer sustened alignment (PSA) type, and to an LC display, especially a PSA display, comprising it.

A liquid crystal display mode which has meanwhile found widespread interest and commercial use is the so-called PS ("polymer sustened") or PSA ("polymer sustained alignment") mode, for which the term "polymer stabilized" is also occasionally used. In PSA displays an LC medium is used that contains an LC mixture (hereinafter also referred to as "host mixture") and a small amount, typically <1% by weight, for example 0.2 to 0.4% by weight, of one or more polymerizable compounds, preferably polymerizable monomeric compounds. After filling the LC medium into the display, the polymerizable compounds are polymerized or crosslinked in situ, usually by UV photopolymerization, optionally while a voltage is applied to the electrodes of the display. The polymerization is carried out at a temperature where the LC medium exhibits a liquid crystal phase, usually at room temperature. The addition of polymerizable mesogenic or liquid-crystalline compounds, also known as reactive mesogens or "RMs", to the LC host mixture has proven particularly suitable.

The PS(A) mode is meanwhile used in various conventional LC display types. Thus, for example, PS-VA ("vertically aligned"), PS-OCB ("optically compensated bend"), PS-IPS ("in-plane switching"), PS-FFS ("fringe-field switching"), PS-UB-FFS ("Ultra Brightness FFS) and PS-TN ("twisted nematic") displays are known. The polymerization of the RMs preferably takes place with an applied voltage in the case of PS-VA and PS-OCB displays, and with or without, preferably without, an applied voltage in the case of PS-IPS displays. As a result a pretilt angle of the LC molecules is generated in the display cell. In case of PS-OCB displays, for example, it is possible for the bend structure to be stabilized so that an offset voltage is unnecessary or can be reduced. In case of PS-VA displays, the pretilt has a positive effect on the response times. For PS-VA displays, a standard MVA ("multidomain VA") or PVA ("patterned VA") pixel and electrode layout can be used. It is also possible to use only one structured electrode without protrusions, which significantly simplifies production and improves contrast and transparency.

Furthermore, the so-called posi-VA mode ("positive VA") has proven to be particularly suitable. Like in conventional VA and PS-VA displays, the initial orientation of the LC molecules in posi-VA displays is homeotropic, i.e. substantially perpendicular to the substrates, in the initial state when no voltage is applied. However, in contrast to conventional VA and PS-VA displays, in posi-VA displays LC media with positive dielectric anisotropy are used. Like in IPS and PS-IPS displays, the two electrodes in posi-VA displays are arranged only on one of the two substrates, and preferably exhibit intermeshed, comb-shaped (interdigital) structures. Upon application of a voltage to the interdigital electrodes, which create an electrical field that is substantially parallel to the layer of the LC medium, the LC molecules are switched to an orientation substantially parallel to the substrates. In posi-VA displays, a polymer stabilization by addition of RMs to the LC medium, which are then polymerized in the display, has also proven to be advantageous. Thereby a significant reduction of the switching times can be achieved.

PS-VA displays are described for example in EP1170626 A2, U.S. Pat. No. 6,861,107, U.S. Pat. No. 7,169,449, US2004/0191428A1, US2006/0066793A1 and US2006/0103804A1. PS-OCB displays are described for example in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described for example in U.S. Pat. No. 6,177,972 and Appl. Phys. Lett. 1999, 75(21), 3264. PS-TN displays are described for example in Optics Express 2004, 12(7), 1221.

PSA displays can be operated as either active-matrix or passive-matrix displays. In case of active-matrix displays individual pixels are usually addressed by integrated, non-linear active elements like for example transistors (such as thin-film transistors or "TFTs"), whereas in passive-matrix displays individual pixels are usually addressed by the multiplex method as known from prior art.

A PSA display may also comprise an alignment layer on one or both of the substrates forming the display cell. The alignment layer is usually applied on the electrodes (in case such electrodes are present) such that it is in contact with the LC medium and induces initial alignment of the LC molecules. The alignment layer may comprise or consist of, for example, a polyimide, which may also be rubbed or prepared by a photoalignment method.

In particular for monitor and especially TV applications optimisation of the response times, but also of the contrast and luminance (and thus transmission) of the LC display is still desired. The PSA method can provide significant advantages here. Especially in case of PS-VA, PS-IPS, PS-FFS and PS-posi-VA displays, a shortening of the response times, which correlate with a measurable pretilt in test cells, can be achieved without significant adverse effects on other parameters.

Prior art has suggested biphenyl diacrylates or dimethacrylates, which are optionally fluorinated, as RMs for use in PSA displays However, the problem arises that not all combinations of LC host mixture and RM(s) are suitable for use in PSA displays because, for example, only inadequate tilt angles or no tilt angles at all could be generated or because, for example, the voltage holding ratio (VHR) is inadequate for TFT display applications. In addition, it has been found that the LC mixtures and RMs known from prior art still have some disadvantages when used in PSA displays. Thus, not every known RM which is soluble in the LC host mixture is suitable for use in PSA displays. In addition, it is often difficult to find a suitable selection criterion for the RM besides direct measurement of the pretilt in the PSA display. The choice of suitable RMs becomes even smaller if UV photopolymerization without the addition of photoinitiators is desired, which is advantageous for certain applications.

In addition, the selected combination of LC host mixture/RM should have a low rotational viscosity and good electrical properties, in particular a high VHR. In PSA displays, a high VHR after irradiation with UV light is particularly important, because UV exposure does not only occur as normal exposure during operation of the finished display, but is also a necessary part of the display production process.

In particular, it is desirable to have available improved materials for PSA displays which produce a particularly small pretilt angle. Preferred materials are those which, compared to prior art materials, can generate a lower pretilt angle after the same exposure time, and/or can generate at least the same pretilt angle after a shorter exposure time. This would allow to reduce the display production time ("tact time") and production costs.

A further problem in the production of PSA displays is the presence and removal of residual amounts of unpolymerized RMs after the polymerization step that is necessary for generation of the pretilt angle in the display. Unreacted RMs may adversely affect the properties of the display, for example by polymerizing in an uncontrolled manner during display operation.

Thus, the PSA displays known from prior art often exhibit the undesired effect of so-called "image sticking" or "image burn", i.e. the image produced in the LC display by temporary addressing of individual pixels still remains visible even after the electric field in these pixels has been switched off, or after other pixels have been addressed.

Image sticking can occur for example if LC host mixtures having a low VHR are used. The UV component of daylight or the display backlight can cause undesired decomposition reactions of the LC molecules and initiate the production of ionic or free-radical impurities. These can accumulate in particular at the electrodes or the alignment layers, where they reduce the effective applied voltage. This effect can also be observed in conventional LC displays without a polymer component.

An additional image sticking effect caused by the presence of unpolymerized RMs is often observed in PSA displays. Uncontrolled polymerization of the residual RMs is initiated by UV light from the environment or the backlight. In the switched display areas, this changes the tilt angle after a number of addressing cycles. As a result, a change in transmission in the switched areas may occur, while it remains unchanged in the unswitched areas.

During production of the PSA display it is therefore desirable that polymerization of the RMs proceeds as completely as possible and the presence of unpolymerized RMs in the display can be excluded or reduced to a minimum. Thus, RMs and LC host mixtures are required which enable or support quick and complete polymerization of the RMs. In addition, a controlled reaction of the residual RM amounts is desirable. This could be achieved by providing improved RMs that polymerize quicker and more effectively than the RMs of prior art.

A further problem that has been observed in the operation of PSA displays is the stability of the pretilt angle. Thus, it was observed that the pretilt angle, which is generated during display manufacture by polymerizing the RMs, does not remain constant but can deteriorate after the display was subjected to voltage stress during display operation. This can negatively affect the display performance, e.g. by increasing the black state transmission and hence lowering the contrast.

Another problem to be solved is that the RMs of prior art do often have high melting points, and do only show limited solubility in many commonly used LC mixtures. As a result the RMs tend to spontaneously crystallise out of the LC mixture. In addition, the risk of spontaneous polymerization prevents that the LC host mixture can be warmed in order to better dissolve the RMs, so that a high solubility even at room temperature is required. In addition, there is a risk of phase separation, for example when filling the LC medium into the LC display (chromatography effect), which may greatly impair the homogeneity of the display. This is further aggravated by the fact that the LC media are usually filled in the display at low temperatures in order to reduce the risk of spontaneous polymerization (see above), which in turn has an adverse effect on the solubility.

Another problem observed in prior art is that the use of conventional LC media in LC displays, including but not limited to displays of the PSA type, often leads to the occurrence of mura in the display, especially when the LC medium is filled in the display by using the one drop filling (ODF) method. This phenomenon is also known as "ODF mura". It is therefore desirable to provide LC media which lead to reduced ODF mura.

Another problem observed in prior art is that LC media for use in PSA displays, including but not limited to displays of the PSA type, do often exhibit high viscosities and, as a consequence, high switching times. In order to reduce the viscosity and response time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage, because the photopolymerization of the RMs in the PSA display is usually carried out by exposure to UV radiation, which may cause a VHR drop in the LC medium.

In prior art LC media for use in PSA displays have been proposed wherein the LC host mixture contains one or more terphenyl compounds in order to enhance polymerization of the RMs. However, the addition of terphenyl compounds increases the viscosity of the LC host mixture, thus leading to slower response times. Besides the addition of terphenyl compounds can lead to reduced reliability and a drop of the VHR after UV stress in the LC medium.

It is therefore another problem to provide LC mixtures and LC media for PSA displays which show a reduced viscosity and a high VHR, while at the same time enabling quick and complete polymerization of the RMs.

Another problem that was recently observed is that the VHR of the LC medium can decrease when the LC medium comes into contact with the black matrix (or black mask), which is used in the display to protect specific areas, for example the areas between the pixels, against light leakage from the backlight and/or to shield the TFT channel area from ambient light.

There is thus still a great demand for PSA displays and LC media and polymerizable compounds for use in such displays, which do not show the drawbacks as described above, or only do so to a small extent, and have improved properties.

In particular, there is a great demand for PSA displays, and LC mixtures and RMs for use in such PSA displays, which enable a high specific resistance at the same time as a large working-temperature range, short response times, even at low temperatures, a low threshold voltage, a low pretilt angle, a multiplicity of grey shades, high contrast and a broad viewing angle, high reliability and high values of the VHR after UV exposure, especially when the LC medium is in contact with the black matrix material, and, in case of the RMs, have low melting points and a high solubility in the LC host mixture. In PSA displays for mobile applications, it is especially desired to have available LC media that show low threshold voltage and high birefringence.

The invention is based on the object of providing novel suitable materials, in particular RMs, LC host mixtures, and LC media comprising the same, for use in PSA displays, which do not have the disadvantages indicated above or do so to a reduced extent.

In particular, the invention is based on the object of providing LC media for use in PSA displays, which enable very high specific resistance values, high VHR values, high reliability, low threshold voltages, short response times, high birefringence, show good UV absorption especially at longer wavelengths, allow quick and complete polymerization of the RMs contained therein, allow the generation of a low pretilt angle as quickly as possible, enable a high stability of the pretilt even after longer time and/or after UV exposure, reduce or prevent the occurrence of image sticking in the display, and reduce or prevent the occurrence of ODF mura in the display.

Another object of the invention is to solve the problem of providing LC mixtures and LC media for PSA displays which show a reduced viscosity and a high VHR while enabling quick and complete polymerization of the RMs.

The above objects have been achieved in accordance with the present invention by materials and processes as described and claimed in the present application.

It has surprisingly been found that at least some of the above-mentioned problems can be solved by using an LC medium comprising a polymerizable component and an LC host mixture containing only a small amount of compounds of formula A, as disclosed and claimed hereinafter.

Thus it was found that, when using an LC medium as disclosed and claimed hereinafter in PSA displays, it is possible to lower the viscosity of the LC host mixture while still maintaining high VHR, especially when the LC medium is in contact with the black matrix material, high UV absorption which is needed for quick and complete polymerization, and a strong tilt angle generation.

The use of LC media according to the present invention facilitates a quick and complete UV-photopolymerization reaction in particular at low UV energy and/or longer UV wavelengths in the range from 300-380 nm and especially above 340 nm, which are considerable advantages for the display manufacturing process. Besides, the use of LC media according to the present invention allows a fast generation of large and stable pretilt angles, reduces image sticking and ODF mura in the display, leads to a high VHR value after UV photopolymerization, and enables to achieve fast response times, a low threshold voltage and a high birefringence.

The invention relates to a liquid crystal (LC) medium comprising
  a polymerizable component A) comprising, preferably consisting of, one or more polymerizable compounds, and
  a liquid-crystalline component B), hereinafter also referred to as "LC host mixture", comprising, preferably consisting of, one or more mesogenic or liquid-crystalline compounds,
characterized in that component B) comprises from 0.01 to 3%, preferably from 0.05 to 2%, of one or more compounds of formula A.

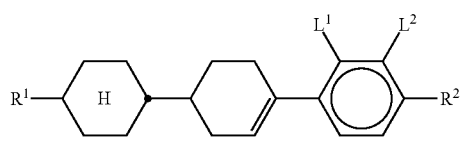

in which the individual radicals, on each occurrence identically or differently, and each, independently of one another, have the following meaning:
$R^1$, $R^2$ alkyl, alkoxy, oxaalkyl or alkoxyalkyl having 1 to 9 C atoms or alkenyl or alkenyloxy having 2 to 9 C atoms, all of which are optionally fluorinated,
$L^1$, $L^2$ F or Cl, preferably F.

The invention furthermore relates to an LC medium comprising
  a polymerizable component A) comprising, preferably consisting of, one or more polymerizable compounds, and
  a liquid-crystalline component B), hereinafter also referred to as "LC host mixture", comprising, preferably consisting of, one or more mesogenic or liquid-crystalline compounds, which comprises from 0.01 to 2%, preferably from 0.05 to 1%, of one or more compounds of formula A.

The liquid-crystalline component B) of an LC medium according to the present invention is hereinafter also referred to as "LC host mixture", and preferably contains only LC compounds that are selected from low-molecular-weight compounds which are unpolymerizable, like those of formula A, and optionally contains additives like polymerization initiators, inhibitors etc.

The invention furthermore relates to an LC medium or LC display as described above and below, wherein the polymerizable compounds of component A) are polymerized.

The invention furthermore relates to a process for preparing an LC medium as described above and below, comprising the steps of mixing one or more compounds of formula A, or an LC host mixture or LC component B) as described above and below, with one or more poylmerisable compounds, and optionally with further LC compounds and/or additives.

The invention further relates to the use of LC medium in LC displays, especially in PSA displays.

The invention furthermore relates to the use of LC medium according to the invention in PSA displays, in particular the use in PSA displays containing an LC medium, for the production of a tilt angle in the LC medium by in-situ polymerization of the polymerizable compound(s) of component B) in the PSA display, preferably in an electric or magnetic field.

The invention furthermore relates to an LC display comprising one or more compounds of formula I or an LC medium according to the invention, in particular a PSA display, particularly preferably a PS-VA, PS-IPS, PS-FFS, or PS-UB-FFS display.

The invention furthermore relates to an LC display comprising a polymer obtainable by polymerization of a polymerizable component A) as described above, or comprising an LC medium according to the invention, which is preferably a PSA display, very preferably a PS-VA, PS-IPS, PS-FFS or PS-UB-FFS display.

The invention furthermore relates to an LC display of the PSA type comprising two substrates, at least one which is transparent to light, an electrode provided on each substrate or two electrodes provided on only one of the substrates, and located between the substrates a layer of an LC medium that comprises one or more polymerizable compounds and an LC component as described above and below, wherein the polymerizable compounds are polymerized between the substrates of the display.

The invention furthermore relates to a process for manufacturing an LC display as described above and below, comprising the steps of filling or otherwise providing an LC medium, which comprises one or more polymerizable compounds as described above and below, between the substrates of the display, and polymerizing the polymerizable compounds.

The PSA displays according to the invention have two electrodes, preferably in the form of transparent layers, which are applied to one or both of the substrates. In some displays, for example in PS-VA displays, one electrode is applied to each of the two substrates. In other displays, for example in PS-IPS, PS-FFS or PS-UB-FFS displays, both electrodes are applied to only one of the two substrates.

In a preferred embodiment the polymerizable component is polymerized in the LC display while a voltage is applied to the electrodes of the display.

The polymerizable compounds of the polymerizable component are preferably polymerized by photo-polymerization, very preferably by UV photo-polymerization.

Unless stated otherwise, the polymerizable compounds are preferably selected from achiral compounds.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368, which is incorporated herein for its definition of spacer groups. As used herein, the terms "spacer group" or "spacer" mean a flexible group, for example an alkylene group, which connects the mesogenic group and the polymerizable group(s) in a polymerizable mesogenic compound.

Above and below,

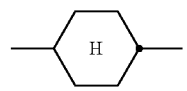

denotes a trans-1,4-cyclohexylene ring, and

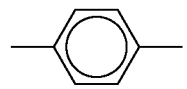

denotes a 1,4-phenylene ring.

Above and below "oxaalkyl" means alkyl wherein an arbitrary $CH_2$ group is replaced by an O atom. A preferred oxaalkyl group is alkoxy.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "L", are F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein R$^x$ denotes H, F, Cl, CN, or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P- or P-Sp-, and Y$^1$ denotes halogen.

"Substituted silyl or aryl" preferably means substituted by halogen, —CN, R$^0$, —OR$^0$, —CO—R$^0$, —CO—O—R$^0$, —O—CO—R$^0$ or —O—CO—O—R$^0$, wherein R$^0$ denotes H or alkyl with 1 to 20 C atoms.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

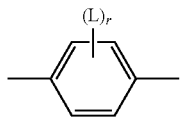

is preferably

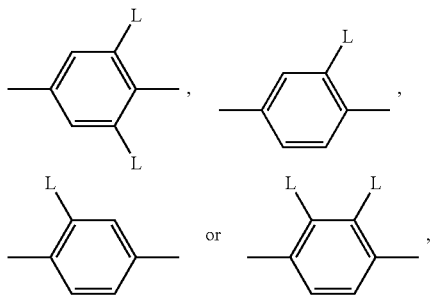

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from the group consisting of CH$_2$=CW$^1$—CO—O—, CH$_2$=CW$^1$—CO—,

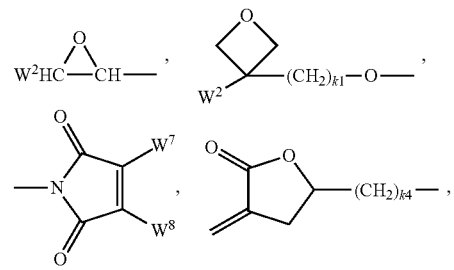

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Very preferred groups P are selected from the group consisting of CH$_2$=CW$^1$—CO—O—, CH$_2$=CW$_1$—CO—,

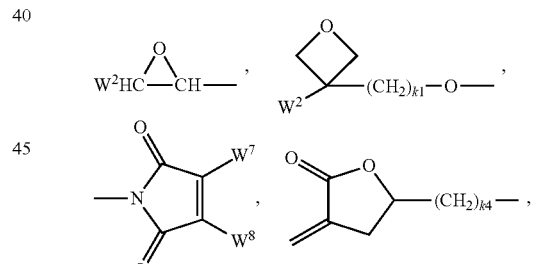

CH$_2$=CW$^2$—O—, CH$_2$=CW$^2$—, CW$^1$=CH—CO—(O)$_{k3}$—, CW$^1$=CH—CO—NH—, CH$_2$=CW$^1$—CO—NH—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, k$_1$, k$_2$ and k$_3$ each, independently of one another, denote 0 or 1, $k_3$ preferably denotes 1, and $k_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

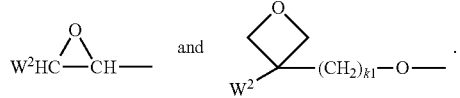

Further preferred polymerizable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, $-N(R^0)-$, $-Si(R^0R^{00})-$, —CO—, —CO—O—, —O—CO—, —O—CO—O—, —S—CO—, —CO—S—, $-N(R^{00})-CO-O-$, $-O-CO-N(R^0)-$, $-N(R^0)-CO-N(R^{00})-$, —CH=CH— or —C≡C— in such a way that O and/or S atoms are not linked directly to one another, X" denotes —O—, —S—, —CO—, —CO—O—, —O—CO—, —O—CO—O—, $-CO-N(R^0)-$, $-N(R^0)-CO-$, $-N(R^0)-CO-N(R^{00})-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, —CH=N—, —N=CH—, —N=N—, $-CH=CR^0-$, $-CY^2=CY^3-$, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, $-CO-NR^0-$, $-NR^0-CO-$, $-NR^0-CO-NR^{00}-$ or a single bond.

Typical spacer groups Sp and -Sp"-X"— are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^0R^{00}-O)_{p1}-$, in which p1 is an integer from 1 to 12, q1 is an integer from 1 to 3, and $R^0$ and $R^{00}$ have the meanings indicated above.

Particularly preferred groups Sp and -Sp"-X"— are $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

Preferred compounds of formula A are selected of formula A1:

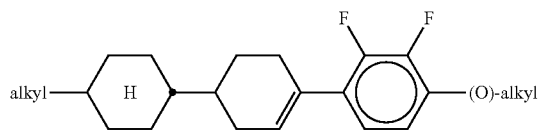

wherein "alkyl" denotes a straight-chain alkyl radical having 1-6 C atoms, and (O) denotes an oxygen atom or a single bond. Very preferred are compounds of formula A1 wherein (O) denotes an oxygen atom and "alkyl" is, on each occurrence identically or differently, methyl, ethyl, propyl, butyl, pentyl or hexyl, which are preferably straight-chained.

The proportion of compounds of formula A or A1 in component B) is preferably from 0.05 to 2%, very preferably from 0.1 to 1.5%, most preferably from 0.5 to 1%.

Preferably the LC medium contains 1 to 5, very preferably 1, 2 or 3, most preferably 1, compounds of formula A or A1.

In the LC medium according to the present invention, the use of an LC host mixture comprising compounds of formula A together with the use of a polymerizable component comprising preferably direactive and/or trireactive RMs, leads to advantageous properties in PSA displays. In particular, one or more of the following advantages could be achieved:

good UV absorption also at longer wavelengths,
quick and complete polymerization of the RMs,
quick generation of a low pretilt angle, especially already at low UV energy and/or at longer UV wavelengths,
high pretilt angle stability after UV exposure,
reduced image sticking,
reduced ODF mura,
high reliability and high VHR value after UV exposure and/or heat treatment,
high reliability and high VHR value after contact with the black matrix,
high birefringence,
reduced viscosity
faster response times.

Since the LC medium according to the present invention shows high absorption at longer UV wavelengths, it is possible to use longer UV wavelengths for polymerization, which is advantageous for the display manufacturing process.

The polymerizable compounds are preferably selected from formula I $$R^a\text{-}B^1\text{-}(Z^b\text{-}B^2)_m\text{-}R^b \qquad \text{I}$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by $-C(R^0)=C(R^{00})-$, —C≡C—, $-N(R^{00})-$, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if B¹ and/or B² contain a saturated C atom, R^a and/or R^b may also denote a radical which is spiro-linked to this saturated C atom,
wherein at least one of the radicals R^a and R^b denotes or contains a group P or P-Sp-,
P a polymerizable group,
Sp a spacer group or a single bond,
B¹ and B² an aromatic, heteroaromatic, alicyclic or heterocyclic group, preferably having 4 to 25 ring atoms, which may also contain fused rings, and which is unsubstituted, or mono- or polysubstituted by L,
$Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR⁰R⁰⁰ or a single bond,
R⁰ and R⁰⁰ each, independently of one another, denote H or alkyl having 1 to 12 C atoms,
m denotes 0, 1, 2, 3 or 4,
n1 denotes 1, 2, 3 or 4,
L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y¹, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-,
P and Sp have the meanings indicated above,
Y¹ denotes halogen,
R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I are those in which B¹ and B² each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula I are those in which B¹ and B² each, independently of one another, denote 1,4-phenylene, 1,3-phenylene, naphthalene-1,4-diyl or naphthalene-2,6-diyl, Very preferred compounds of formula I are selected from the following formulae:

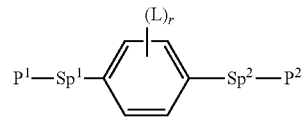

M1

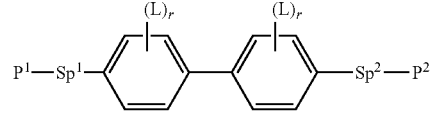

M2

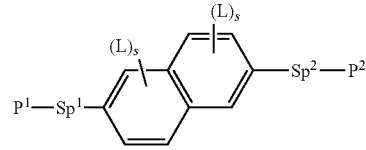

M3

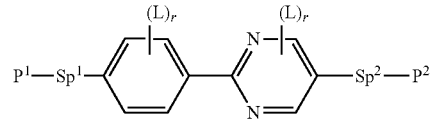

M4

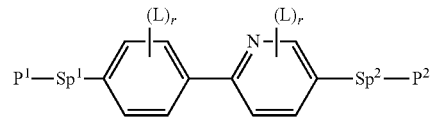

M5

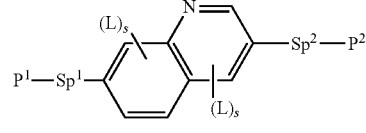

M6

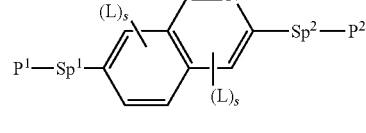

M7

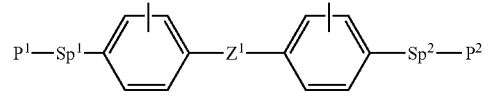

M8

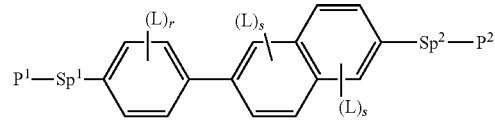

M9

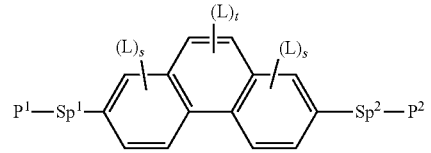

M10

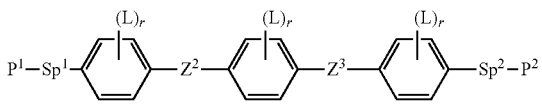

M11

M12 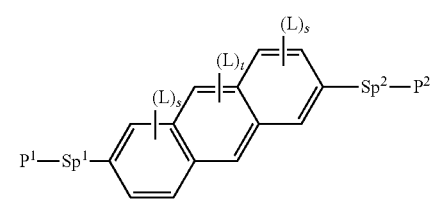
M13 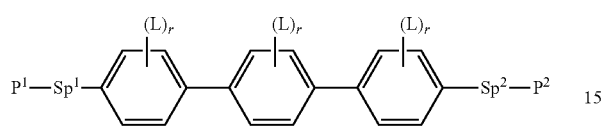
M14 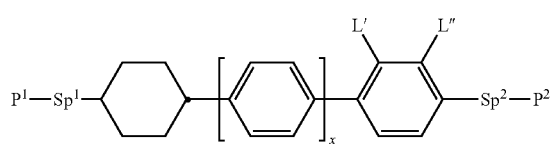
M15 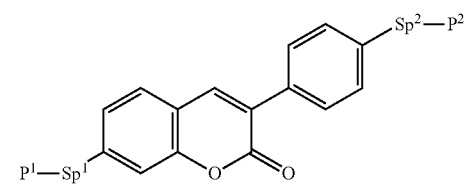
M16 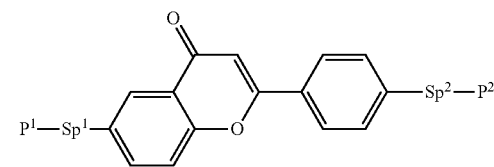
M17 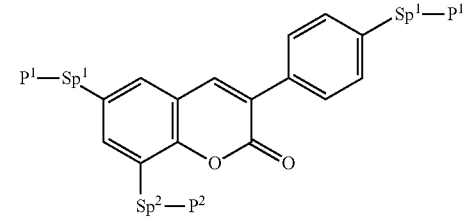
M18 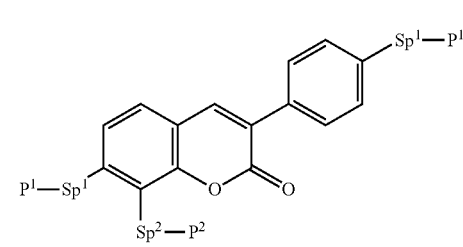
M19 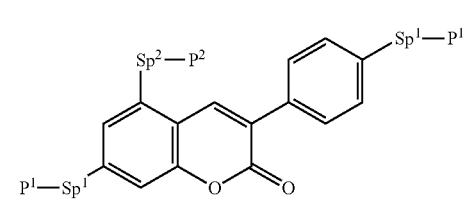
M20 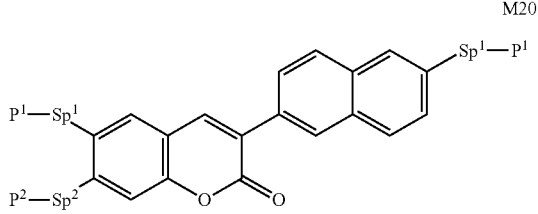
M21 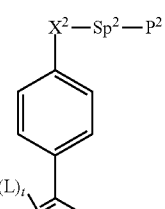
M22 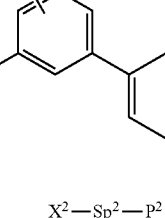
M23 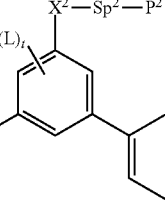
M24 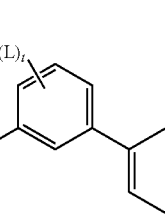
M25 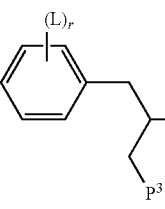
M26 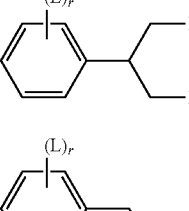

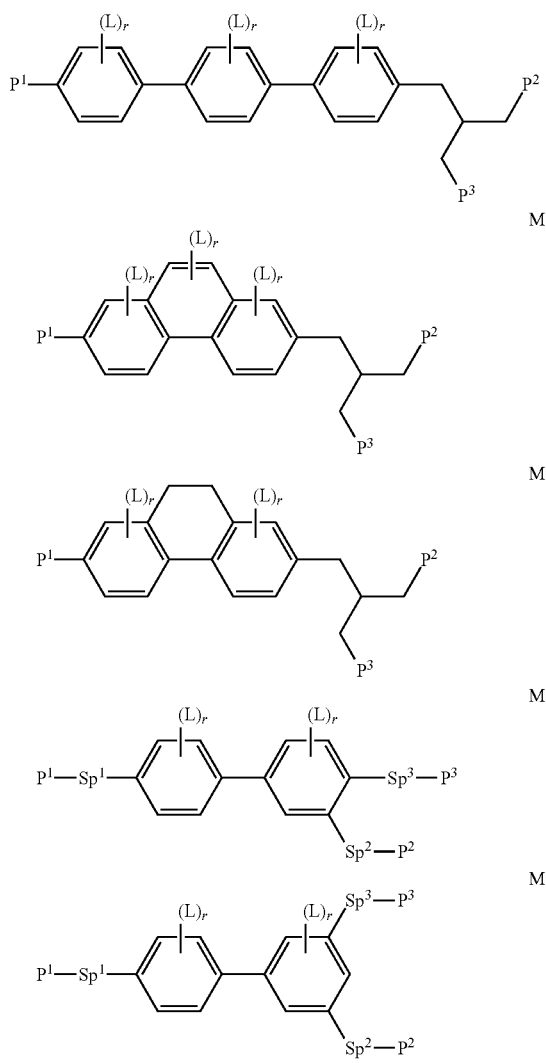

M27

M28

M29

M30

M31 in which the individual radicals have the following meanings:

$P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings indicated above and below for Sp, and particularly preferably denote —$(CH_2)_{p1}$—, —$(CH_2)_{p1}$—O—, —$(CH_2)_{p1}$—CO—O—, —$(CH_2)_{p1}$—O—CO— or —$(CH_2)_{p1}$—O—CO—O—, in which p1 is an integer from 1 to 12, where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

Especially preferred are compounds of formulae M2, M13, M17, M22, M23, M24 and M30.

Further preferred are trireactive compounds M15 to M31, in particular M17, M18, M19, M22, M23, M24, M25, M26, M30 and M31.

In the compounds of formulae M1 to M31 the group

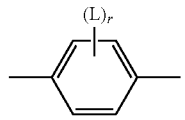

is preferably

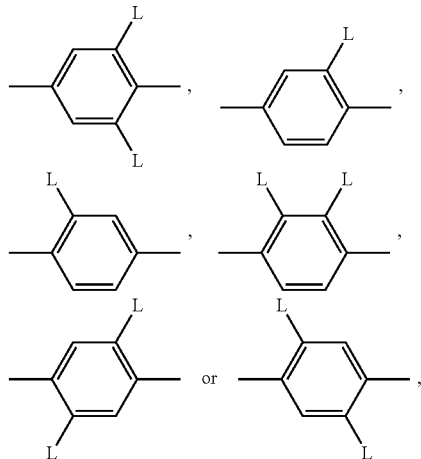

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, more preferably F, Cl, CH$_3$, OCH$_3$, COCH$_3$ oder OCF$_3$, especially F or CH$_3$.

Preferred compounds of formulae M1 to M31 are those wherein P$^1$, P$^2$ and P$^3$ denote an acrylate, methacrylate, oxetane or epoxy group, very preferably an acrylate or methacrylate group.

Further preferred compounds of formulae M1 to M31 are those wherein Sp$^1$, Sp$^2$ and Sp$^3$ are a single bond.

Further preferred compounds of formulae M1 to M31 are those wherein one of Sp$^1$, Sp$^2$ and Sp$^3$ is a single bond and another one of Sp$^1$, Sp$^2$ and Sp$^3$ is different from a single bond.

Further preferred compounds of formulae M1 to M31 are those wherein those groups Sp$^1$, Sp$^2$ and Sp$^3$ that are different from a single bond denote —(CH$_2$)$_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Particular preference is given to LC media comprising one, two or three polymerizable compounds of formula I.

Preferably the proportion of compounds of formula I in the LC medium is from 0.01 to 5%, very preferably from 0.05 to 1%, most preferably from 0.1 to 0.5%.

It was observed that, the combination of polymerizable compounds of formulae M1 to M31 with the compounds of formula A leads to advantageous behaviour of the LC medium, where a quick and complete polymerization, the quick generation of a low pretilt angle which is stable after UV exposure, at the same time a high reliability and high VHR value after UV exposure and after contact with the black matrix can be achieved together with a high birefringence. Besides, the LC medium shows high absorption at longer UV wavelengths, so that it is possible to use such longer UV wavelengths for polymerization, which is advantageous for the display manufacturing process.

For the production of PSA displays, the polymerizable compounds contained in the LC medium are polymerized or crosslinked (if one compound contains two or more polymerizable groups) by in-situ polymerization in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the color filter side is unstructured and only the electrode on the TFT side has slots. Particularly suitable and preferred electrode structures for PS-VA displays are described, for example, in US 2006/0066793 A1.

A preferred PSA type LC display of the present invention comprises:
 a first substrate including a pixel electrode defining pixel areas, the pixel electrode being connected to a switching element disposed in each pixel area and optionally including a micro-slit pattern, and optionally a first alignment layer disposed on the pixel electrode,
 a second substrate including a common electrode layer, which may be disposed on the entire portion of the second substrate facing the first substrate, and optionally a second alignment layer,
 an LC layer disposed between the first and second substrates and including an LC medium comprising a polymerizable component A and a liquid crystal component B as described above and below, wherein the polymerizable component A may also be polymerized.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The PSA display may comprise further elements, like a color filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerization the polymerizable compounds form a crosslinked polymer, which causes a certain pretilt of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to produce a pretilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

Optionally one or more polymerization initiators are added to the LC medium. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus does not contain a polymerization initiator.

The LC medium may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (Ciba AG), such as, for example, Irganox® 1076. If stabilizers are employed, their proportion, based on the total amount of RMs or the polymerizable component (component A), is preferably 10-500,000 ppm, particularly preferably 50-50,000 ppm.

The polymerizable compounds of formula I do in particular show good UV absorption in, and are therefore especially suitable for, a process of preparing a PSA display including one or more of the following features:

- the polymerizable medium is exposed to UV light in the display in a 2-step process, including a first UV exposure step ("UV-1 step") to generate the tilt angle, and a second UV exposure step ("UV-2 step") to finish polymerization,
- the polymerizable medium is exposed to UV light in the display generated by an energy-saving UV lamp (also known as "green UV lamps"). These lamps are characterized by a relative low intensity ($\frac{1}{100}$-$\frac{1}{10}$ of a conventional UV1 lamp) in their absorption spectra from 300-380 nm, and are preferably used in the UV2 step, but are optionally also used in the UV1 step when avoiding high intensity is necessary for the process.
- the polymerizable medium is exposed to UV light in the display generated by a UV lamp with a radiation spectrum that is shifted to longer wavelengths, preferably 340 nm or more, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:

- the polymerizable LC medium is exposed to UV light in a 2-step process, including a first UV exposure step ("UV-1 step") to generate the tilt angle, and a second UV exposure step ("UV-2 step") to finish polymerization,
- the polymerizable LC medium is exposed to UV light generated by a UV lamp having an intensity of from 0.5 mW/cm$^2$ to 10 mW/cm$^2$ in the wavelength range from 300-380 nm, preferably used in the UV2 step, and optionally also in the UV1 step,
- the polymerizable LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV exposure can be carried out using a cut-off filter being substantially transmissive for wavelengths λ>340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

Preferably the LC medium according to the present invention does essentially consist of a polymerizable component A) and an LC component B) (or LC host mixture) as described above and below. However, the LC medium may additionally comprise one or more further components or additives, preferably selected from the list including but not limited to co-monomers, chiral dopants, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colorants, dyes, pigments and nanoparticles.

Preference is given to LC media in which the polymerizable component A) consists exclusively of polymerizable compounds of formula I*.

In another preferred embodiment the polymerizable component A) contains, in addition to the compounds of formula I*, one or more further polymerizable compounds ("co-monomers"), preferably selected from RMs.

Preferably the proportion of the polymerizable component A) in the LC medium is from >0 to <5%, very preferably from >0 to <1%, most preferably from 0.01 to 0.5%.

Preferably the proportion of the LC component B) in the LC medium is from 95 to <100%, very preferably from 99 to <100%.

Besides the polymerizable component A) as described above, the LC media according to the present invention comprise an LC component B), or LC host mixture, comprising one or more, preferably two or more LC compounds which are selected from low-molecular-weight compounds that are unpolymerizable. These LC compounds are selected such that they stable and/or unreactive to a polymerization reaction under the conditions applied to the polymerization of the polymerizable compounds.

Examples of these compounds are the compounds of formula A.

Preference is given to LC media in which the LC component B), or the LC host mixture, has a nematic LC phase, and preferably has no chiral liquid crystal phase.

Preference is furthermore given to achiral compounds of formula I, and to LC media in which the compounds of component A and/or B are selected exclusively from the group consisting of achiral compounds.

The LC component B), or LC host mixture, is preferably a nematic LC mixture.

In a preferred embodiment the LC medium contains an LC component B), or LC host mixture, based on compounds with negative dielectric anisotropy. Such LC media are especially suitable for use in PS-VA and PS-UB-FFS displays. Particularly preferred embodiments of such an LC medium are those of sections a)-z4) below:

a) LC medium wherein the component B) or LC host mixture comprises one or more compounds selected from formulae CY and PY:

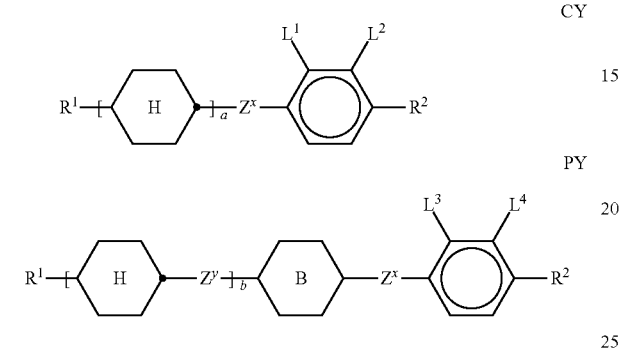

wherein
a denotes 1 or 2,
b denotes 0 or 1,

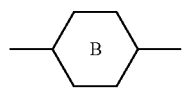

denotes

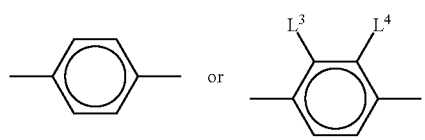

$R^1$ and $R^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, $L^{1-4}$ each, independently of one another, denote F, Cl, OCF$_3$, CF$_3$, CH$_3$, CH$_2$F, CHF$_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

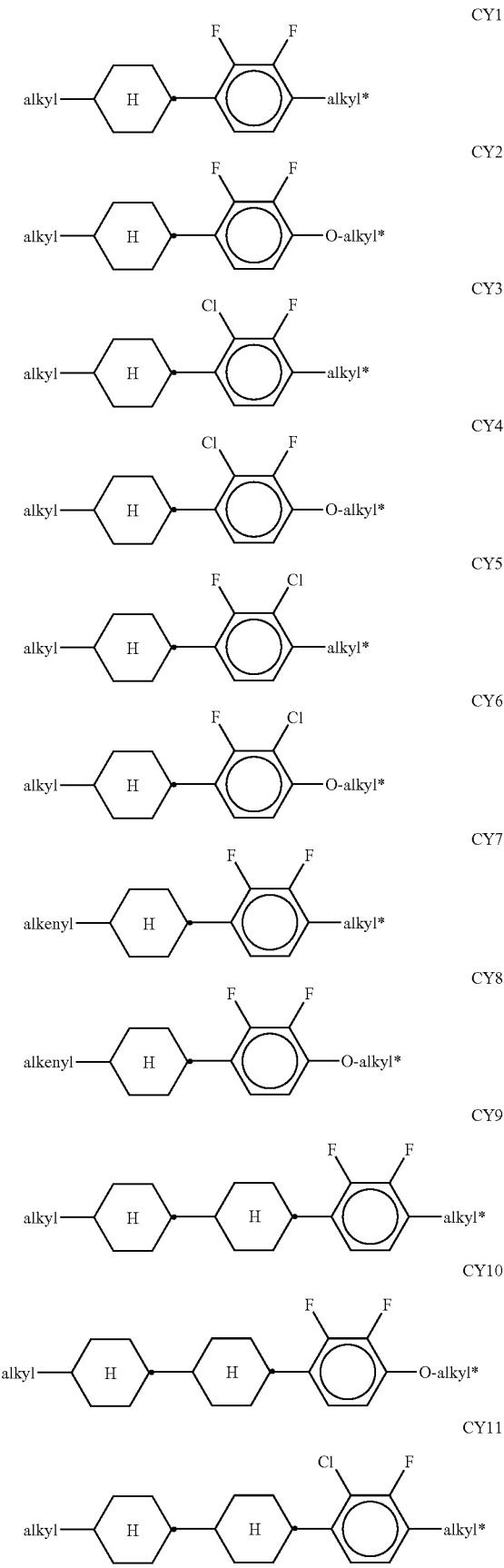

CY12
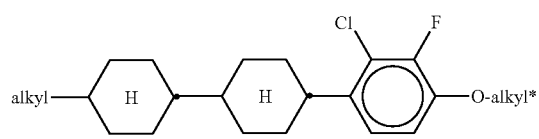
CY13
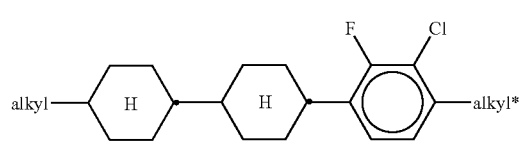
CY14
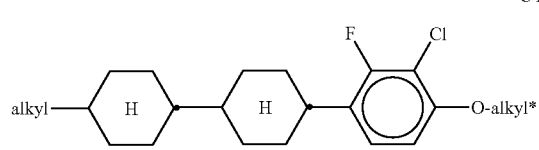
CY15
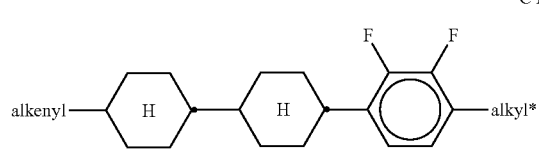
CY16
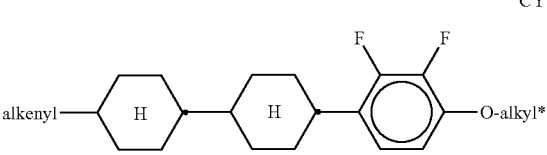
CY17
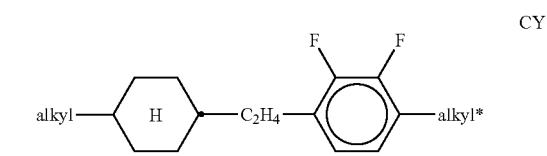
CY18
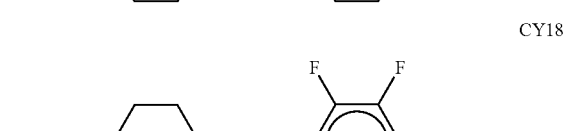
CY19
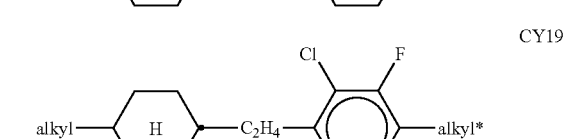
CY20
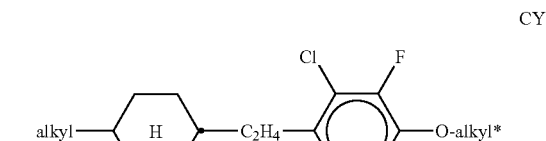
CY21
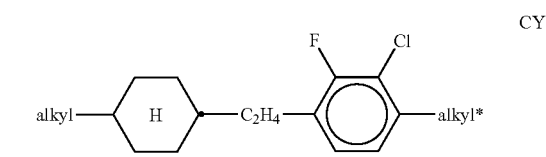
CY22
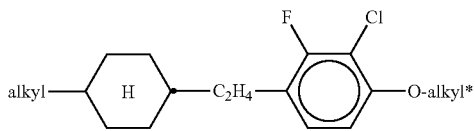
CY23
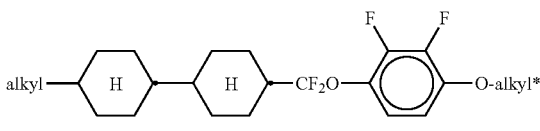
CY24
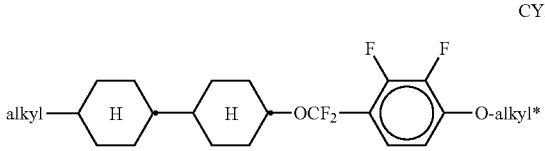
CY25
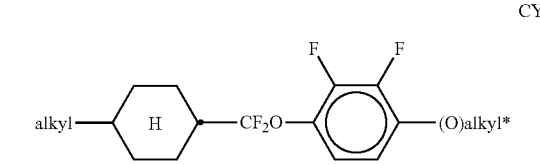
CY26
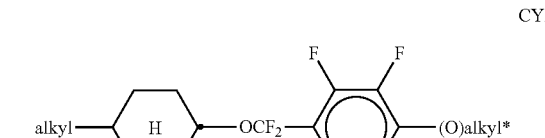
CY27
CY28
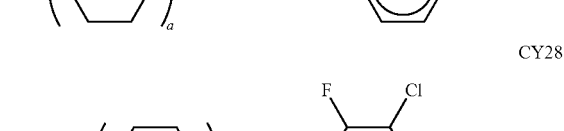
CY29
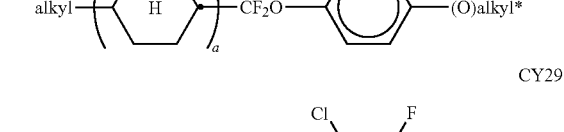
CY30
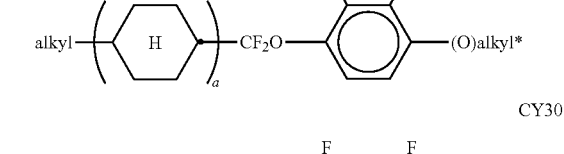
CY31
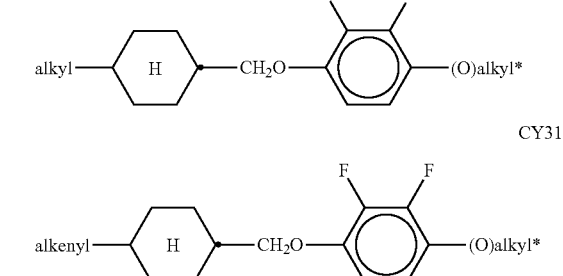

-continued

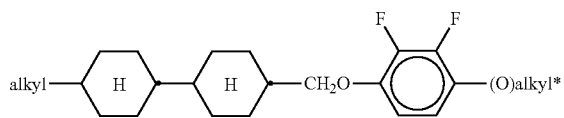
CY32

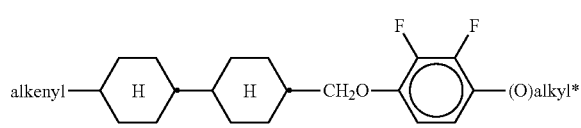
CY33 in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds selected from formulae CY2, CY8, CY10 and CY16, very preferably those of formula CY2 and CY10.

The compounds of the formula PY are preferably selected from the group consisting of the following sub-formulae:

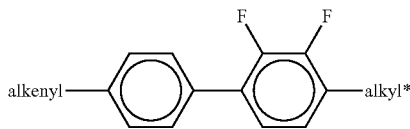
PY1

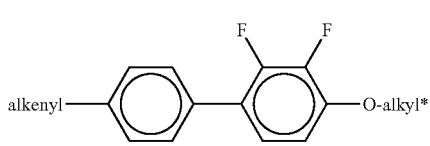
PY2

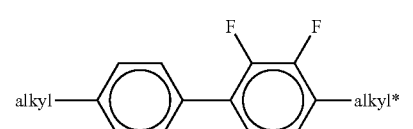
PY3

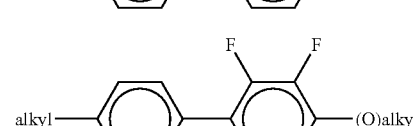
PY4

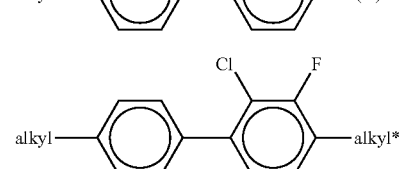
PY5

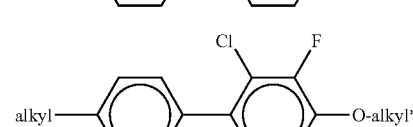
PY6

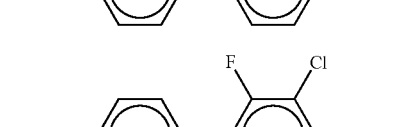

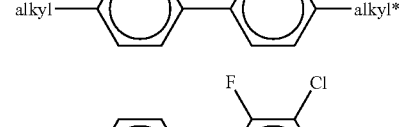

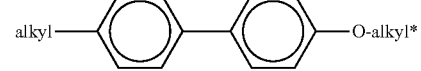

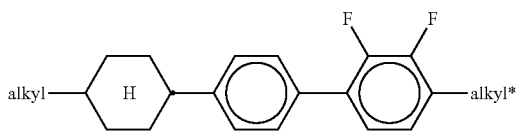
PY7

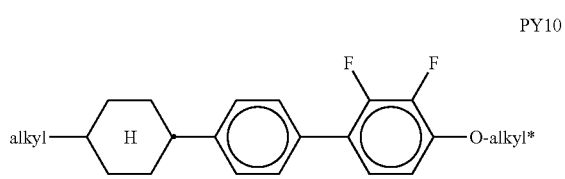
PY8

PY9

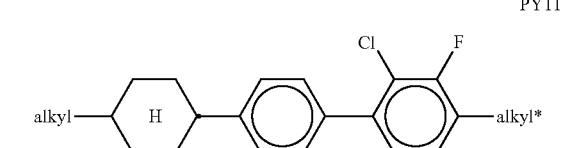

PY10

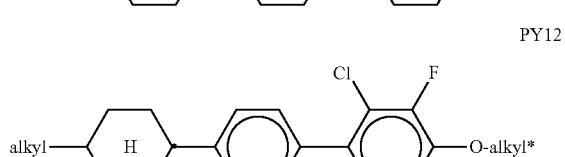

PY11

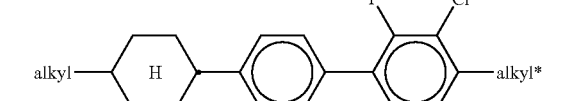
PY12

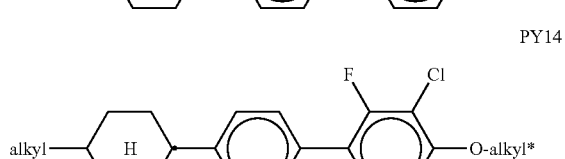
PY13

PY14

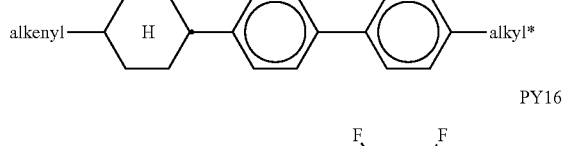
PY15

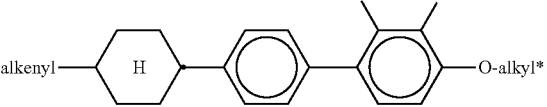
PY16

-continued

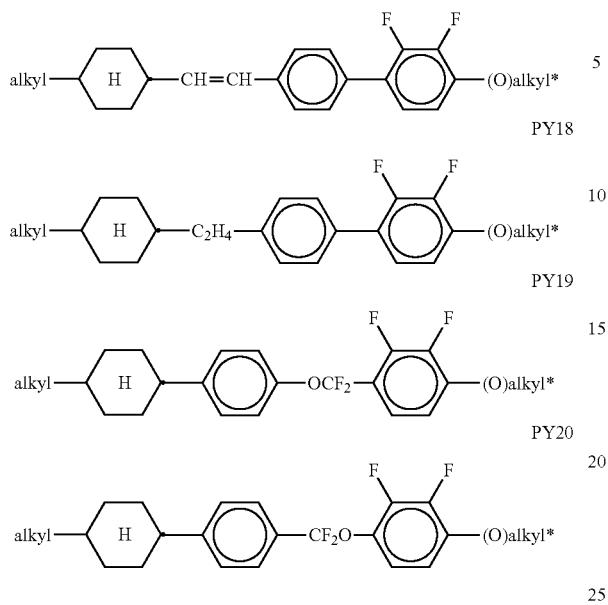

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds selected from formulae PY2, PY8, PY10 and PY16, very preferably those of formula PY2 and PY10.

Preferably the component B) or LC host mixture comprises one or more compounds of formula PY2, preferably in an amount from 1 to 20%, very preferably from 8 to 20% by weight.

b) LC medium wherein the component B) or LC host mixture comprises one or more mesogenic or LC compounds comprising an alkenyl group (hereinafter also referred to as "alkenyl compounds"), wherein said alkenyl group is stable to a polymerization reaction under the conditions used for polymerization of the polymerizable compounds contained in the LC medium.

Preferably the component B) or LC host mixture comprises one or more alkenyl compounds selected from formulae AN and AY which are different from formula A

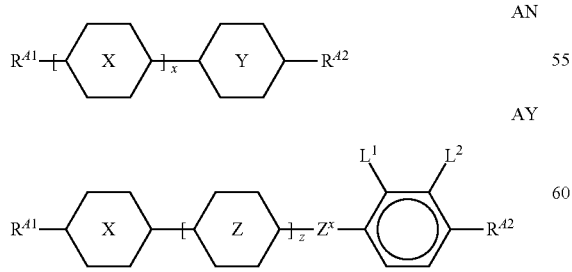

in which the individual radicals, on each occurrence identically or differently, and each, independently of one another, have the following meaning:

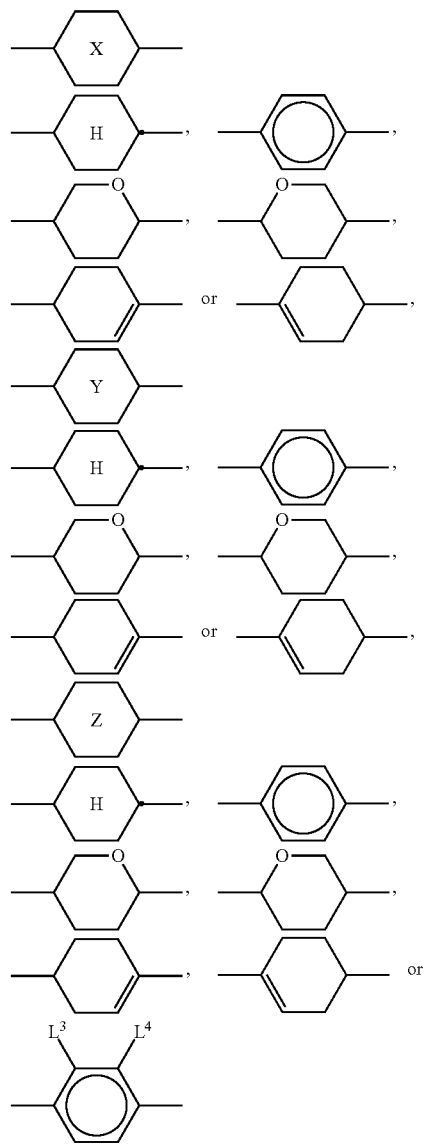

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may be replaced by $-O-$, $-CH=CH-$, $-CO-$, $-OCO-$ or $-COO-$ in such a way that O atoms are not linked directly to one another, $Z^x$ $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$, or a single bond, preferably a single bond, $L^{1,2}$ H, F, Cl, $OCF_3$, $CF_3$, $CH_3$, $CH_2F$ or $CHF_2H$, preferably H, F or Cl, x 1 or 2, z 0 or 1.

Preferred compounds of formula AN and AY are those wherein $R^{A2}$ is selected from ethenyl, propenyl, butenyl, pentenyl, hexenyl and heptenyl.

In a preferred embodiment the component B) or LC host mixture comprises one or more compounds of formula AN selected from the following sub-formulae:

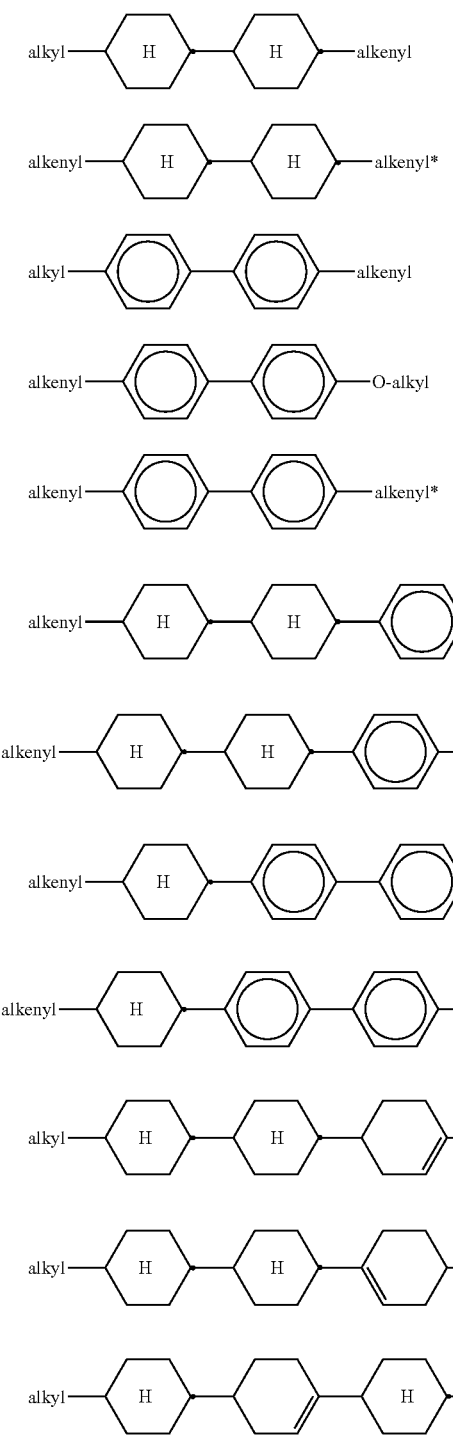

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Preferably the component B) or LC host mixture comprises one or more compounds selected from formulae AN1, AN2, AN3 and AN6, very preferably one or more compounds of formula AN1.

In another preferred embodiment the component B) or LC host mixture comprises one or more compounds of formula AN selected from the following sub-formulae:

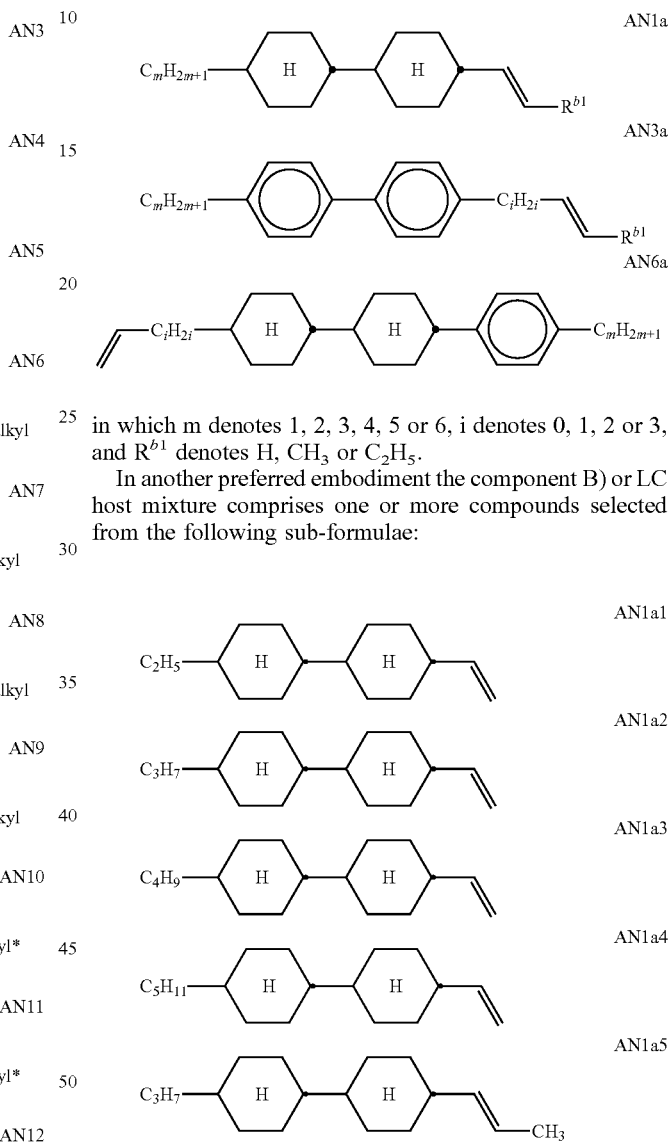

in which m denotes 1, 2, 3, 4, 5 or 6, i denotes 0, 1, 2 or 3, and R$^{b1}$ denotes H, CH$_3$ or C$_2$H$_5$.

In another preferred embodiment the component B) or LC host mixture comprises one or more compounds selected from the following sub-formulae:

[AN1a1 through AN1a5 structures shown above]

Most preferred are compounds of formula AN1a2 and AN1a5.

In another preferred embodiment the component B) or LC host mixture comprises one or more compounds of formula AY selected from the following sub-formulae:

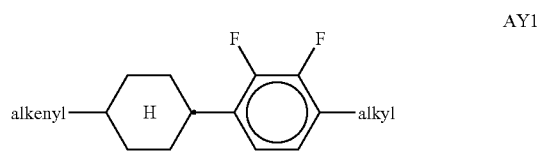

AY2 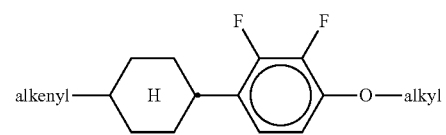
AY3 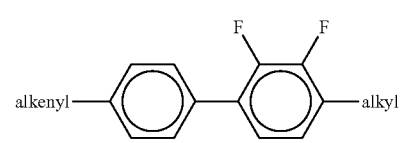
AY4 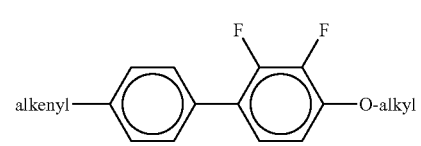
AY5 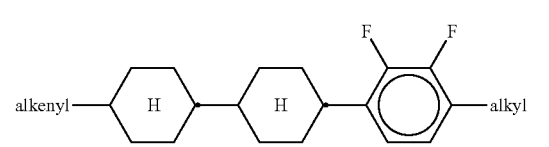
AY6 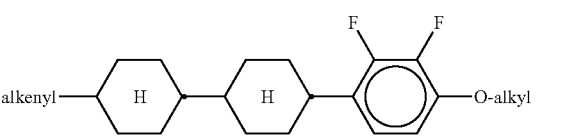
AY7 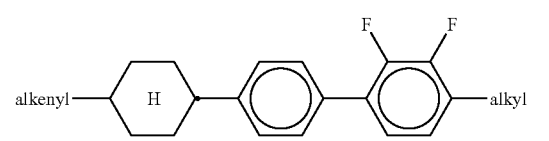
AY8 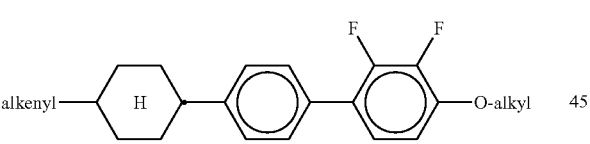
AY9 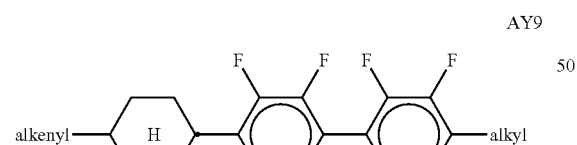
AY10 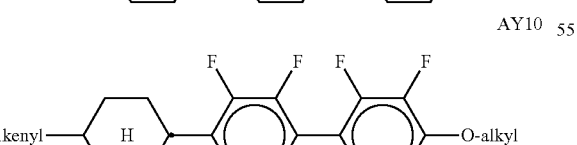
AY11 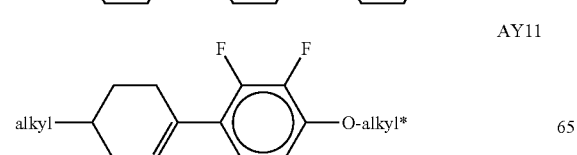
AY12 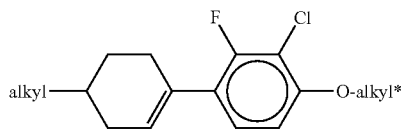
AY13 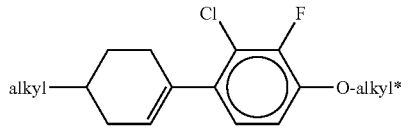
AY14 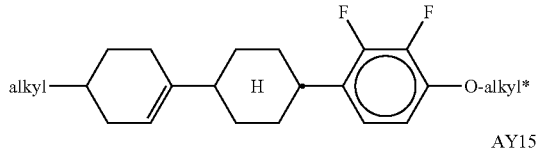
AY15 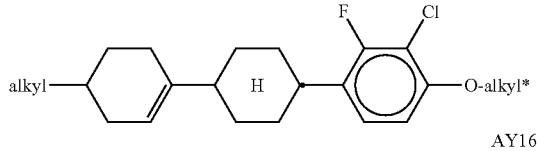
AY16 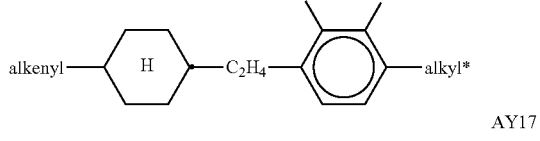
AY17 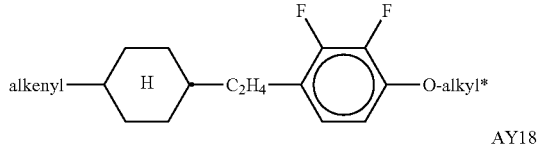
AY18 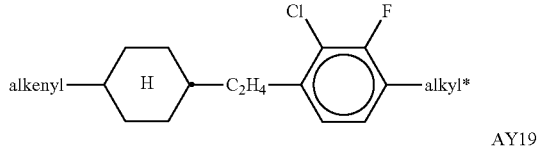
AY19 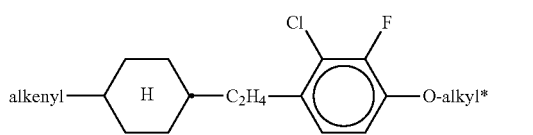
AY20 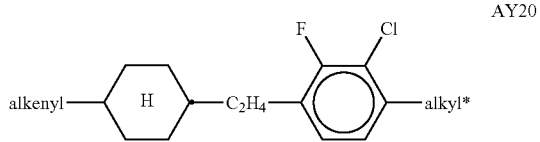
AY21 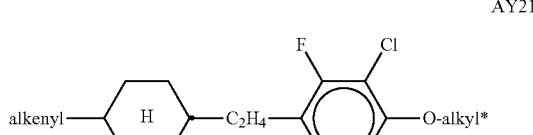
AY22 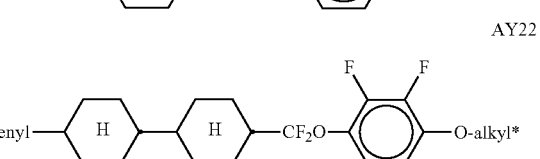

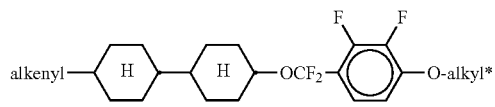
AY23

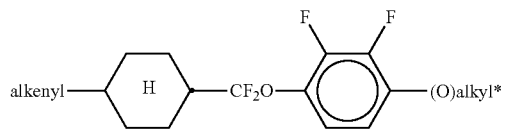
AY24

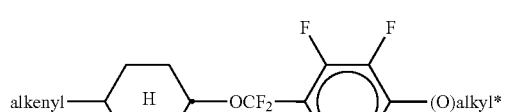
AY25

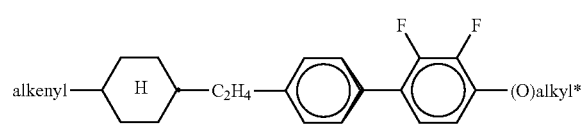
AY26

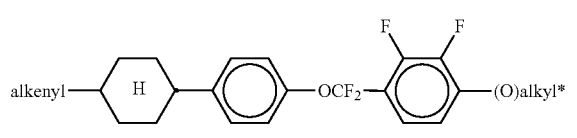
AY27

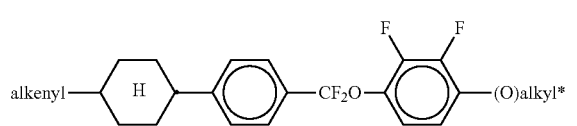
AY28 in which alkyl and alkyl* each, independently of one another, denote a straight-chain alkyl radical having 1-6 C atoms, "(O)" denotes an O-atom or a single bond, and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

In another preferred embodiment the component B) or LC host mixture comprises one or more compounds of formula AY selected from the following sub-formulae:

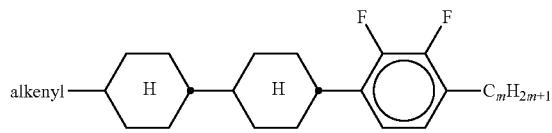
AY5a

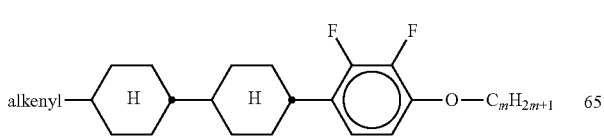
AY6a

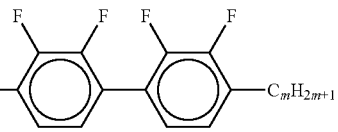
AY9a

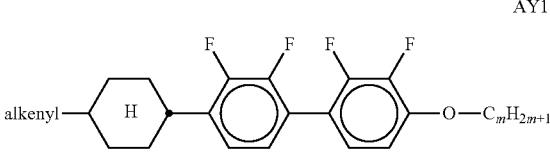
AY10a

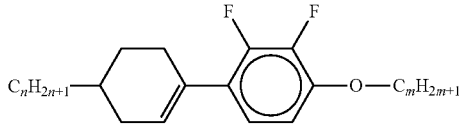
AY11a in which m and n each, independently of one another, denote 1, 2, 3, 4, 5 or 6, and alkenyl denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Preferably the proportion of compounds of formula AN and AY in the LC medium is from 2 to 70% by weight, very preferably from 5 to 60% by weight, most preferably from 10 to 50% by weight.

Preferably the LC medium or LC host mixture contains 1 to 5, preferably 1, 2 or 3 compounds selected from formulae AN and AY.

The addition of alkenyl compounds of formula AN and/or AY enables a reduction of the viscosity and response time of the LC medium.

c) LC medium wherein the component B) or LC host mixture comprises one or more compounds of the following formula:

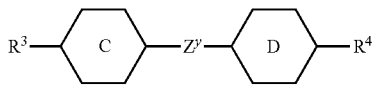
ZK in which the individual radicals have the following meanings:

denotes

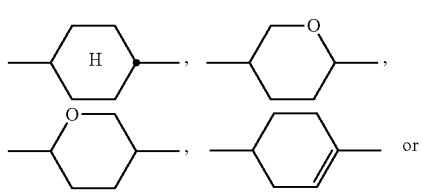

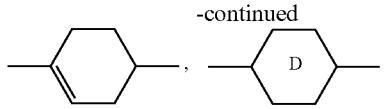

denotes

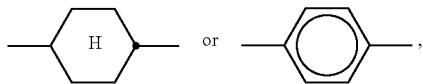

R³ and R⁴ each, independently of one another, denote alkyl having 1 to 12 C atoms, in which, in addition, one or two non-adjacent CH₂ groups may be replaced by —O—, —CH=CH—, —CO—, —O—CO— or —CO—O— in such a way that O atoms are not linked directly to one another, Z^y denotes —CH₂CH₂—, —CH=CH—, —CF₂O—, —OCF₂—, —CH₂O—, —OCH₂—, —CO—O—, —O—CO—, —C₂F₄—, —CF=CF—, —CH=CH—CH₂O— or a single bond, preferably a single bond.

The compounds of the formula ZK are preferably selected from the group consisting of the following sub-formulae:

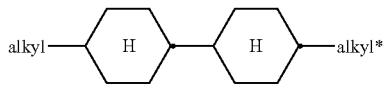 ZK1

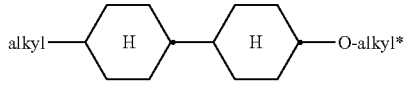 ZK2

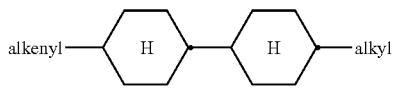 ZK3

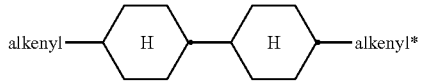 ZK4

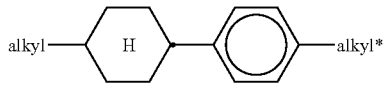 ZK5

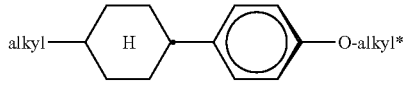 ZK6

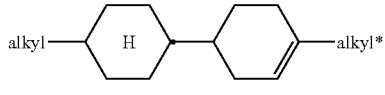 ZK7

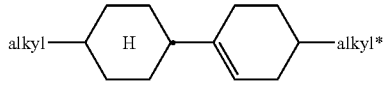 ZK8

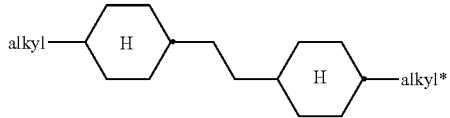 ZK9

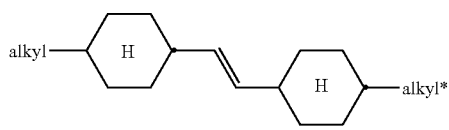 ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

Especially preferred are compounds of formula ZK1.

Particularly preferred compounds of formula ZK are selected from the following sub-formulae:

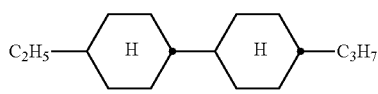 ZK1a

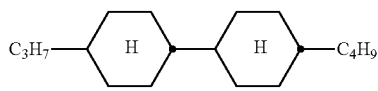 ZK1b

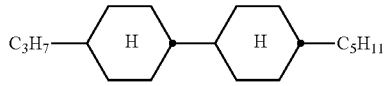 ZK1c wherein the propyl, butyl and pentyl groups are straight-chain groups.

Most preferred are compounds of formula ZK1a.

d) LC medium wherein component B) or the LC host mixture additionally comprises one or more compounds of the following formula:

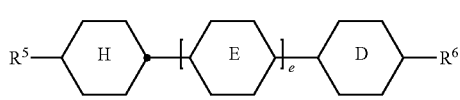 DK in which the individual radicals on each occurrence, identically or differently, have the following meanings:

R⁵ and R⁶ each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, preferably alkyl or alkoxy having 1 to 6 C atoms,

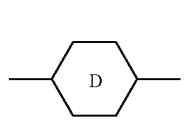

denotes

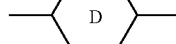

-continued

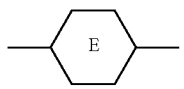

denotes

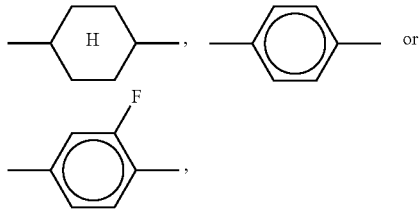

and
e denotes 1 or 2.

The compounds of the formula DK are preferably selected from the group consisting of the following sub-formulae:

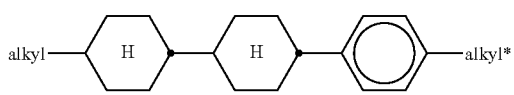
DK1

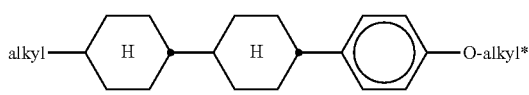
DK2

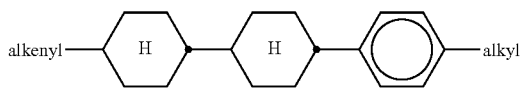
DK3

DK4

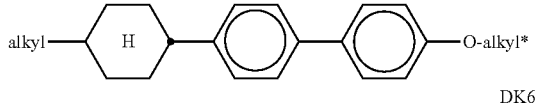
DK5

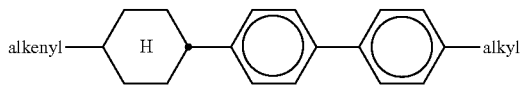
DK6

DK7

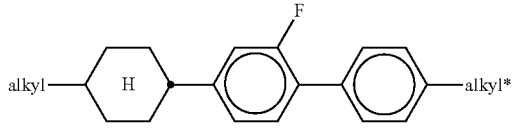

DK8

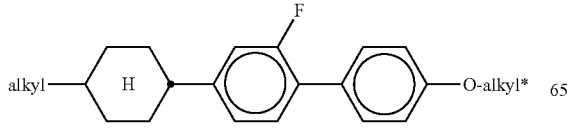

-continued

DK9
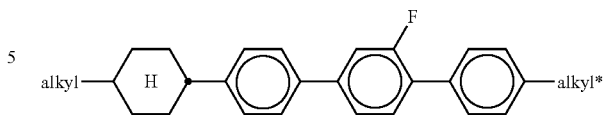

DK10
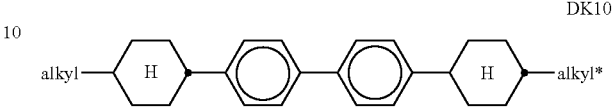

DK11
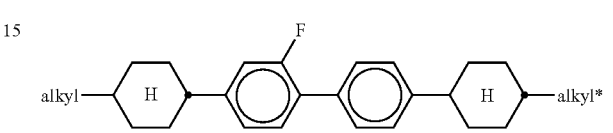

DK12
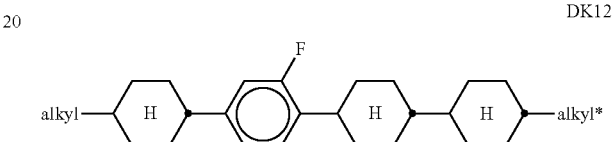

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

e) LC medium wherein component B) or the LC host mixture additionally comprises one or more compounds of the following formula:

LY
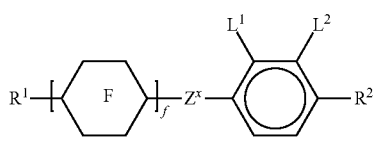

in which the individual radicals have the following meanings:

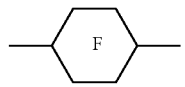

denotes

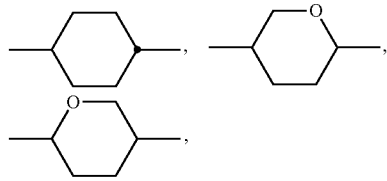

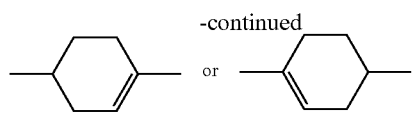

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, $Z^x$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

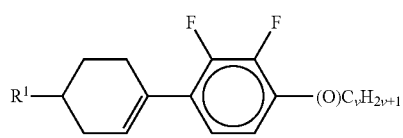

LY1

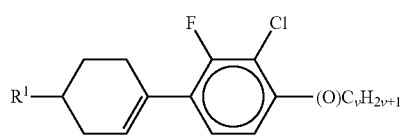

LY2

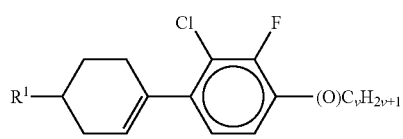

LY3

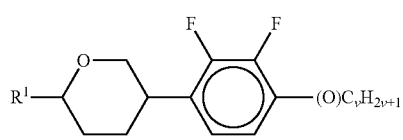

LY4

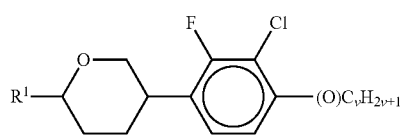

LY5

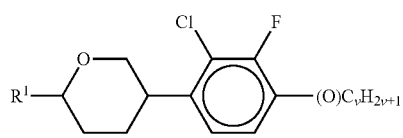

LY6

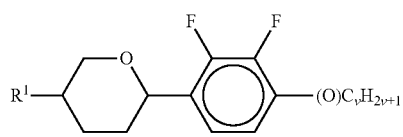

LY7

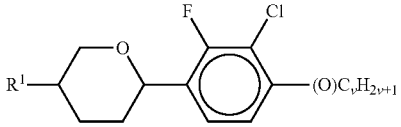

LY8

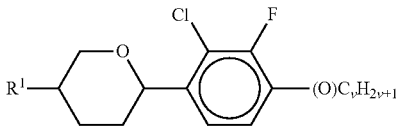

LY9

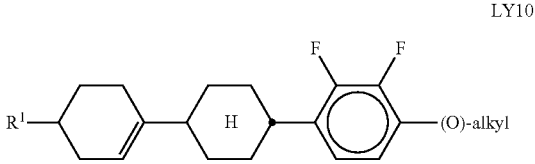

LY10

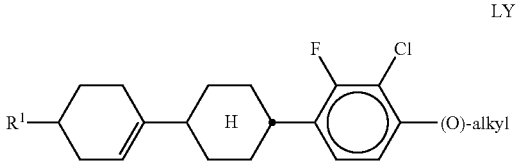

LY11

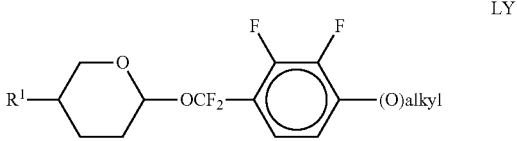

LY12

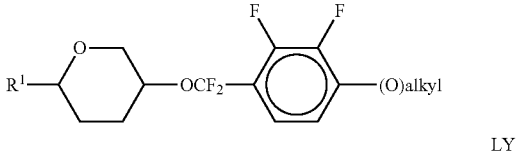

LY13

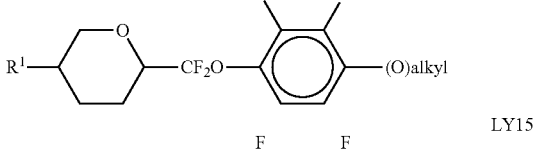

LY14

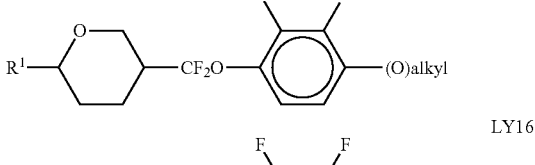

LY15

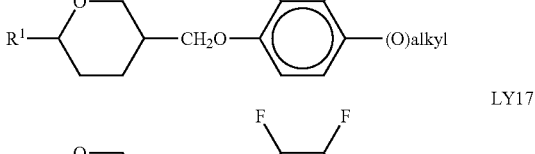

LY16

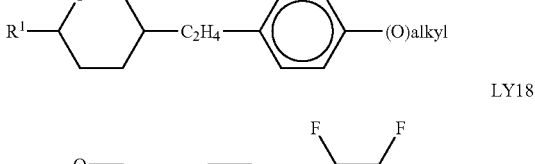

LY17

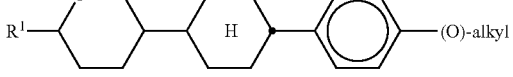

LY18

-continued

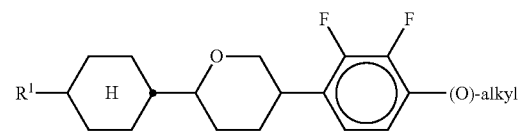
LY19

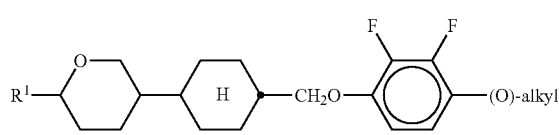
LY20

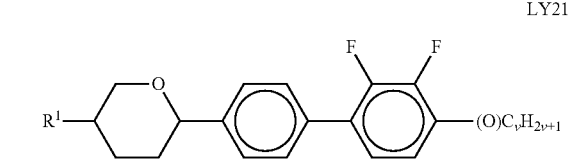
LY21 in which R¹ has the meaning indicated above, alkyl denotes a straight-chain alkyl radical having 1-6 C atoms, (O) denotes an oxygen atom or a single bond, and v denotes an integer from 1 to 6. R¹ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

f) LC medium wherein component B) or the LC host mixture additionally comprises one or more compounds selected from the group consisting of the following formulae:

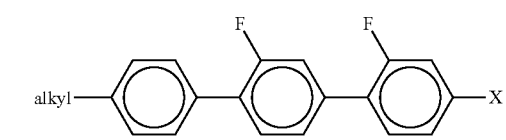
G1

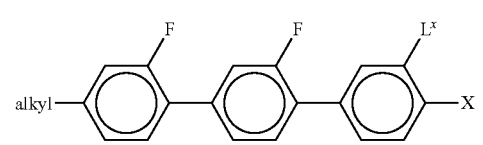
G2

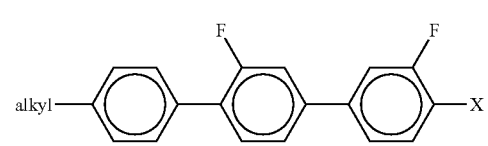
G3

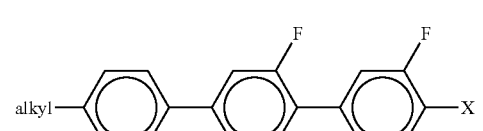
G4

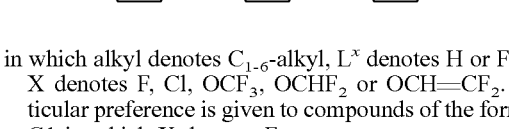

in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

g) LC medium wherein component B) or the LC host mixture additionally comprises one or more compounds selected from the group consisting of the following formulae:

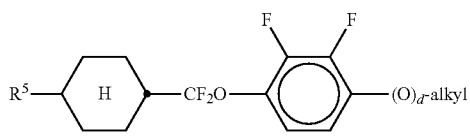
Y1

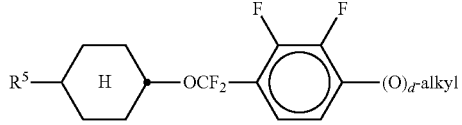
Y2

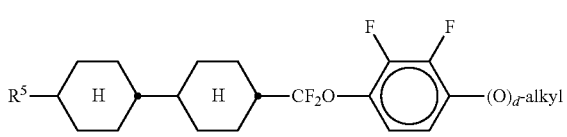
Y3

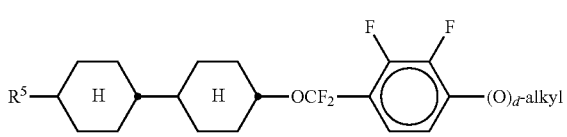
Y4

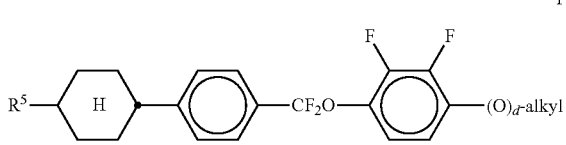
Y5

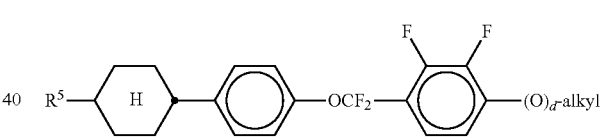
Y6

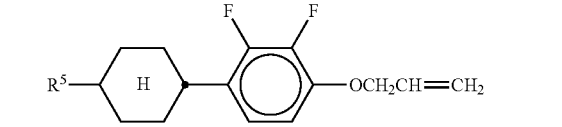
Y7

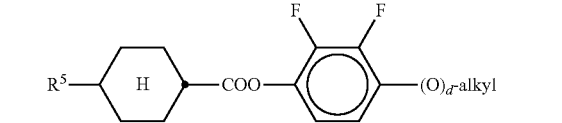
Y8

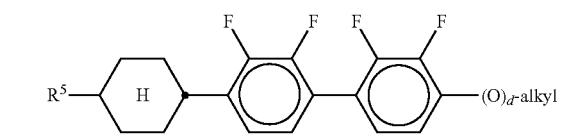
Y9

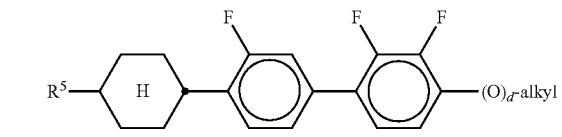
Y10

-continued

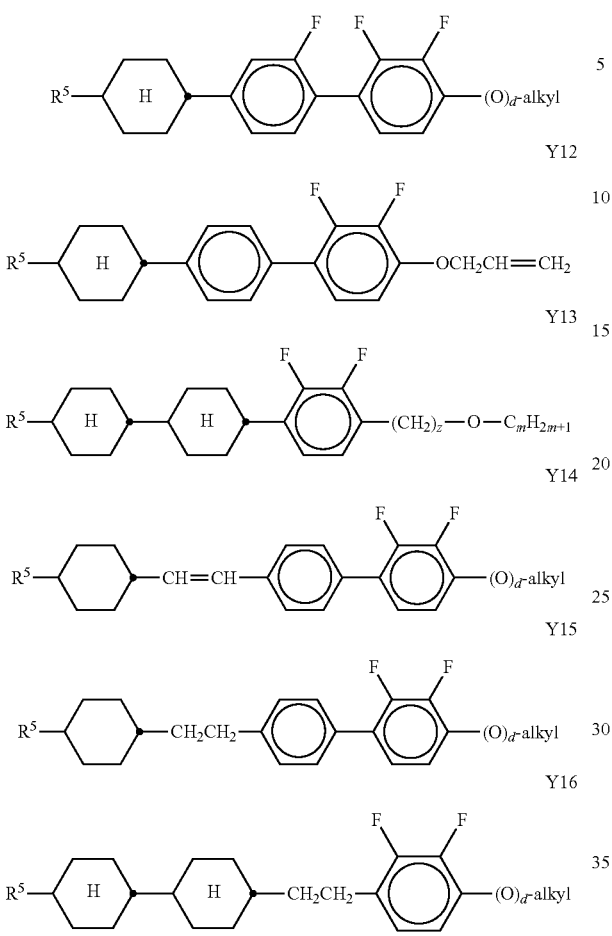

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

h) LC medium wherein component B) or the LC host mixture additionally comprises one or more biphenyl compounds selected from the group consisting of the following formulae:

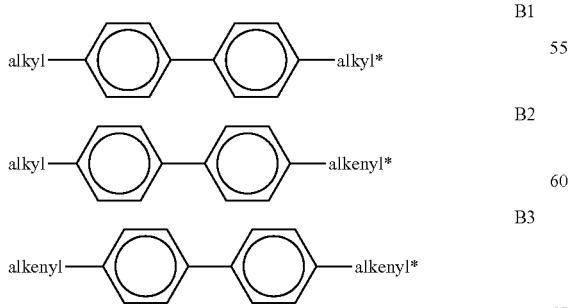

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC host mixture is preferably at least 3% by weight, in particular ≥5% by weight.

The compounds of the formula B2 are particularly preferred.

The compounds of the formulae B1 to B3 are preferably selected from the group consisting of the following sub-formulae:

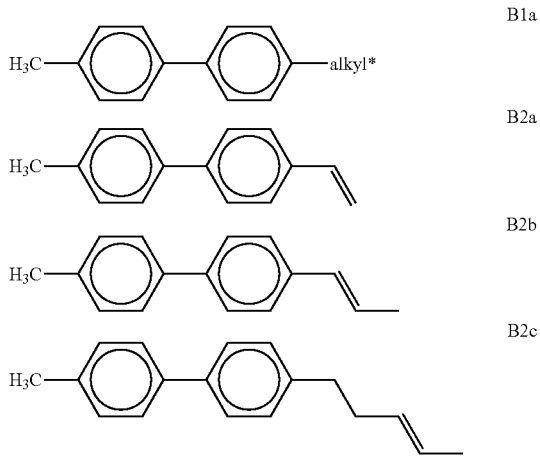

in which alkyl* denotes an alkyl radical having 1-6 C atoms. The medium according to the invention particularly preferably comprises one or more compounds of the formulae B1a and/or B2c.

i) LC medium wherein component B) or the LC host mixture additionally comprises one or more terphenyl compounds of the following formula:

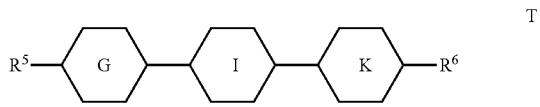

in which $R^5$ and $R^6$ each, independently of one another, have one of the meanings indicated above, and

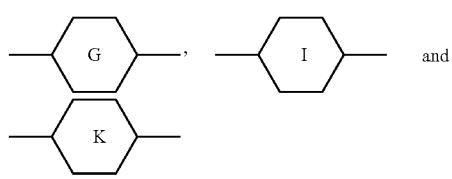

each, independently of one another, denote

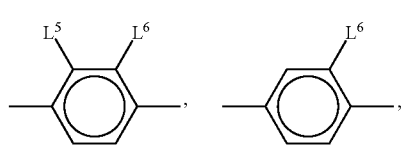

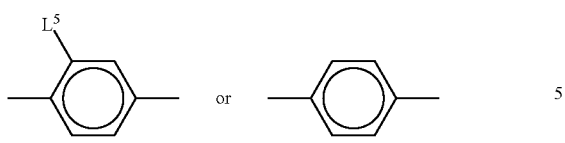
in which L⁵ denotes F or Cl, preferably F, and L⁶ denotes F, Cl, OCF$_3$, CF$_3$, CH$_3$, CH$_2$F or CHF$_2$, preferably F.
The compounds of the formula T are preferably selected from the group consisting of the following sub-formulae:
T1
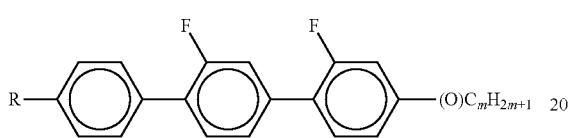
T2
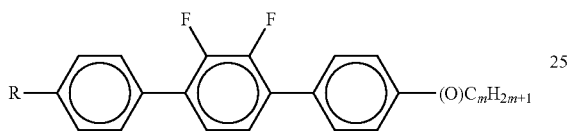
T3
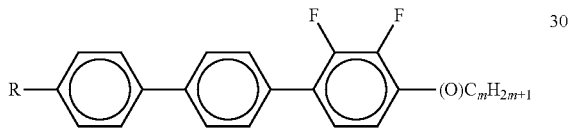
T4
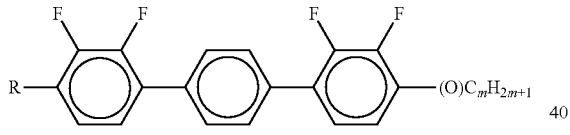
T5
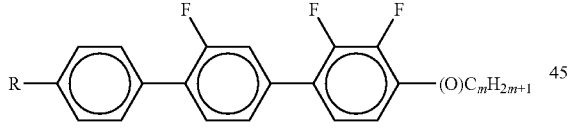
T6
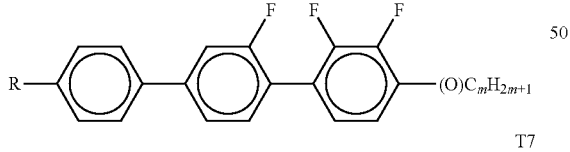
T7
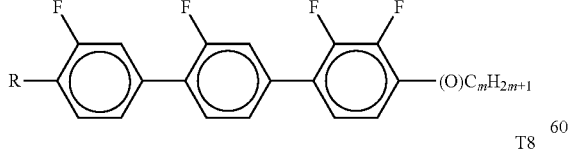
T8
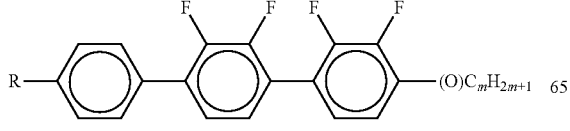
T9
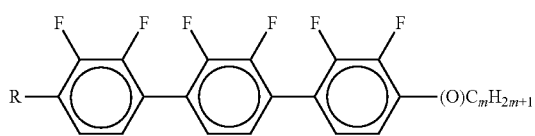
T10
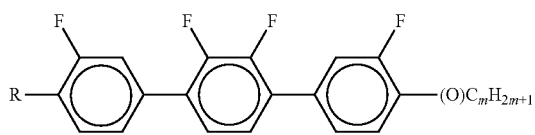
T11
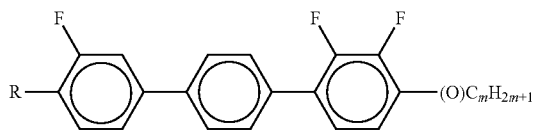
T12
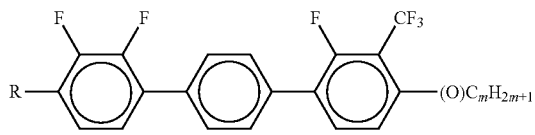
T13
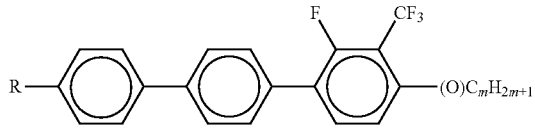
T14
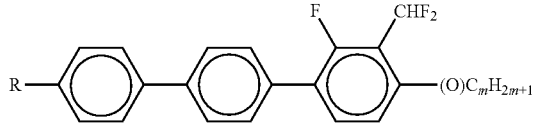
T15
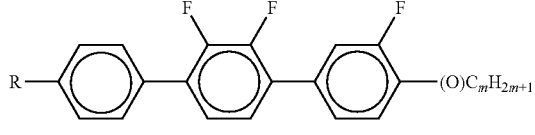
T16
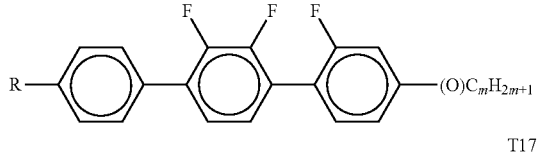
T17
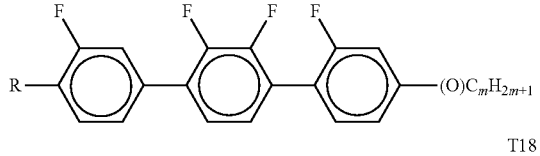
T18
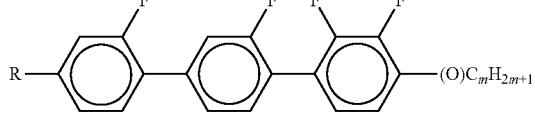

-continued

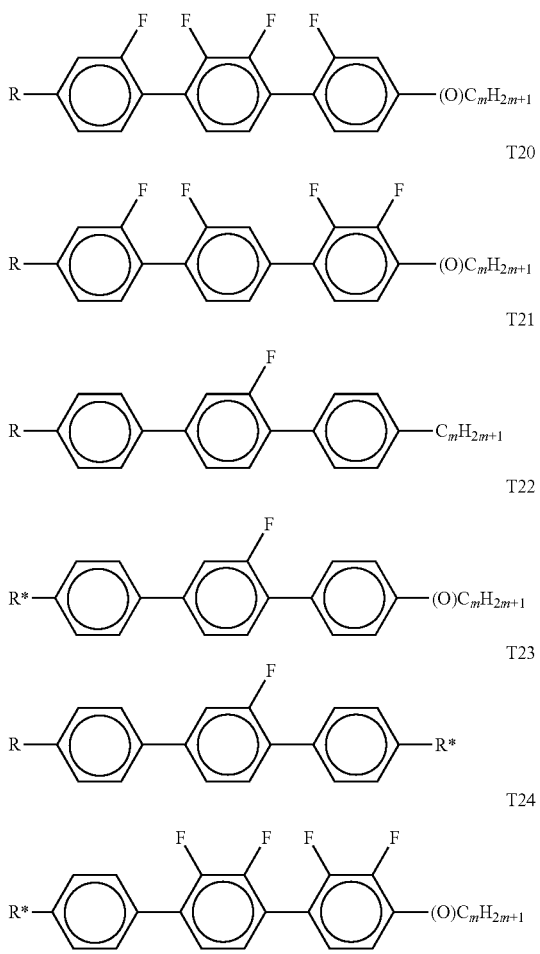

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

R preferably denotes methyl, ethyl, propyl, butyl, pentyl, hexyl, methoxy, ethoxy, propoxy, butoxy or pentoxy.

The LC host mixture according to the invention preferably comprises the terphenyls of the formula T and the preferred sub-formulae thereof in an amount of 0.5-30% by weight, in particular 1-20% by weight.

Very preferred are compounds of formulae T1, T2, T3, T5 and T21, especially those of formula T1 and T2 and T5. In these compounds, R preferably denotes alkyl, furthermore alkoxy, each having 1-5 C atoms.

The terphenyls are preferably employed in LC media according to the invention if the Δn value of the mixture is to be ≥0.1. Preferred LC media comprise 2-20% by weight of one or more terphenyl compounds of the formula T, preferably selected from the group of compounds T1 to T24.

In another preferred embodiment according to the present invention the LC host mixture or component B) contains <10%, preferably <5%, very preferably <1%, most preferably 0% of a terphenyl compound of formula T or any other compound with a terphenyl group. Preferably the LC medium does not contain any unpolymerizable compound with a terphenyl group.

k) LC medium wherein component B) or the LC host mixture additionally comprises one or more quaterphenyl compounds selected from the group consisting of the following formulae:

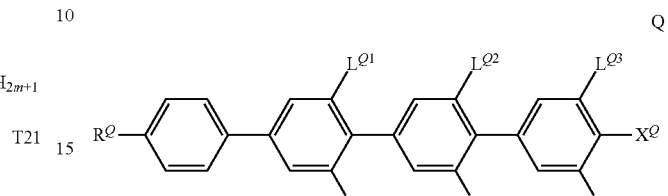

wherein

R$^Q$ is alkyl, alkoxy, oxaalkyl or alkoxyalkyl having 1 to 9 C atoms or alkenyl or alkenyloxy having 2 to 9 C atoms, all of which are optionally fluorinated, X$^Q$ is F, Cl, halogenated alkyl or alkoxy having 1 to 6 C atoms or halogenated alkenyl or alkenyloxy having 2 to 6 C atoms, L$^{Q1}$ to L$^{Q6}$ independently of each other are H or F, with at least one of L$^{Q1}$ to L$^{Q6}$ being F.

Preferred compounds of formula Q are those wherein R$^Q$ denotes straight-chain alkyl with 2 to 6 C-atoms, very preferably ethyl, n-propyl or n-butyl.

Preferred compounds of formula Q are those wherein L$^{Q3}$ and L$^{Q4}$ are F. Further preferred compounds of formula Q are those wherein L$^{Q3}$, L$^{Q4}$ and one or two of L$^{Q1}$ and L$^{Q2}$ are F.

Preferred compounds of formula Q are those wherein X$^Q$ denotes F or OCF$_3$, very preferably F.

The compounds of formula Q are preferably selected from the following subformulae

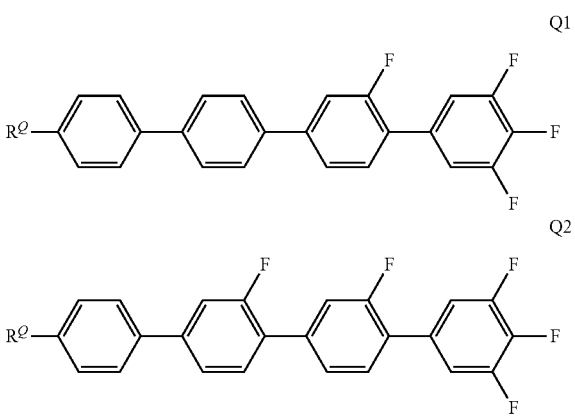

wherein R$^Q$ has one of the meanings of formula Q or one of its preferred meanings given above and below, and is preferably ethyl, n-propyl or n-butyl.

Especially preferred are compounds of formula Q1, in particular those wherein R$^Q$ is n-propyl.

Preferably the proportion of compounds of formula Q in the LC host mixture is from >0 to ≤5% by weight, very preferably from 0.1 to 2% by weight, most preferably from 0.2 to 1.5% by weight.

Preferably the LC host mixture contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\epsilon_\|$ and $\epsilon_\perp$, and in particular enables to achieve a high value of the dielectric constant $\epsilon_\|$ while keeping the dielectric anisotropy $\Delta\epsilon$ constant, thereby reducing the kick-back voltage and reducing image sticking.

l) LC medium wherein component B) or the LC host mixture additionally comprises one or more compounds of formula CC:

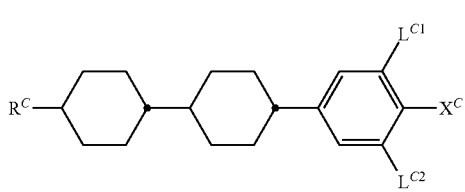

wherein
- $R^C$ denotes alkyl, alkoxy, oxaalkyl or alkoxyalkyl having 1 to 9 C atoms or alkenyl or alkenyloxy having 2 to 9 C atoms, all of which are optionally fluorinated,
- $X^C$ denotes F, Cl, halogenated alkyl or alkoxy having 1 to 6 C atoms or halogenated alkenyl or alkenyloxy having 2 to 6 C atoms,
- $L^{C1}$, $L^{C2}$ independently of each other denote H or F, with at least one of $L^{C1}$ and $L^{C2}$ being F.

Preferred compounds of formula CC are those wherein $R^C$ denotes straight-chain alkyl with 2 to 6 C-atoms, very preferably ethyl, n-propyl or n-butyl.

Further preferred compounds of formula CC are those wherein $L^{C1}$ and $L^{C2}$ are F.

Further preferred compounds of formula CC are those wherein $X^C$ denotes F or $OCF_3$, very preferably F.

Further preferred compounds of formula CC are selected from the following formula

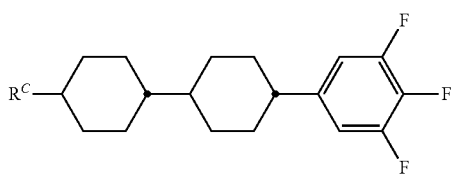

wherein $R^C$ has one of the meanings of formula CC or one of its preferred meanings given above and below, and is preferably ethyl, n-propyl or n-butyl, very preferably n-propyl.

Preferably the proportion of compounds of formula CC in the LC host mixture is from >0 to ≤10% by weight, very preferably from 0.1 to 8% by weight, most preferably from 0.2 to 5% by weight.

Preferably the LC host mixture contains 1 to 5, preferably 1, 2 or 3 compounds of formula CC.

The addition of compounds of formula CC, which have positive dielectric anisotropy, to the LC medium with negative dielectric anisotropy allows a better control of the values of the dielectric constants $\epsilon_\|$ and $\epsilon_\perp$, and in particular enables to achieve a high value of the dielectric constant $\epsilon_\|$ while keeping the dielectric anisotropy $\Delta\epsilon$ constant, thereby reducing the kick-back voltage and reducing image sticking. Besides, the addition of compounds of formula CC enables to reduce the viscosity and the response time of the LC medium.

m) LC medium wherein component B) or the LC host mixture additionally comprises one or more compounds selected from the group consisting of the following formulae:

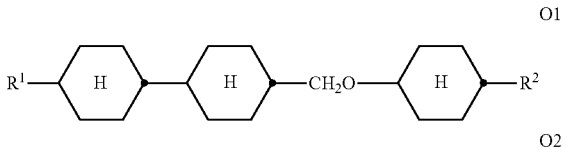

O1

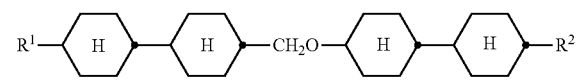

O2

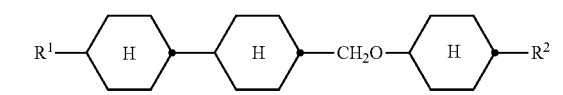

O3

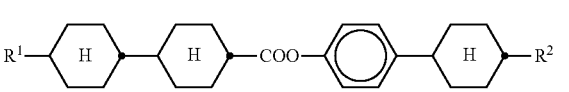

O4

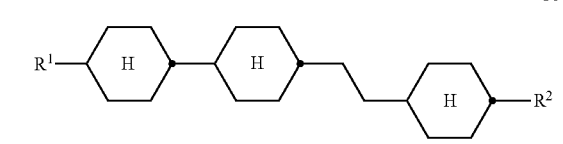

O5

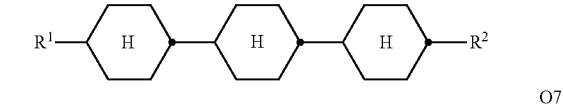

O6

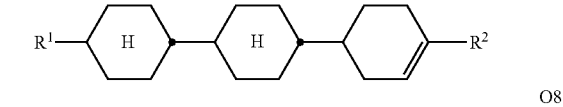

O7

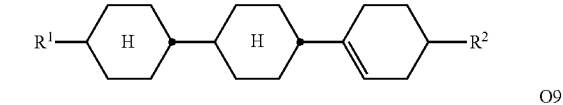

O8

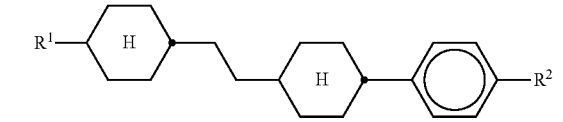

O9

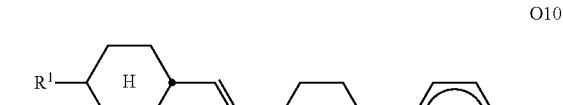

O10

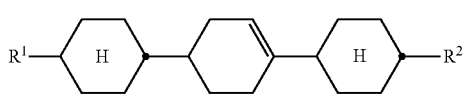

O11 in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

n) LC medium wherein component B) or the LC host mixture additionally comprises one or more compounds of the following formula:

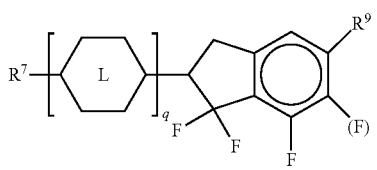

F1 in which

denotes

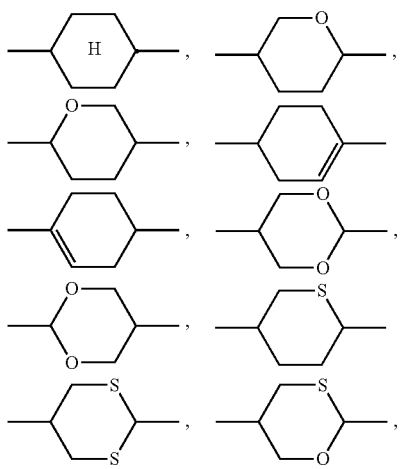

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

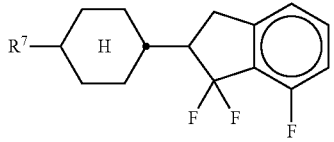

FI1

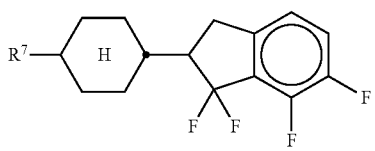

FI2

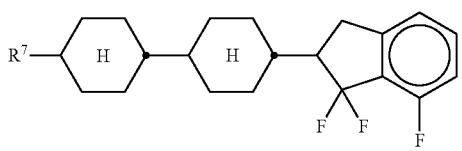

FI3

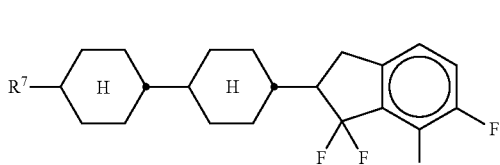

FI4

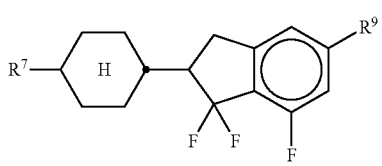

FI5

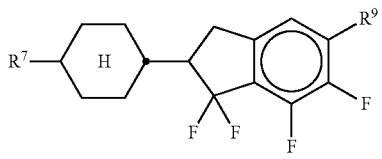

FI6

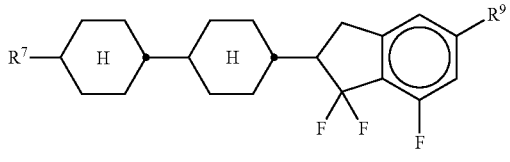

FI7

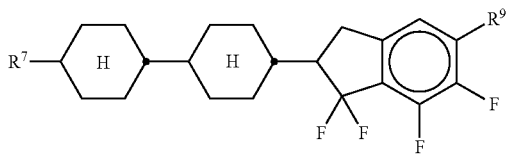

FI8 in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

o) LC medium wherein component B) or the LC host mixture additionally comprises one or more compounds selected from the group consisting of the following formulae:

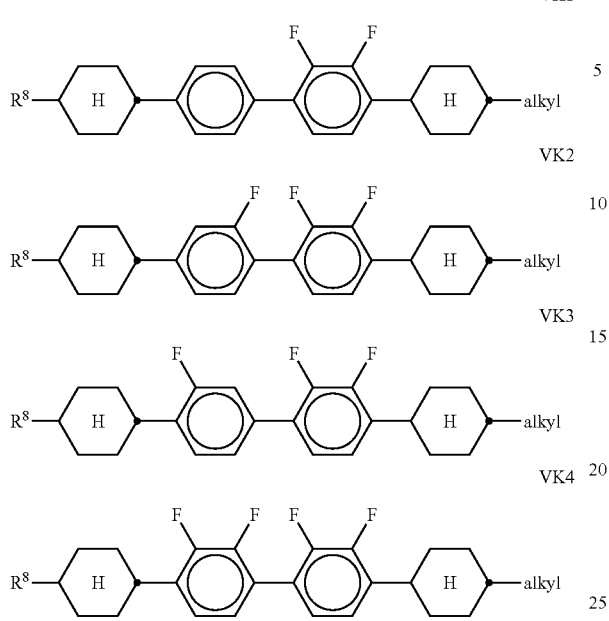

in which R⁸ has the meaning indicated for R¹, and alkyl denotes a straight-chain alkyl radical having 1-6 C atoms.

p) LC medium wherein component B) or the LC host mixture additionally comprises one or more compounds which contain a tetrahydronaphthyl or naphthyl unit, such as, for example, the compounds selected from the group consisting of the following formulae:

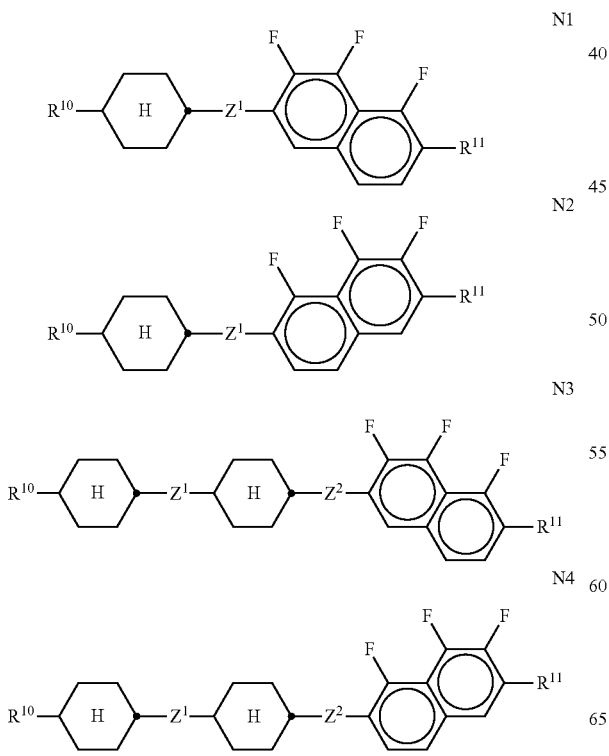

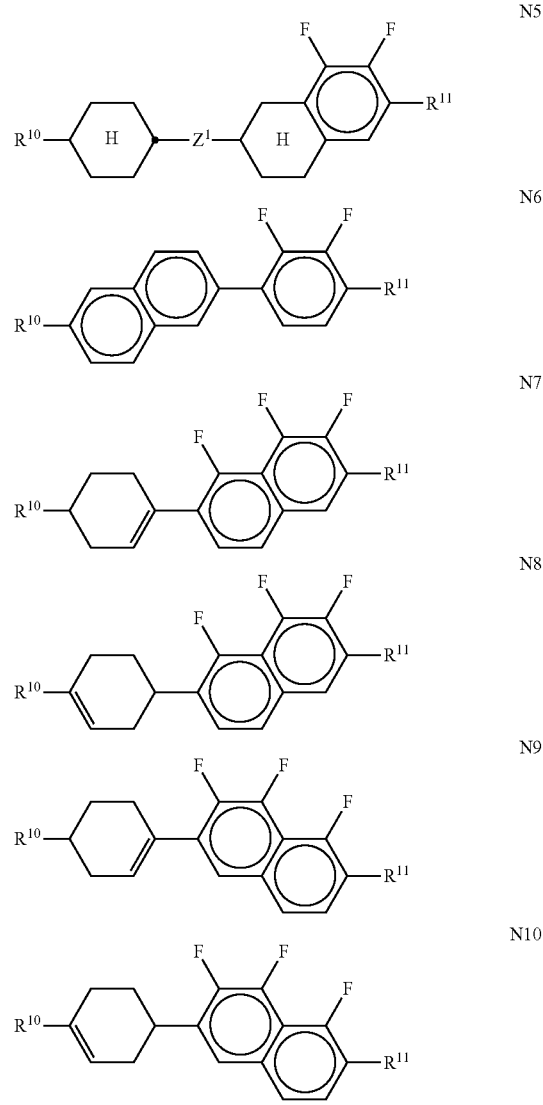

in which
R¹⁰ and R¹¹ each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, preferably alkyl or alkoxy having 1 to 6 C atoms,
and R¹⁰ and R¹¹ preferably denote straight-chain alkyl or alkoxy having 1 to 6 C atoms or straight-chain alkenyl having 2 to 6 C atoms, and
Z¹ and Z² each, independently of one another, denote —C₂H₄—, —CH=CH—, —(CH₂)₄—, —(CH₂)₃O—, —O(CH₂)₃—, —CH=CH—CH₂CH₂—, —CH₂CH₂CH=CH—, —CH₂O—, —OCH₂—, —CO—O—, —O—CO—, —C₂F₄—, —CF=CF—, —CF=CH—, —CH=CF—, —CH₂— or a single bond.

q) LC medium wherein component B) or the LC host mixture additionally comprises one or more difluorodibenzochromans and/or chromans of the following formulae:

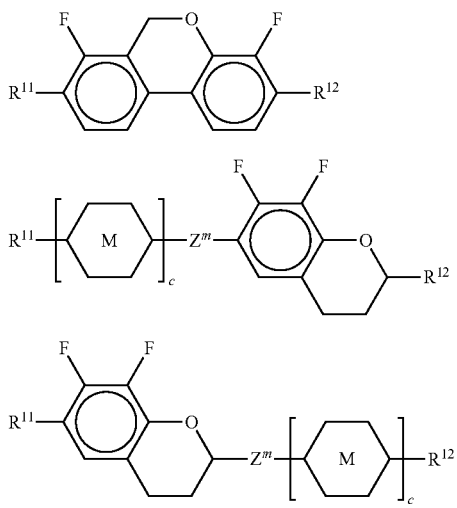

BC

CR

RC in which

R[11] and R[12] each, independently of one another, have one of the meanings indicated above for R[11], ring M is trans-1,4-cyclohexylene or 1,4-phenylene, $Z^m$ —$C_2H_4$—, —$CH_2O$—, —$OCH_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

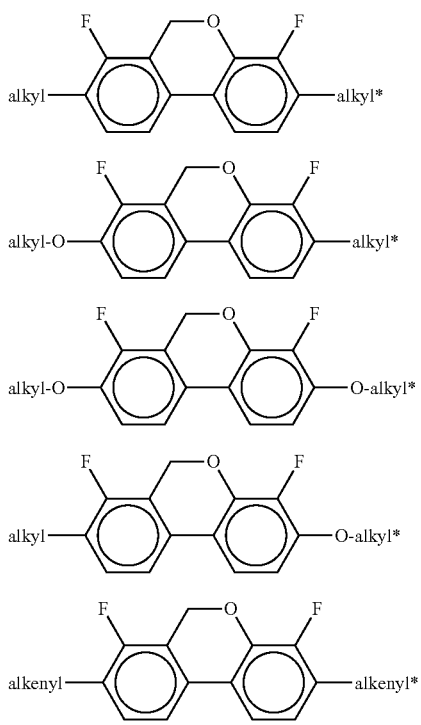

BC1

BC2

BC3

BC4

BC5

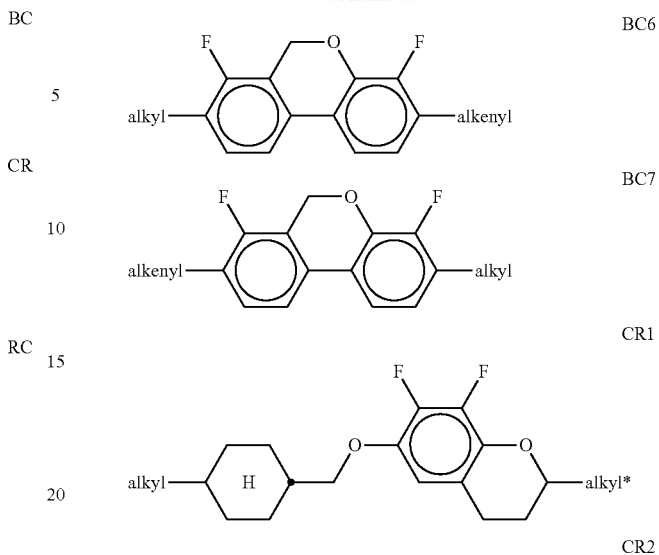

BC6

BC7

CR1

CR2

CR3

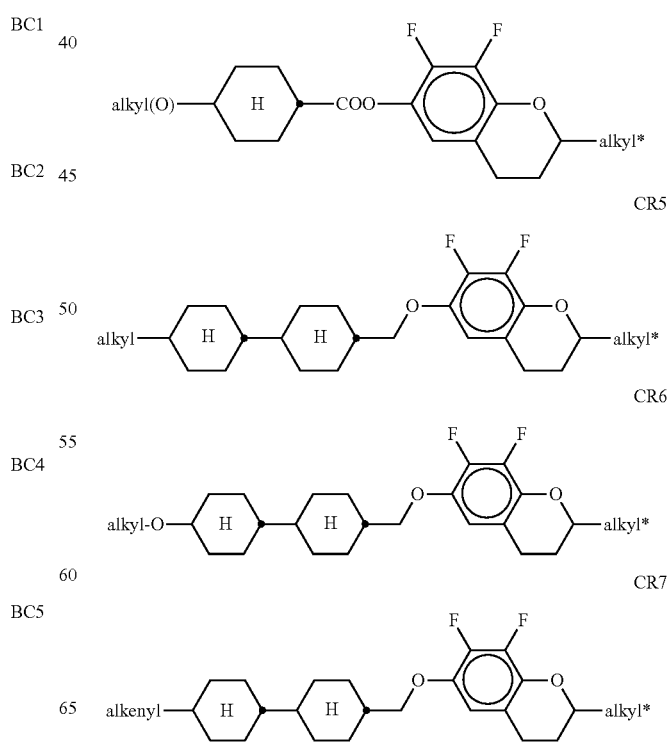

CR4

CR5

CR6

CR7

-continued

CR8
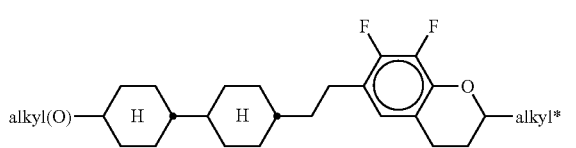

CR9
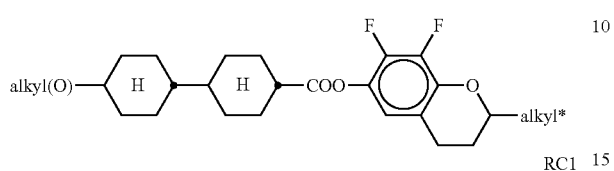

RC1
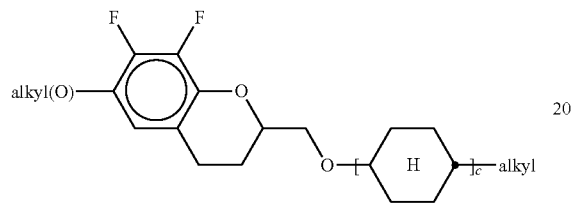

RC2
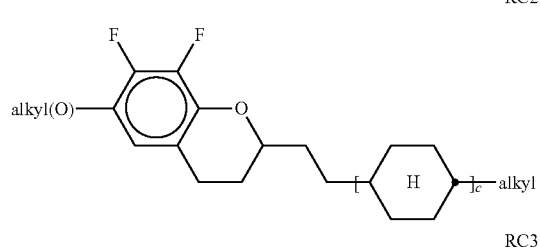

RC3
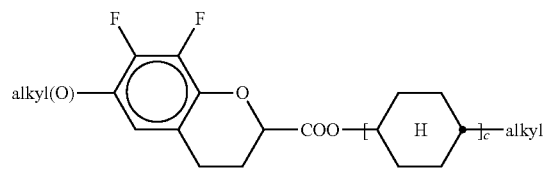

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very particular preference is given to LC host mixtures comprising one, two or three compounds of the formula BC-2.

r) LC medium wherein component B) or the LC host mixture additionally comprises one or more fluorinated phenanthrenes and/or dibenzofurans of the following formulae:

PH
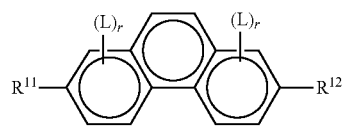

-continued

BF
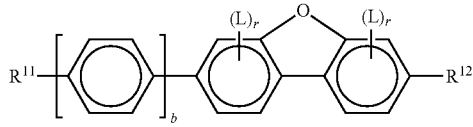

in which R$^{11}$ and R$^{12}$ each, independently of one another, have one of the meanings indicated above for R$^{11}$, b denotes 0 or 1, L denotes F, and r denotes 1, 2 or 3.

Particularly preferred compounds of the formulae PH and BF are selected from the group consisting of the following sub-formulae:

PH1
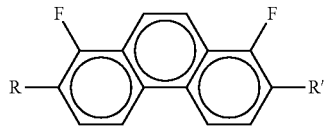

PH2
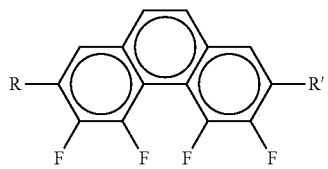

BF1
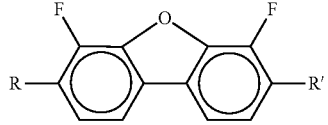

BF1a
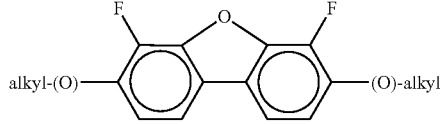

in which R and R' each, independently of one another, denote a straight-chain alkyl or alkoxy radical having 1-7 C atoms.

Preferably the component B) or the LC host mixture comprises one or more compounds of formula BF1, preferably selected of subformula BF1a BF1a
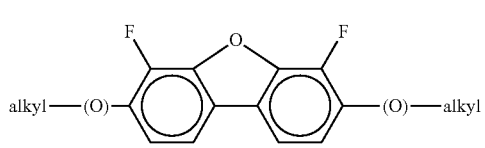

wherein alkyl denotes a straight-chain alkyl radical having 1-6 C atoms, and (O) denotes an oxygen atom or a single bond. Very preferred are compounds of formula BF1a wherein both groups (O) denote an oxygen atom and alkyl is methyl, ethyl, propyl, butyl of pentyl or hexyl, which are preferably straight-chained.

Preferably the proportion of compounds of formula BF1 or BF1a in the LC medium is from 0.5 to 20%, very preferably from 0.5 to 10%, most preferably from 1 to 5%.

Preferably the LC medium contains 1 to 5, preferably 1, 2 or 3 compounds of formula BF1 or BF1a.

s) LC medium wherein component B) or the LC host mixture additionally comprises one or more monocyclic compounds of the following formula

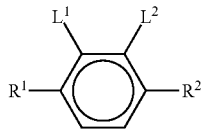
Y wherein $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

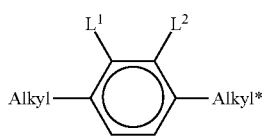
Y1

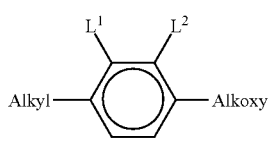
Y2

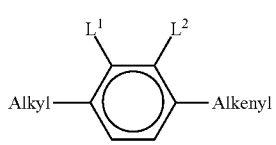
Y3

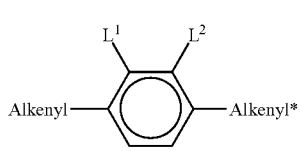
Y4

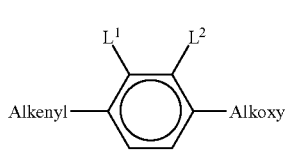
Y5

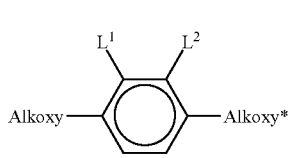
Y6

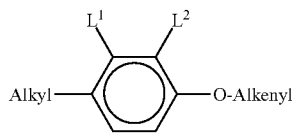
Y7

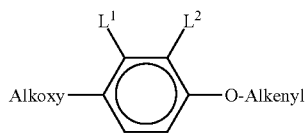
Y8

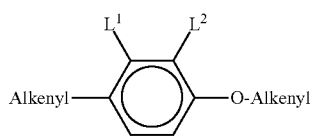
Y9

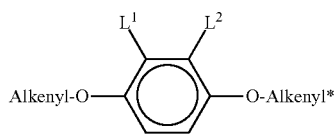
Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Particularly preferred compounds of the formula Y are selected from the group consisting of the following sub-formulae:

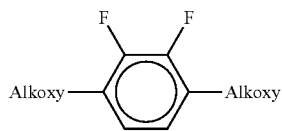
Y6A

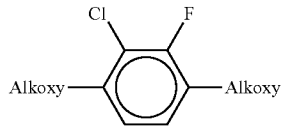
Y6B wherein Alkoxy preferably denotes straight-chain alkoxy with 3, 4, or 5 C atoms.

t) LC medium which, apart from the polymerizable compounds as described above and below, does not contain a compound which contains a terminal vinyloxy group (—O—CH=$CH_2$).

u) LC medium wherein component B) or the LC host mixture comprises 1 to 8, preferably 1 to 5, compounds of the formulae CY1, CY2, PY1 and/or PY2. The proportion of these compounds in the LC host mixture as a whole is preferably 5 to 70%, particularly preferably 10 to 35%. The content of these individual compounds is preferably in each case 2 to 20%.

v) LC medium wherein component B) or the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 20%.

w) LC medium wherein component B) or the LC host mixture comprises 1 to 10, preferably 1 to 8, compounds of the formula ZK, in particular compounds of the formulae ZK1, ZK2 and/or ZK6. The proportion of these compounds in the LC host mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the LC host mixture as a whole is greater than 70%, preferably greater than 80%.

y) LC medium in which the LC host mixture contains one or more compounds containing an alkenyl group, preferably selected from formulae AN and AY, very preferably selected from formulae AN1, AN3 and AN6, most preferably from formulae AN1a, AN3a and AN6a. The concentration of these compounds in the LC host mixture is preferably from 2 to 70%, very preferably from 3 to 55%.

z1) LC medium wherein component B) or the LC host mixture contains one or more, preferably 1 to 5, compounds selected of formula PY1-PY8, very preferably of formula PY2. The proportion of these compounds in the LC host mixture as a whole is preferably 1 to 30%, particularly preferably 2 to 20%. The content of these individual compounds is preferably in each case 1 to 20%.

z2) LC medium wherein component B) or the LC host mixture contains one or more, preferably 1, 2 or 3, compounds selected from formulae T1, T2, T3, T5 and T21, very preferably from formula T2. The content of these compounds in the LC host mixture as a whole is preferably 1 to 20%.

z3) LC medium in which the LC host mixture contains one or more compounds selected from formulae CY and PY, one or more compounds selected from formulae AN and AY, and one or more compounds of formula ZK.

z4) LC medium in which the LC host mixture contains one or more, preferably 1, 2 or 3, compounds of formula A, preferably of formula A1, one or more, preferably 1, 2 or 3, compounds of formula BF1, preferably of formula BF1a, and one or more, preferably 1, 2 or 3, compounds of formula PY2. The proportion of the compounds of formula A or A1 in the LC host mixture is preferably from 0.05 to 2%, very preferably from 0.1 to 1%. The proportion of the compounds of formula BF1 or BF1a in the LC host mixture is preferably from 0.5 to 10%, very preferably from 1 to 5%. The proportion of the compounds of formula PY2 in the LC host mixture is preferably from 1 to 20%, very preferably from 10 to 20%.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The LC media and LC host mixtures of the present invention preferably have a nematic phase range of at least 80 K, particularly preferably at least 100 K, and a rotational viscosity ≤250 mPa·s, preferably ≤200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy, in particular for use in displays of the PS-VA and PS-UB-FFS type, have a negative dielectric anisotropy Δε, preferably from −0.5 to −10, in particular from −2.5 to −7.5, at 20° C. and 1 kHz.

The birefringence Δn in LC media according to the invention for use in displays of the PS-VA and PS-UB-FFS type is preferably below 0.16, particularly preferably from 0.06 to 0.14, very particularly preferably from 0.07 to 0.12.

The LC media according to the invention may also comprise further additives which are known to the person skilled in the art and are described in the literature, such as, for example, polymerization initiators, inhibitors, stabilizers, surface-active substances or chiral dopants. These may be polymerizable or non-polymerizable. Polymerizable additives are accordingly ascribed to the polymerizable component or component A). Non-polymerizable additives are accordingly ascribed to the non-polymerizable component or component B).

In a preferred embodiment the LC media contain one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(n, m, z: in each case, independently of one another, 1, 2, 3, 4, 5 or 6)

TABLE A

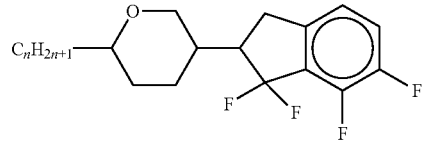

AIK—n-F

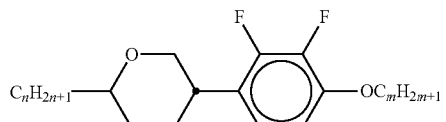

AIY—n-Om

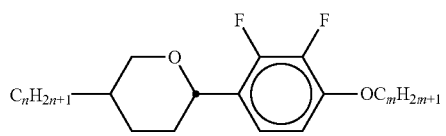

AY—n-Om

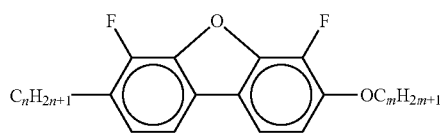

B—nO—Om

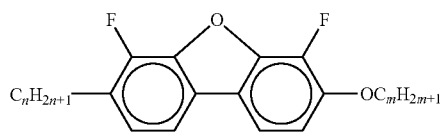

B—n-Om

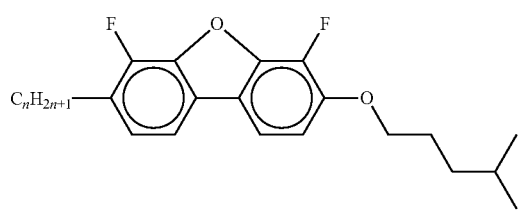

B—nO—O5i

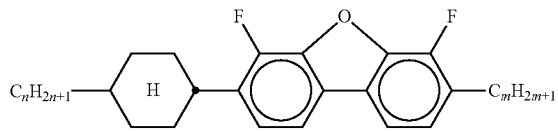

CB—n-m

TABLE A-continued
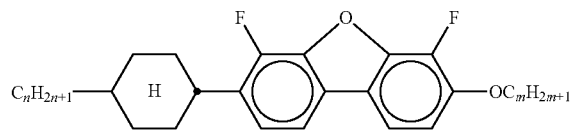
CB—n-Om
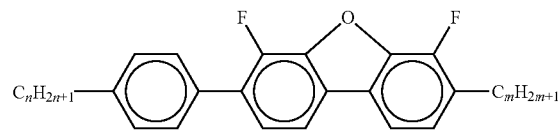
PB—n-m
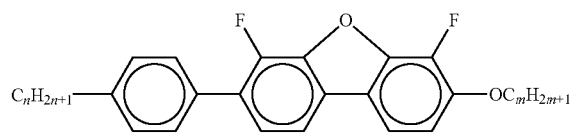
PB—n-Om
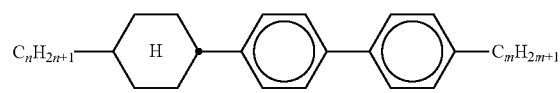
BCH—nm
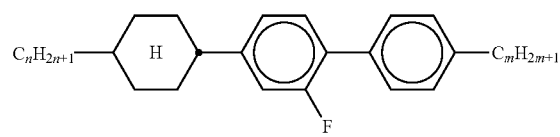
BCH—nmF
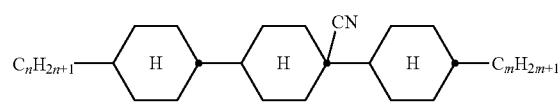
BCN—nm
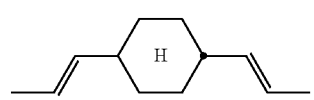
C-1V-V1
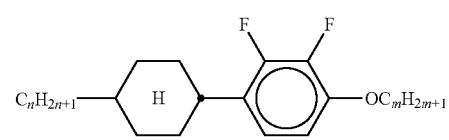
CY—n-Om
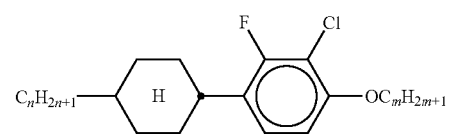
CY(F,Cl)—n-Om TABLE A-continued
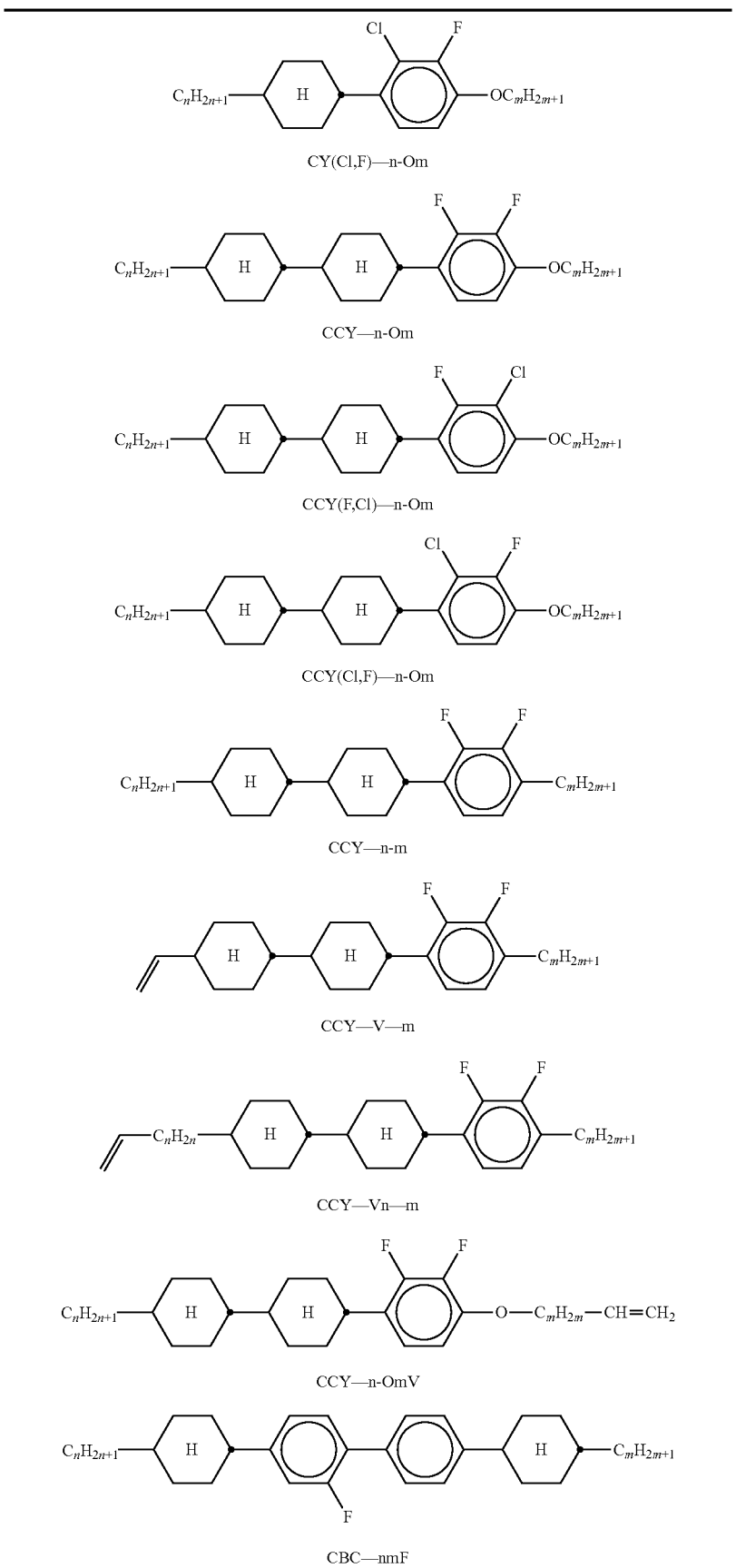

TABLE A-continued
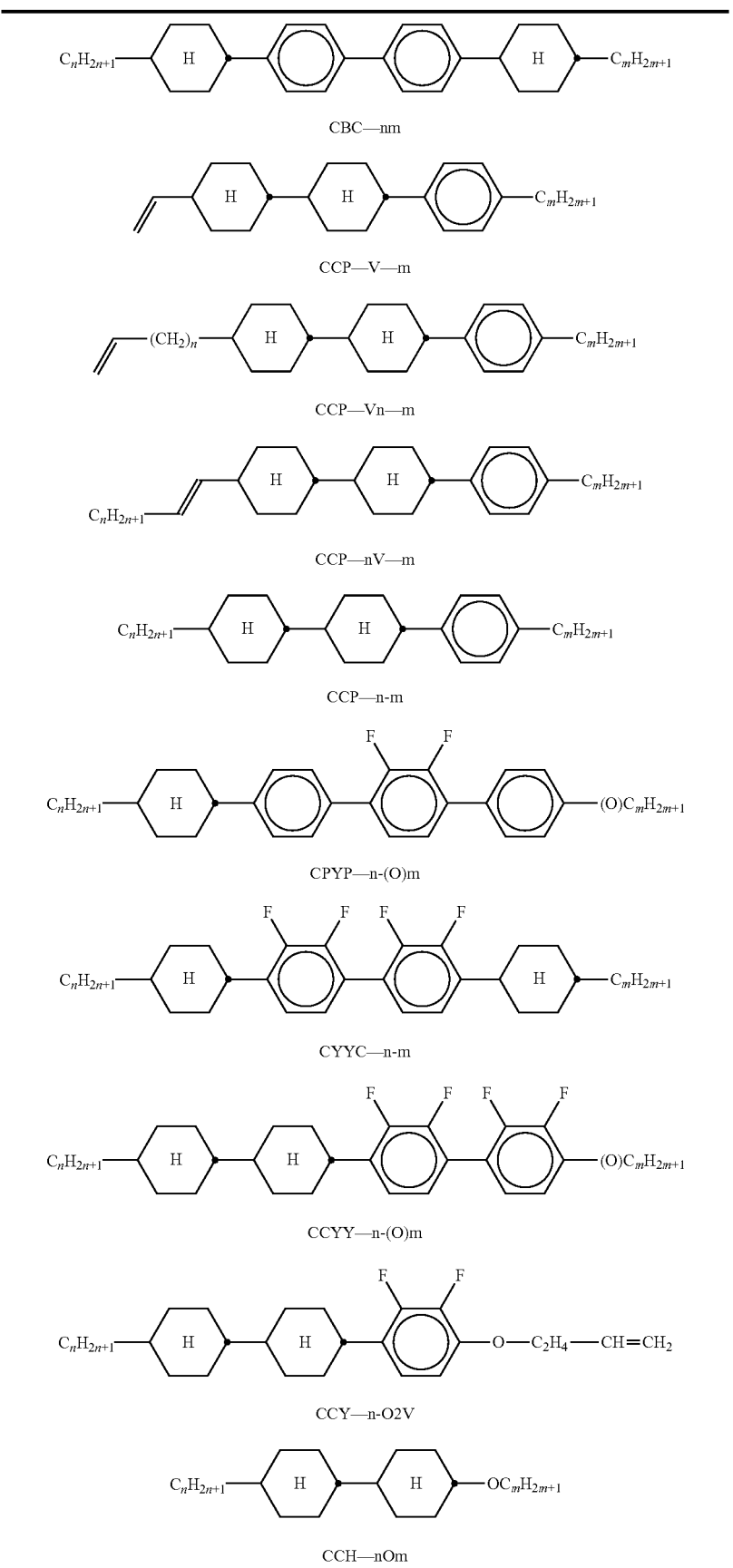

TABLE A-continued
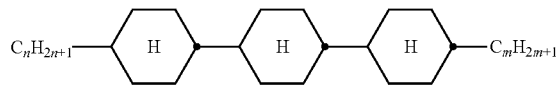
CCC—n-m
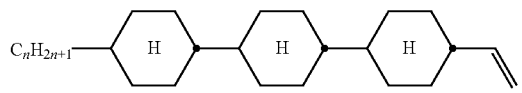
CCC—n-V
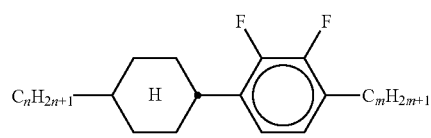
CY—n-m
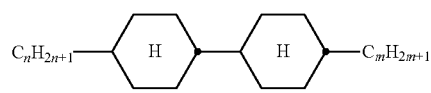
CCH—nm
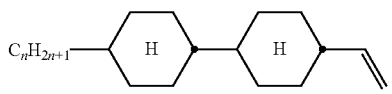
CC—n-V
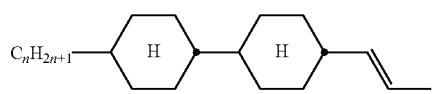
CC—n-V1
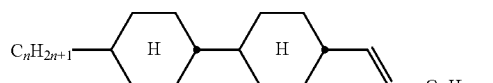
CC—n-Vm
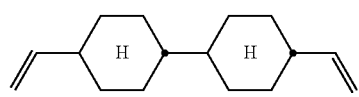
CC—V—V
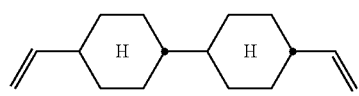
CC—V—V1
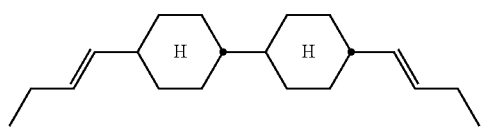
CC—2V—V2

TABLE A-continued
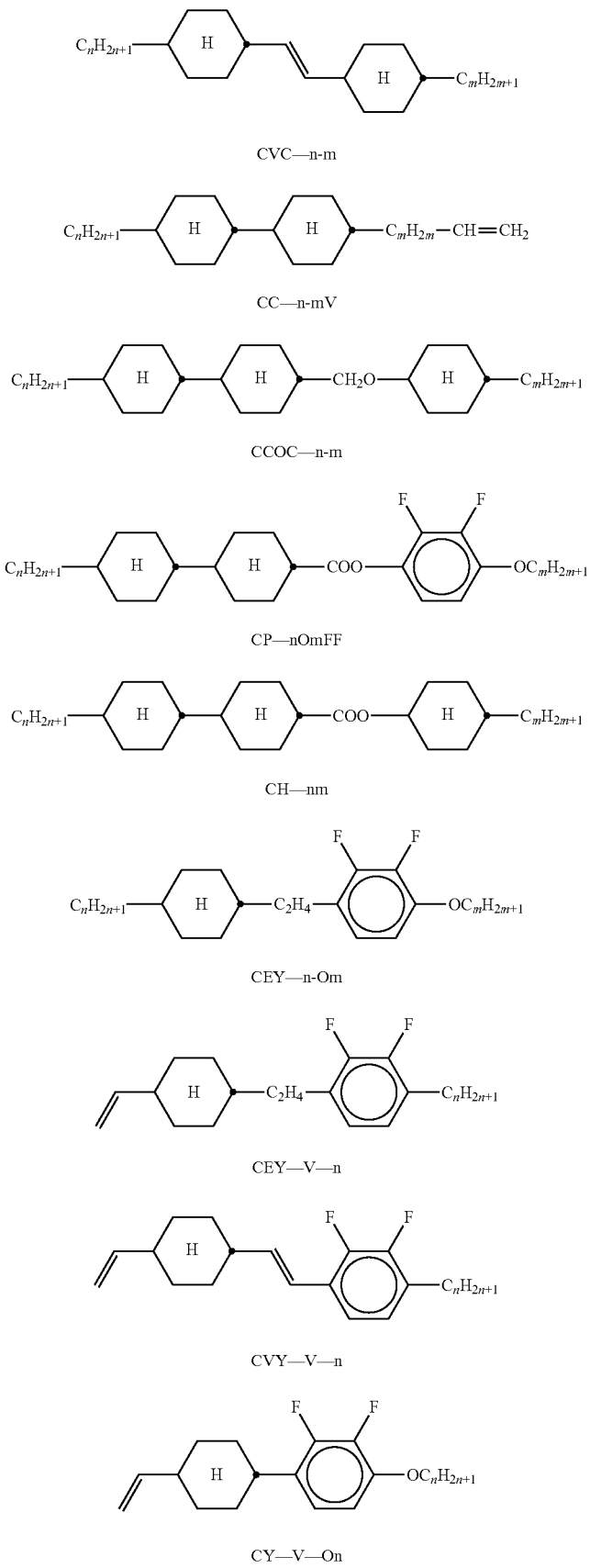

TABLE A-continued
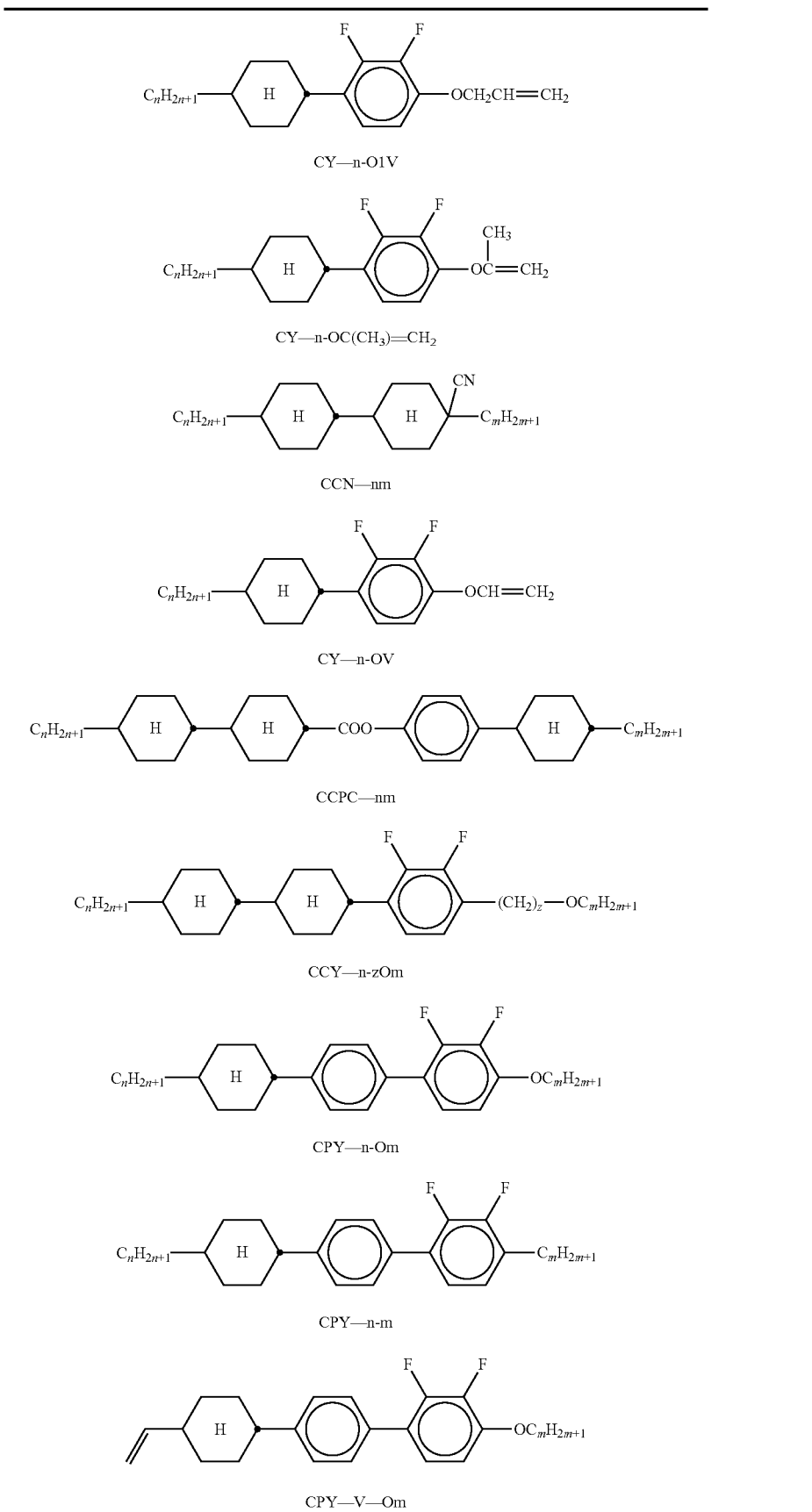

TABLE A-continued
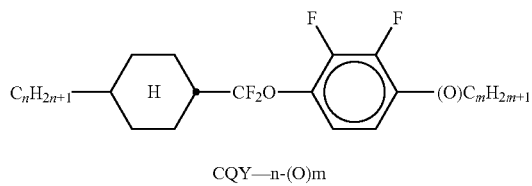
CQY—n-(O)m
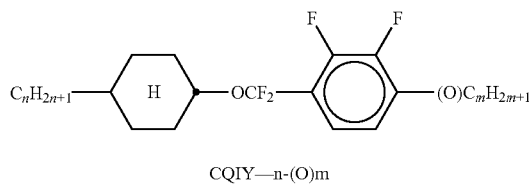
CQIY—n-(O)m
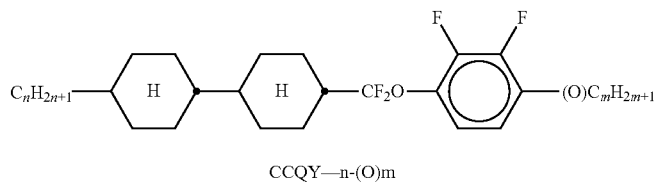
CCQY—n-(O)m
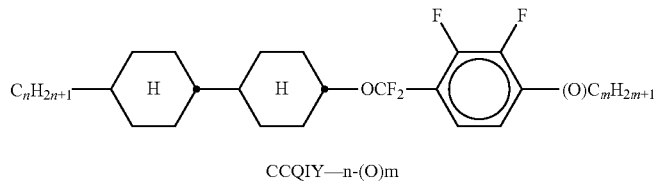
CCQIY—n-(O)m
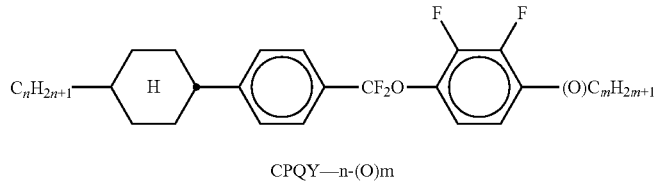
CPQY—n-(O)m
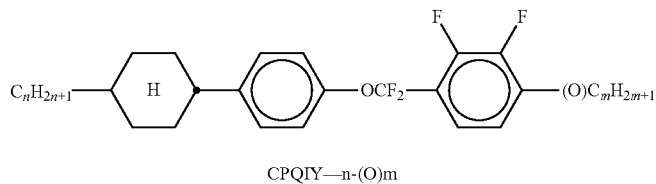
CPQIY—n-(O)m
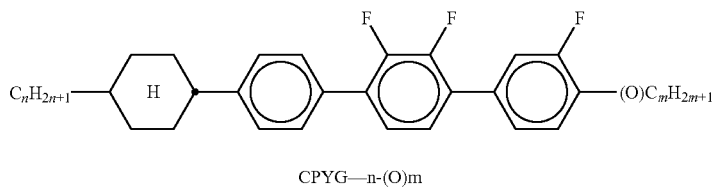
CPYG—n-(O)m
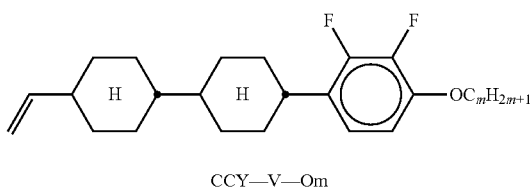
CCY—V—Om TABLE A-continued
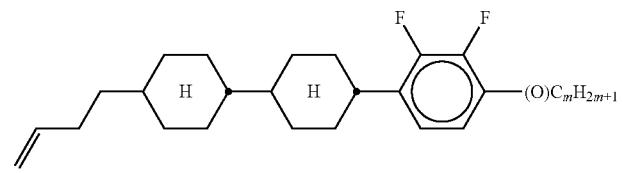
CCY—V2—(O)m
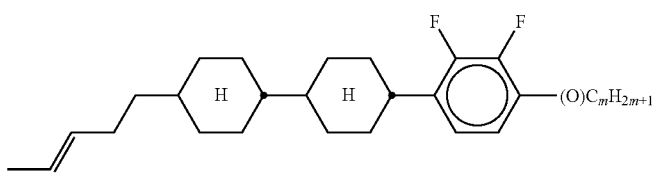
CCY—1V2—(O)m
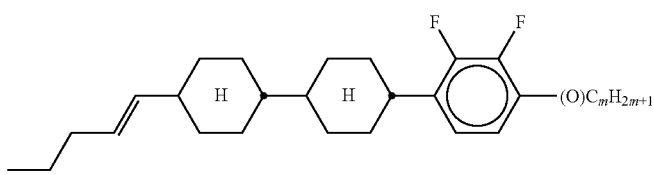
CCY—3V—(O)m
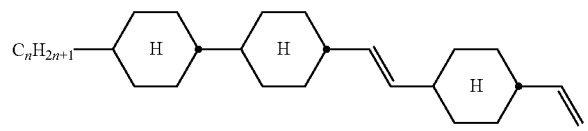
CCVC—n-V
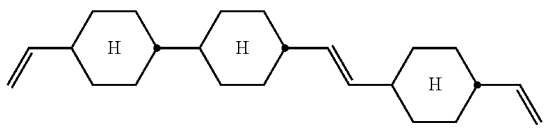
CCVC—V—V
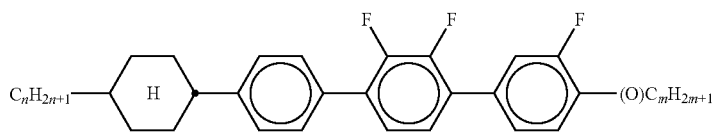
CPYG—n-(O)m
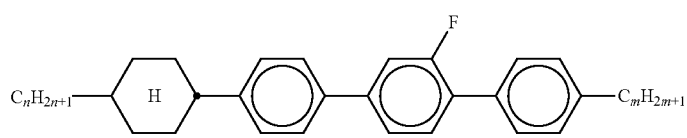
CPGP—n-m
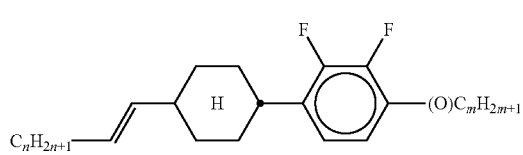
CY—nV—(O)m TABLE A-continued
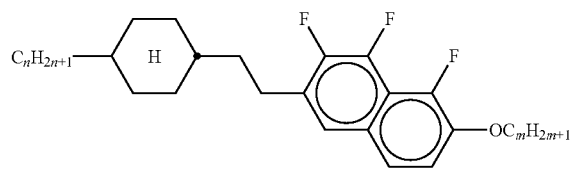
CENaph—n-Om
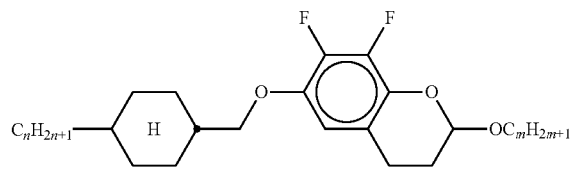
COChrom—n-Om
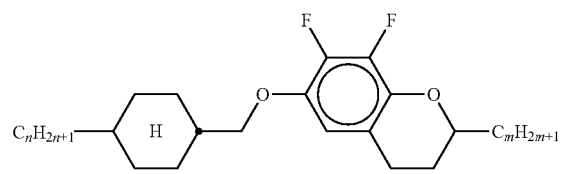
COChrom—n-m
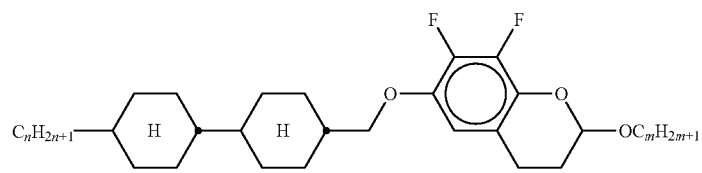
CCOChrom—n-Om
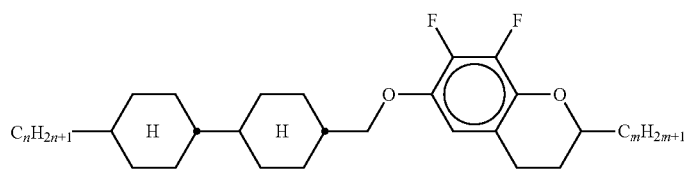
CCOChrom—n-m
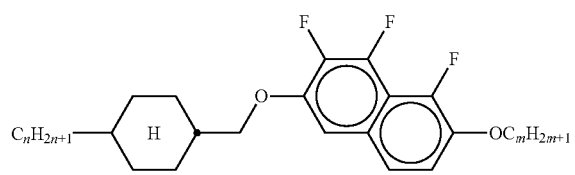
CONaph—n-Om
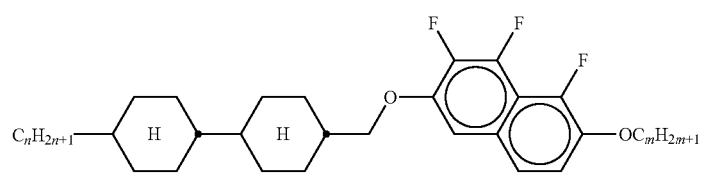
CCONaph—n-Om TABLE A-continued
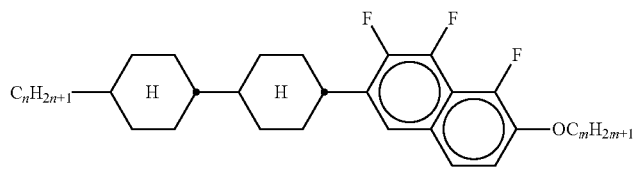
CCNaph—n-Om
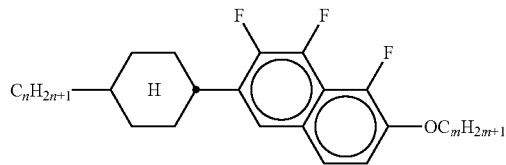
CNaph—n-Om
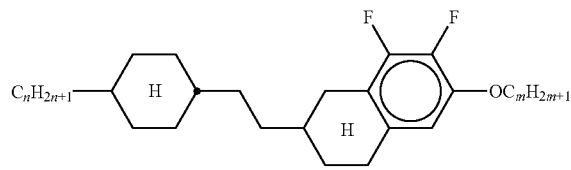
CETNaph—n-Om
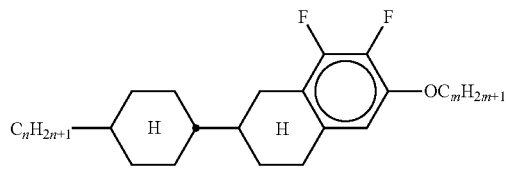
CTNaph—n-Om
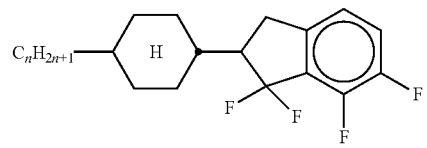
CK—n-F
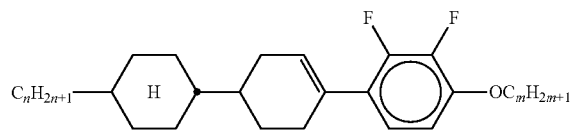
CLY—n-Om
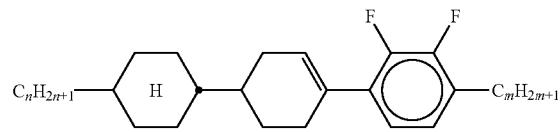
CLY—n-m
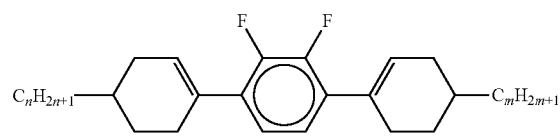
LYLI—n-m TABLE A-continued
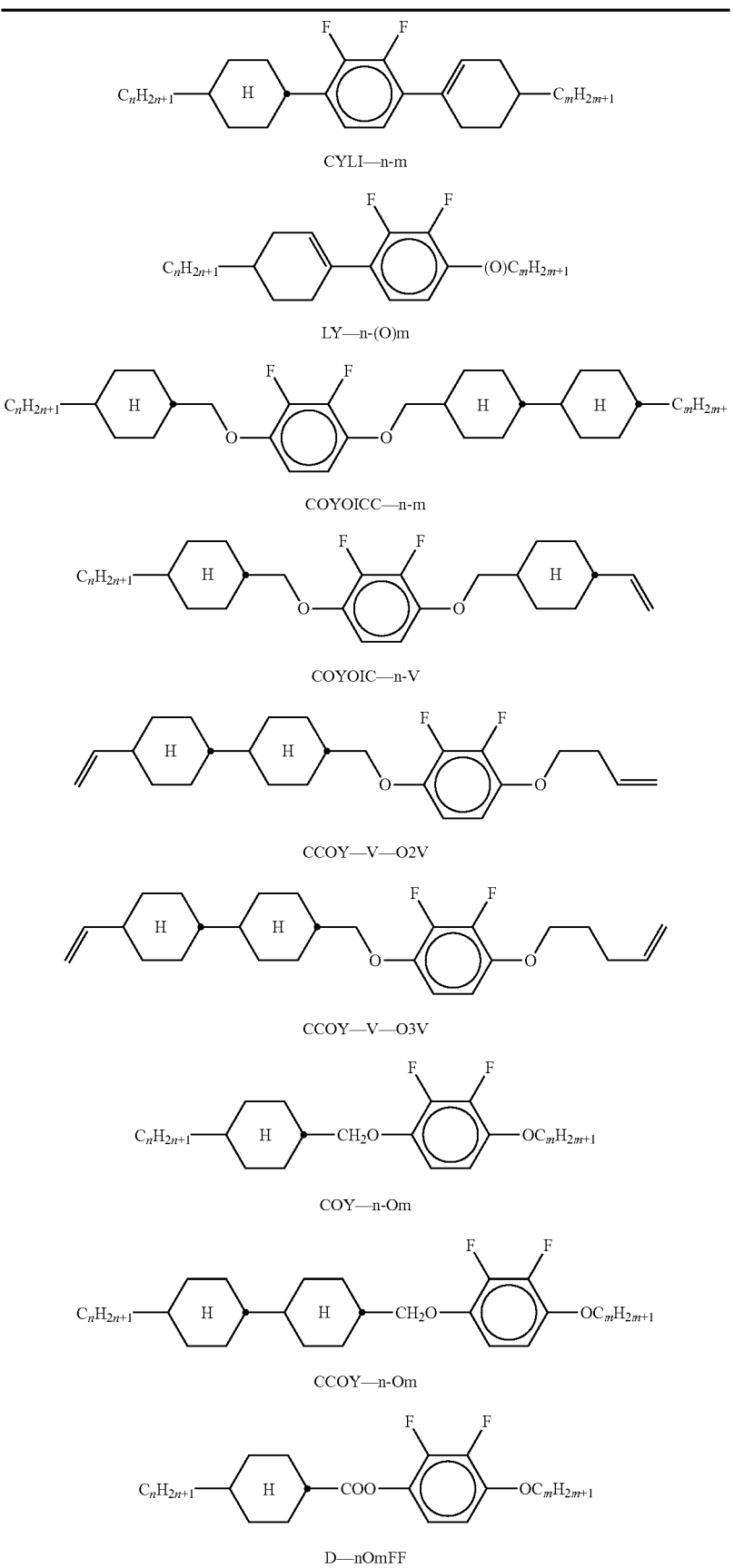

TABLE A-continued
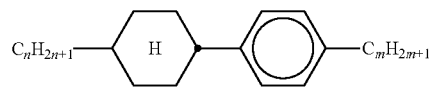
PCH—nm
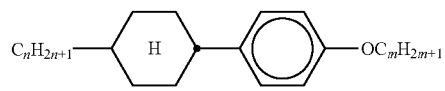
PCH—nOm
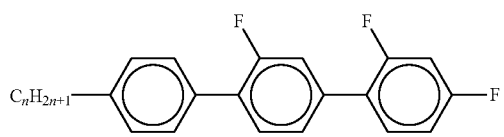
PGIGI—n-F
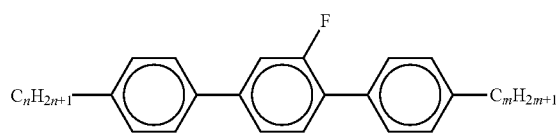
PGP—n-m
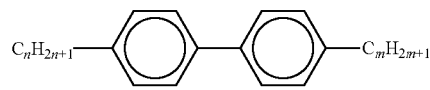
PP—n-m
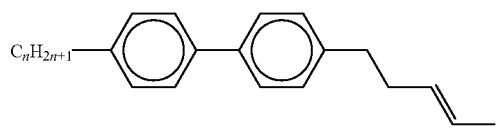
PP—n-2V1
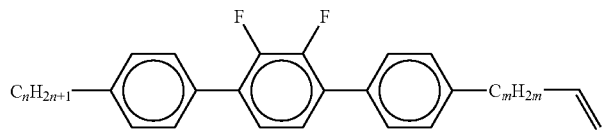
PYP—n-mV
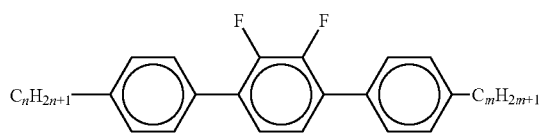
PYP—n-m
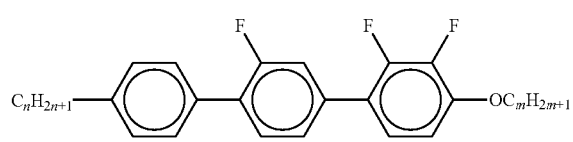
PGIY—n-Om TABLE A-continued
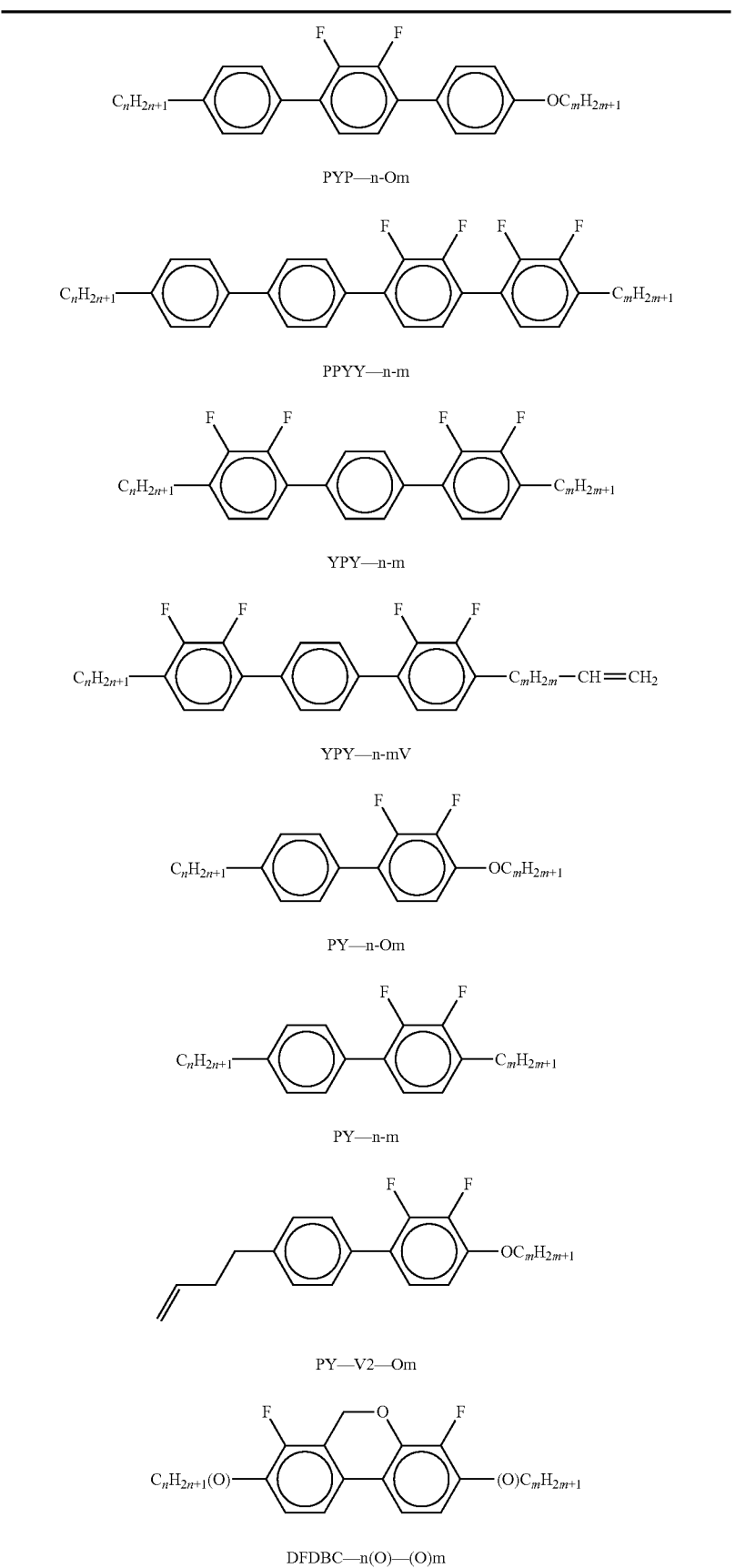

TABLE A-continued
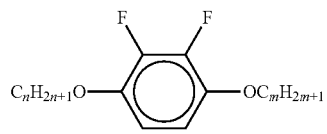
Y—nO—Om
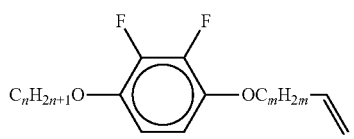
Y—nO—OmV
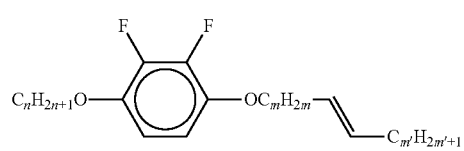
Y—nO—OmVm'
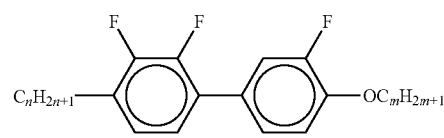
YG—n-Om
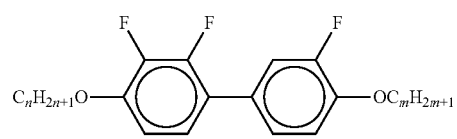
YG—nO—Om
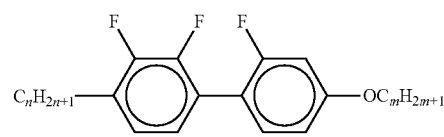
YGI—n-Om
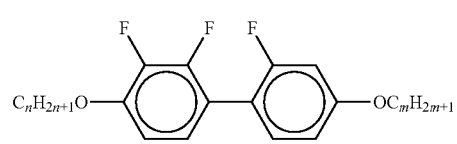
YGI—nO—Om
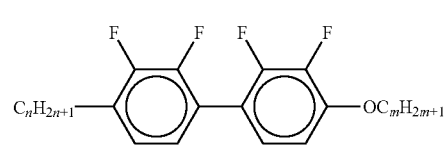
YY—n-Om TABLE A-continued
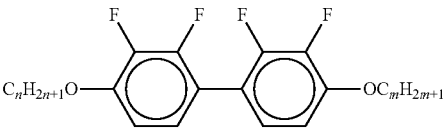
YY—nO—Om
In a preferred embodiment of the present invention, the LC media according to the invention comprise one or more compounds selected from the group consisting of compounds from Table A.
TABLE B
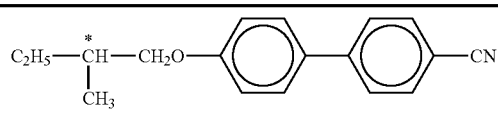
C 15
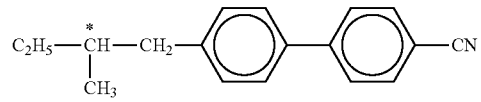
CB 15
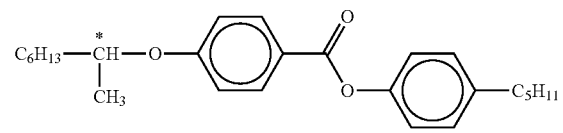
CM 21
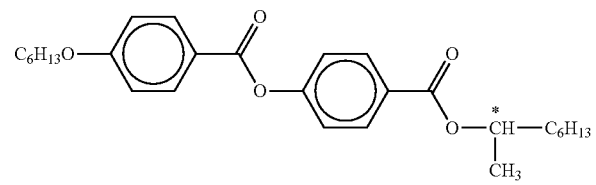
R/S-811
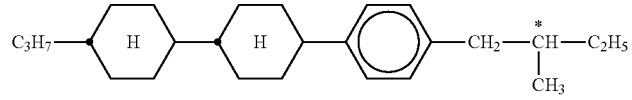
CM 44
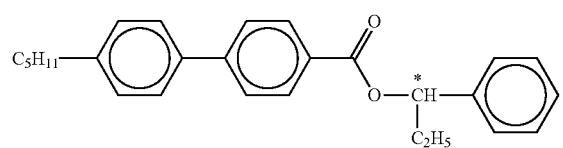
CM 45
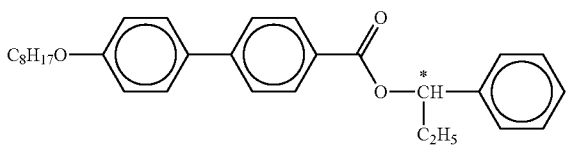
CM 47

TABLE B-continued
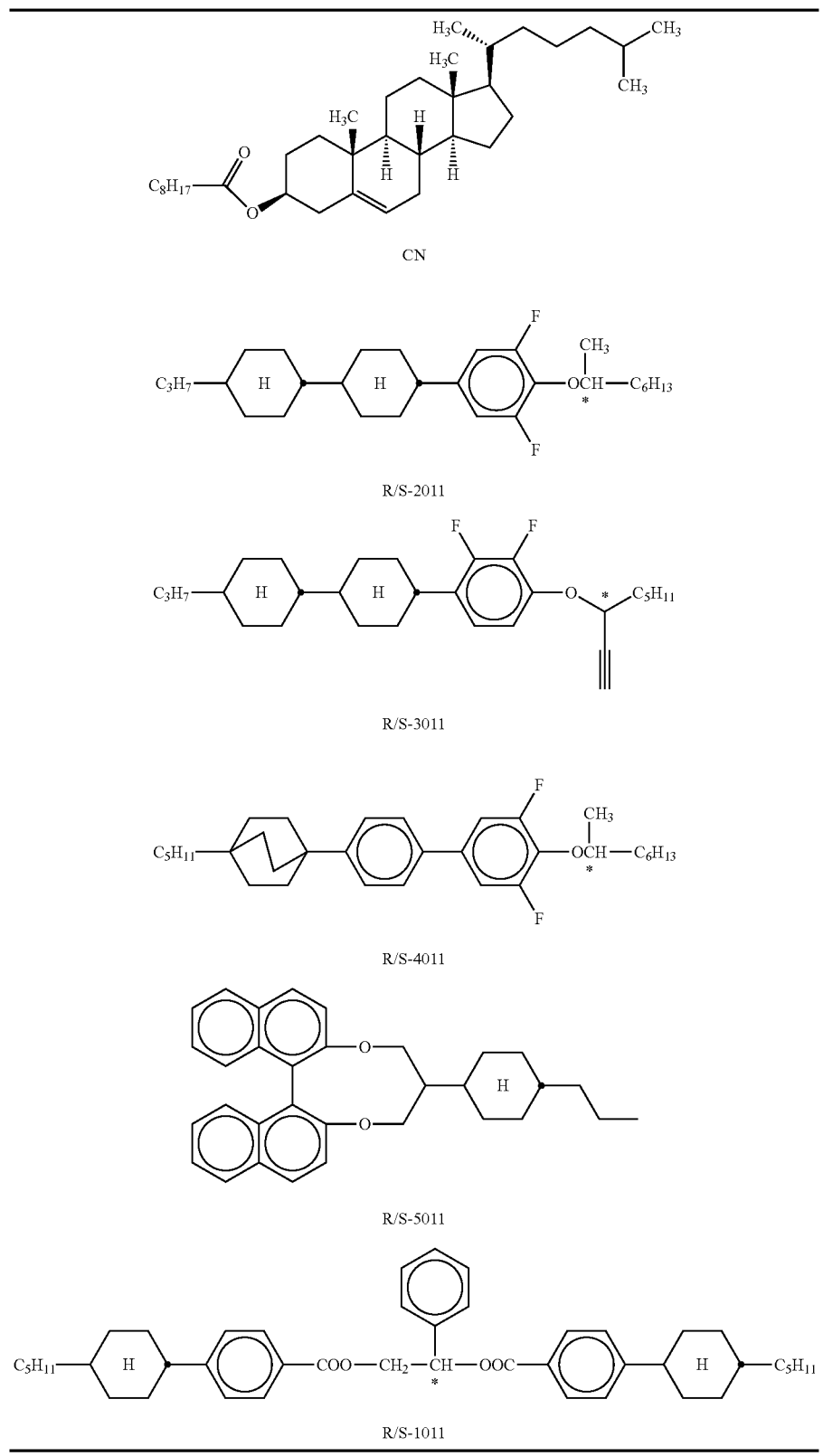
Table B shows possible chiral dopants which can be added to the LC media according to the invention.
The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C
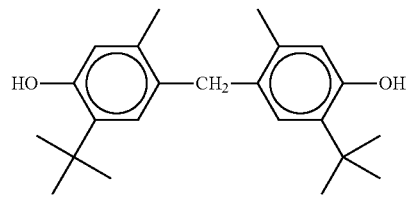
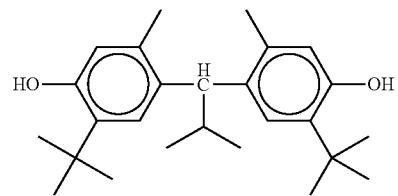
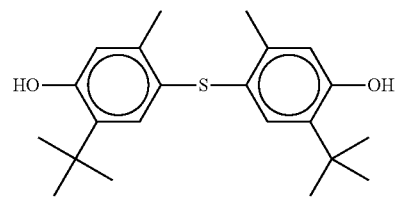
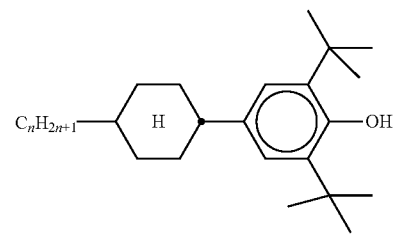
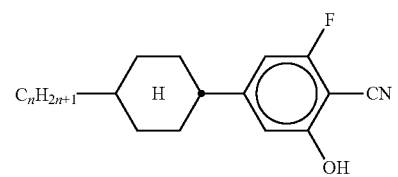
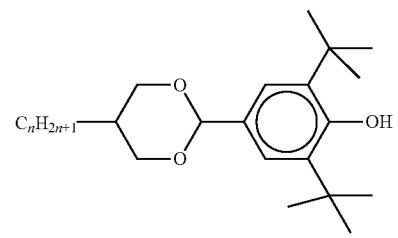
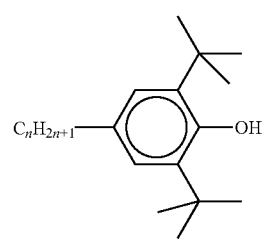

TABLE C-continued
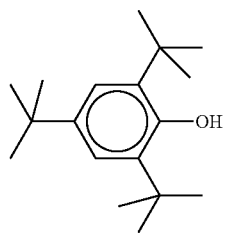
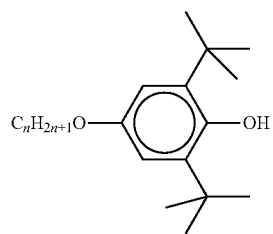
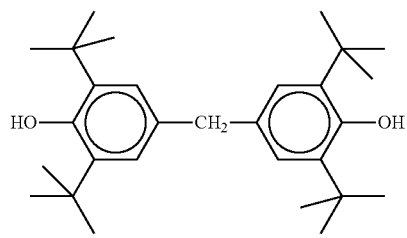
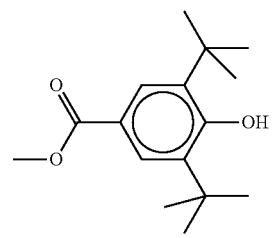
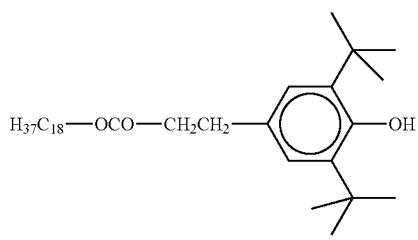
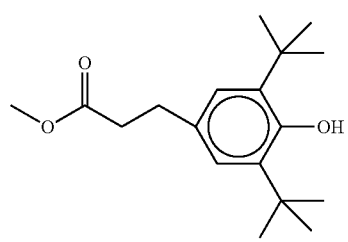

TABLE C-continued
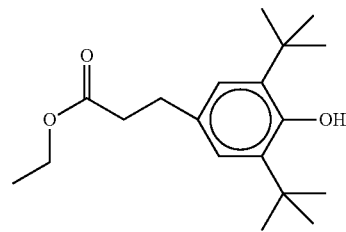
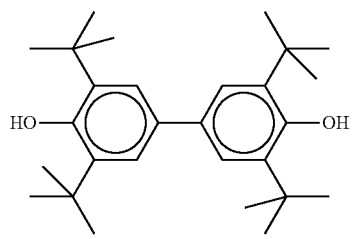
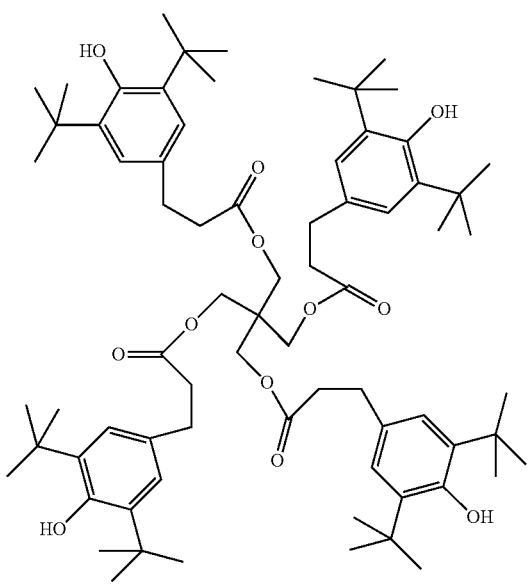 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
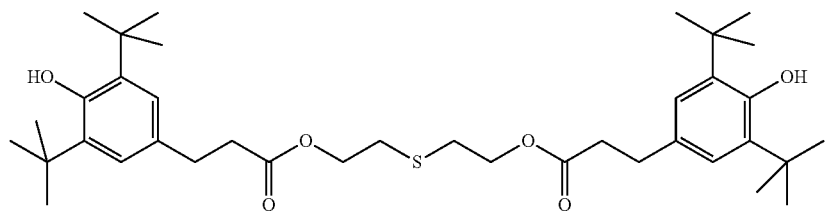 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
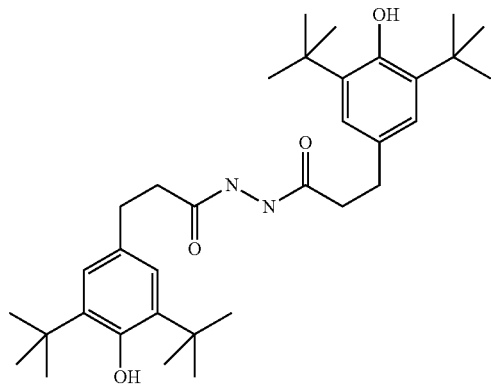 [SMILES: CC(C)(C)c1cc(CCC(=O)NNC(=O)CCc2cc(C(C)(C)C)c(O)c(C(C)(C)C)c2)cc(C(C)(C)C)c1O]
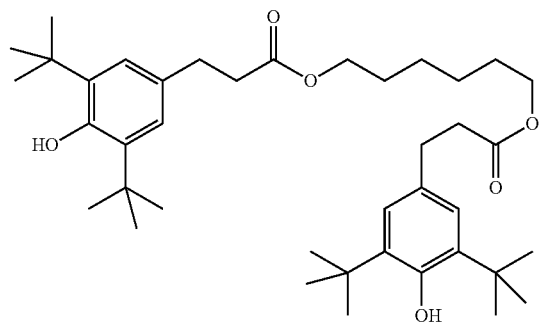 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
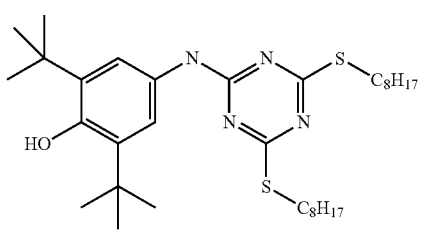
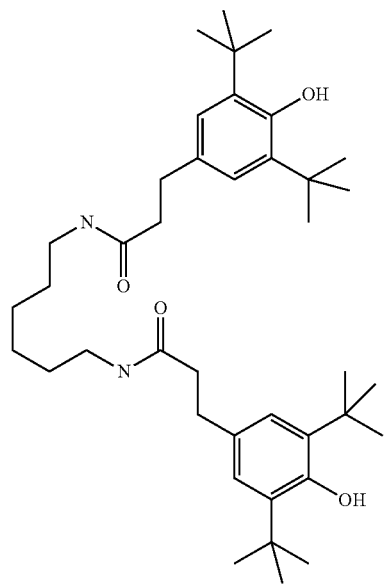 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
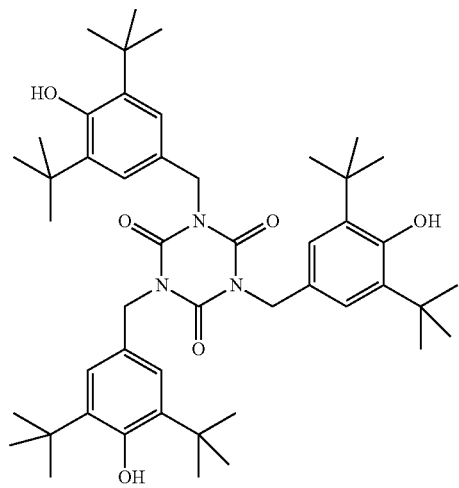 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
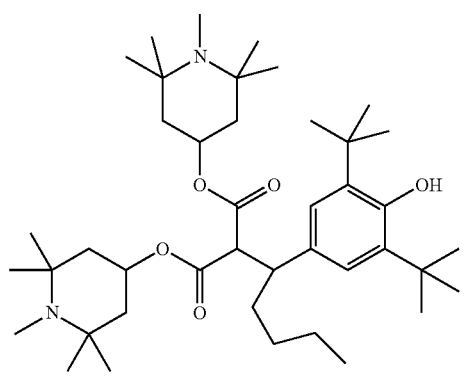 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
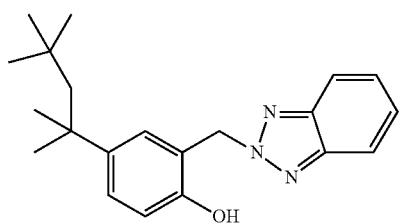 [SMILES: CC(C)(C)CC(C)(C)c1ccc(O)c(Cn2nc3ccccc3n2)c1]
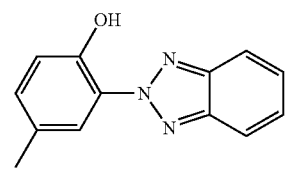 [SMILES: Cc1ccc(O)c(-n2nc3ccccc3n2)c1]
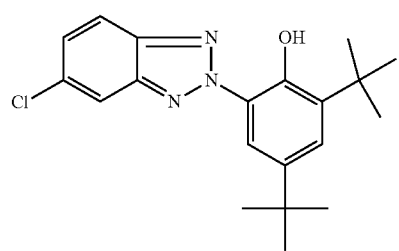 [SMILES: CC(C)(C)c1cc(-n2nc3ccc(Cl)cc3n2)c(O)c(C(C)(C)C)c1]

TABLE C-continued
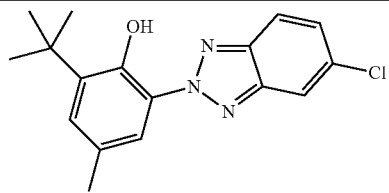
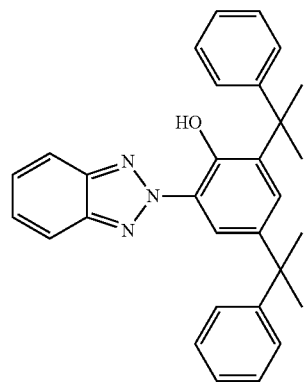 [SMILES: CC(C)(c1ccccc1)c1cc(-n2nc3ccccc3n2)c(O)c(C(C)(C)c2ccccc2)c1]
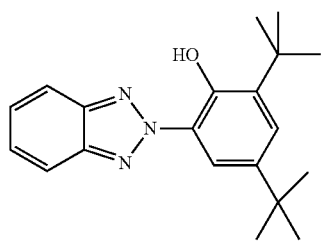 [SMILES: CC(C)(C)c1cc(-n2nc3ccccc3n2)c(O)c(C(C)(C)C)c1]
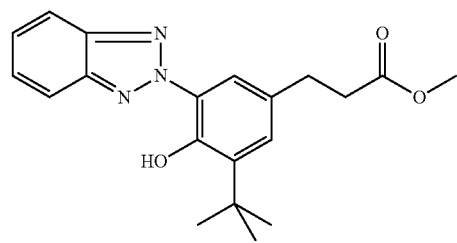 [SMILES: COC(=O)CCc1cc(-n2nc3ccccc3n2)c(O)c(C(C)(C)C)c1]
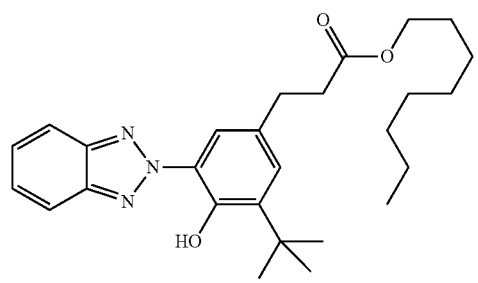 [SMILES: CCCCCCCCOC(=O)CCc1cc(-n2nc3ccccc3n2)c(O)c(C(C)(C)C)c1]

TABLE C-continued
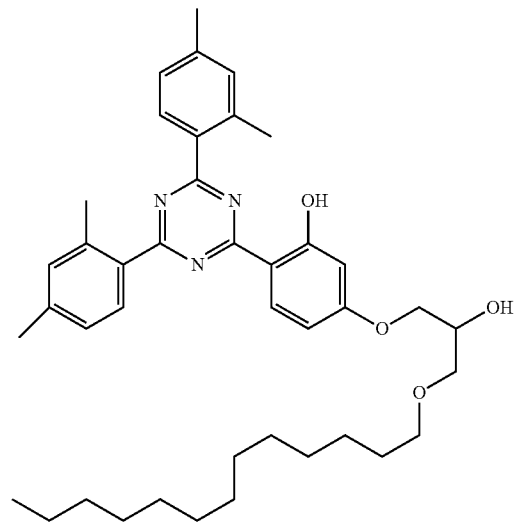 [SMILES: CCCCCCCCCCCCCOCC(O)COc1ccc(-c2nc(-c3ccc(C)cc3C)nc(-c3ccc(C)cc3C)n2)c(O)c1]
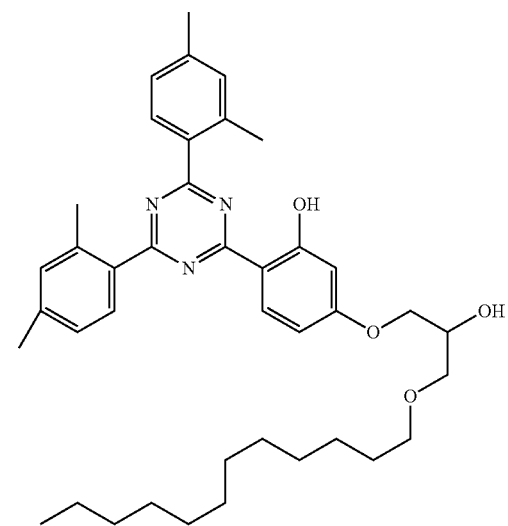 [SMILES: CCCCCCCCCCCCOCC(O)COc1ccc(-c2nc(-c3ccc(C)cc3C)nc(-c3ccc(C)cc3C)n2)c(O)c1]
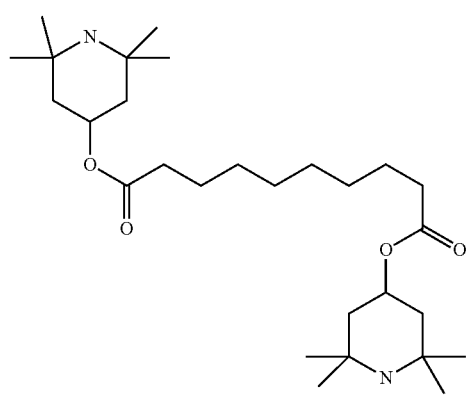

TABLE C-continued
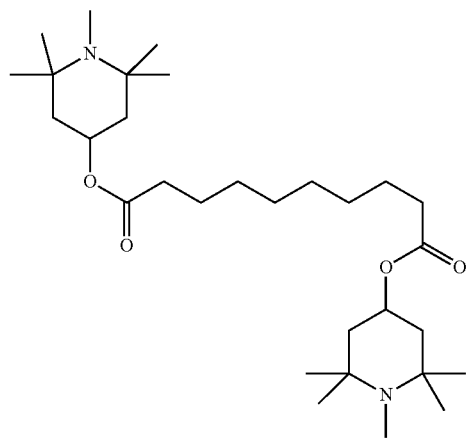
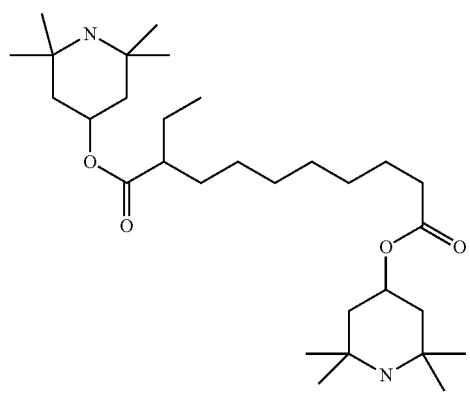
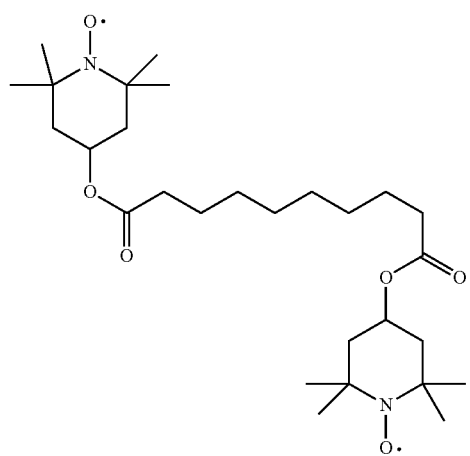

TABLE C-continued

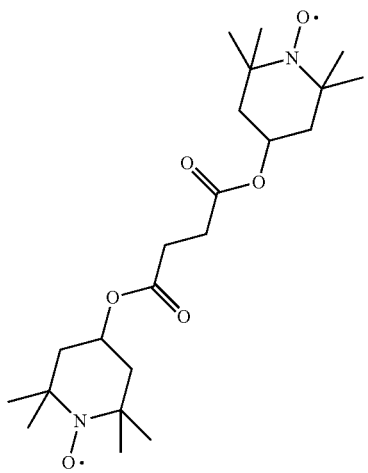

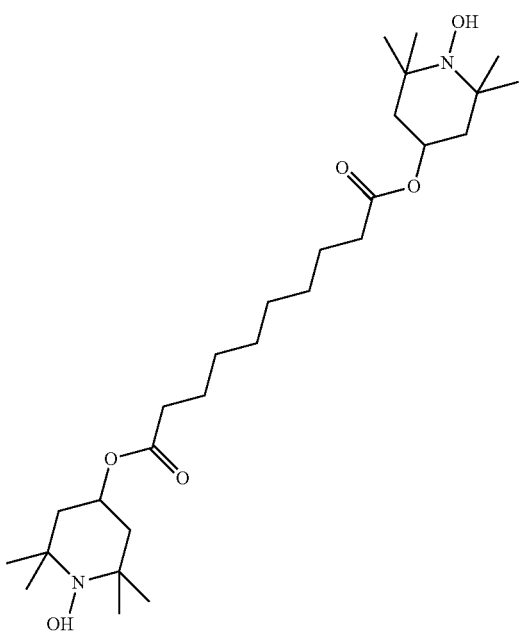

Table C shows possible stabilizers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilizers. The LC media preferably comprise one or more stabilizers selected from the group consisting of compounds from Table C.

TABLE D

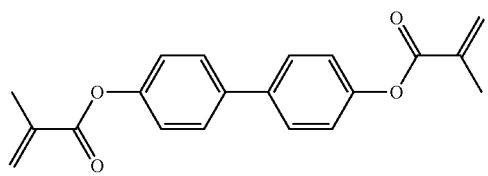

RM-1

TABLE D-continued
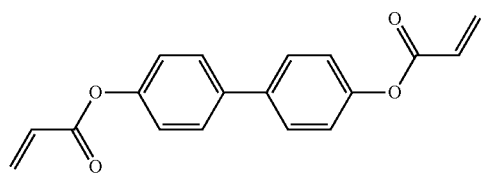 [SMILES: C=C(C)C(=O)Oc1ccc(-c2ccc(OC(=O)C(=C)C)cc2)cc1] RM-2
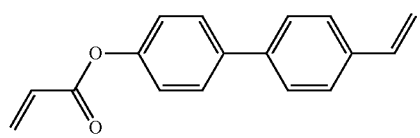 [SMILES: C=CC(=O)Oc1ccc(-c2ccc(C=C)cc2)cc1] RM-3
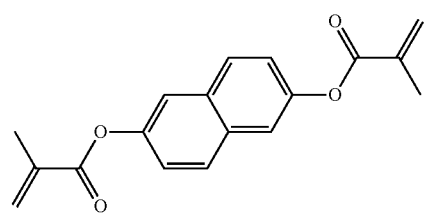 [SMILES: C=C(C)C(=O)Oc1ccc2cc(OC(=O)C(=C)C)ccc2c1] RM-4
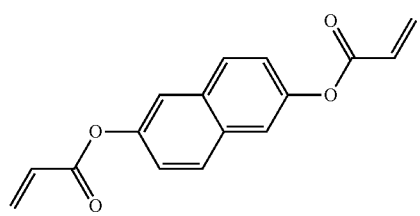 [SMILES: C=CC(=O)Oc1ccc2cc(OC(=O)C=C)ccc2c1] RM-5
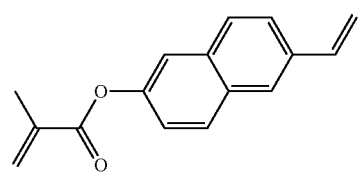 [SMILES: C=Cc1ccc2cc(OC(=O)C(=C)C)ccc2c1] RM-6
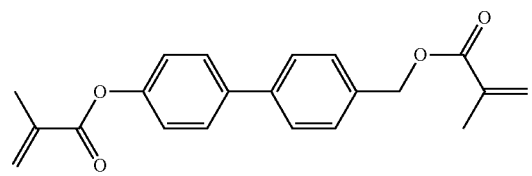 [SMILES: C=C(C)C(=O)OCc1ccc(-c2ccc(OC(=O)C(=C)C)cc2)cc1] RM-7
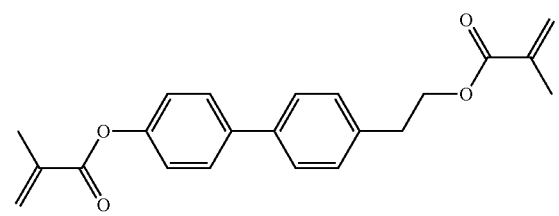 [SMILES: C=C(C)C(=O)OCCc1ccc(-c2ccc(OC(=O)C(=C)C)cc2)cc1] RM-8
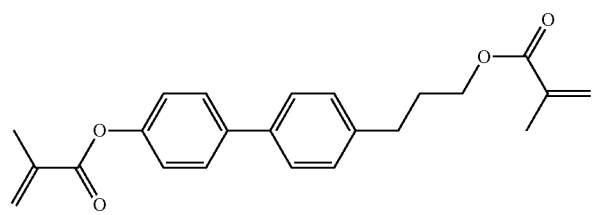 [SMILES: C=C(C)C(=O)OCCCc1ccc(-c2ccc(OC(=O)C(=C)C)cc2)cc1] RM-9

TABLE D-continued
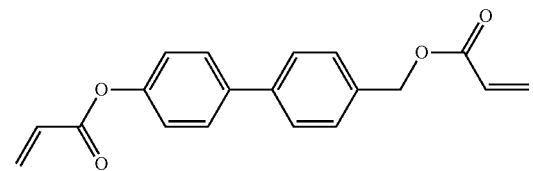 [SMILES: C=CC(=O)OCc1ccc(-c2ccc(OC(=O)C=C)cc2)cc1]
RM-10
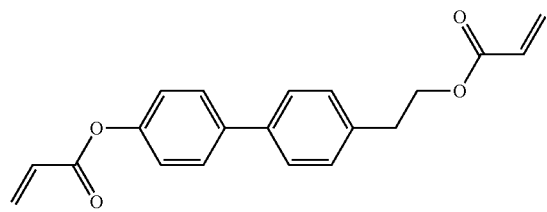 [SMILES: C=CC(=O)OCCc1ccc(-c2ccc(OC(=O)C=C)cc2)cc1]
RM-11
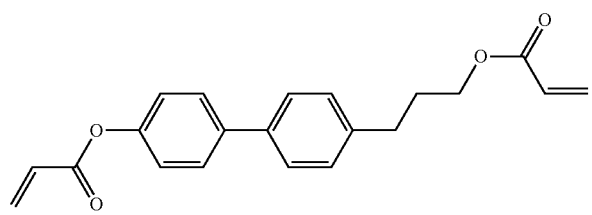 [SMILES: C=CC(=O)OCCCc1ccc(-c2ccc(OC(=O)C=C)cc2)cc1]
RM-12
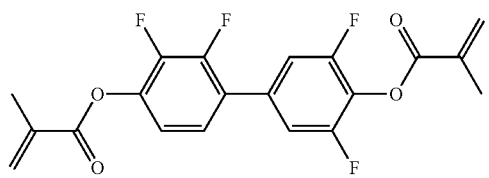
RM-13
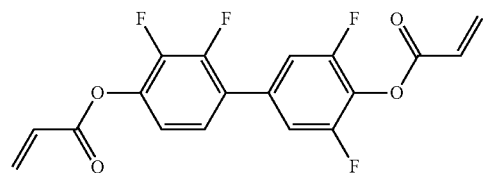 [SMILES: C=CC(=O)Oc1ccc(-c2cc(F)c(OC(=O)C=C)c(F)c2)c(F)c1F]
RM-14
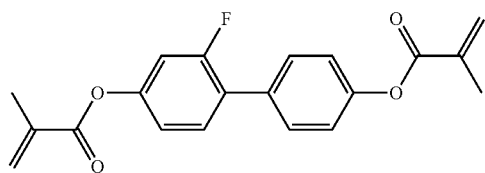
RM-15
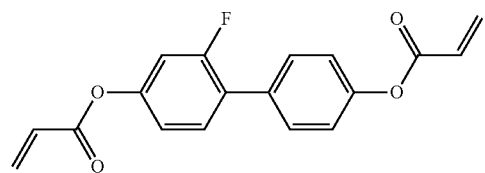
RM-16
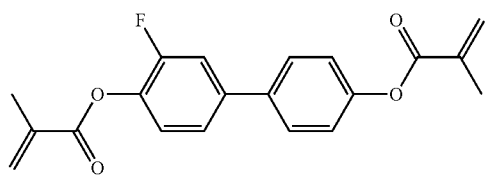 [SMILES: C=C(C)C(=O)Oc1ccc(-c2ccc(OC(=O)C(=C)C)c(F)c2)cc1]
RM-17

TABLE D-continued

| Structure | Code |
|---|---|
| (structure) | RM-18 |
| (structure) | RM-19 |
| (structure) | RM-20 |
| (structure) | RM-21 |
| (structure) | RM-22 |
| (structure) | RM-23 |
| (structure) | RM-24 |
| (structure) | RM-25 |
| (structure) | RM-26 |

TABLE D-continued
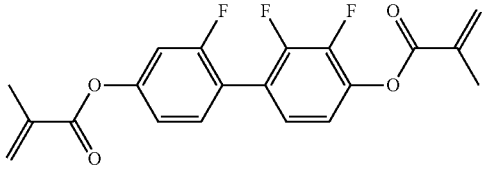 [SMILES: C=C(C)C(=O)Oc1ccc(-c2ccc(OC(=O)C(=C)C)c(F)c2F)c(F)c1] RM-27
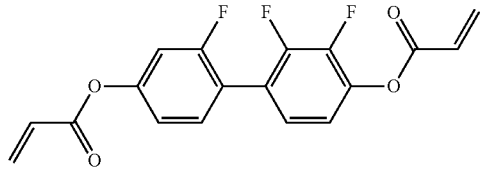 [SMILES: C=CC(=O)Oc1ccc(-c2ccc(OC(=O)C=C)c(F)c2F)c(F)c1] RM-28
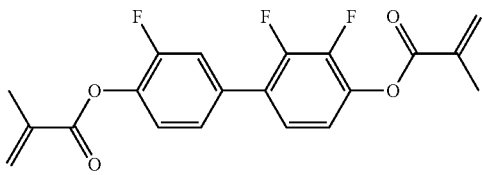 [SMILES: C=C(C)C(=O)Oc1ccc(-c2ccc(OC(=O)C(=C)C)c(F)c2F)cc1F] RM-29
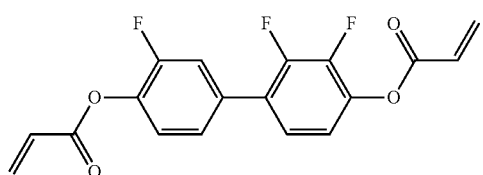 RM-30
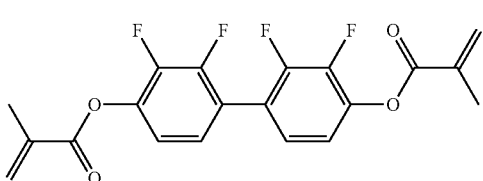 RM-31
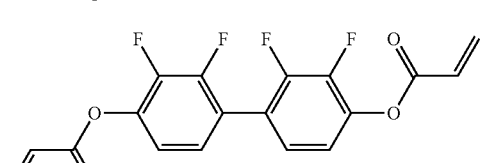 RM-32
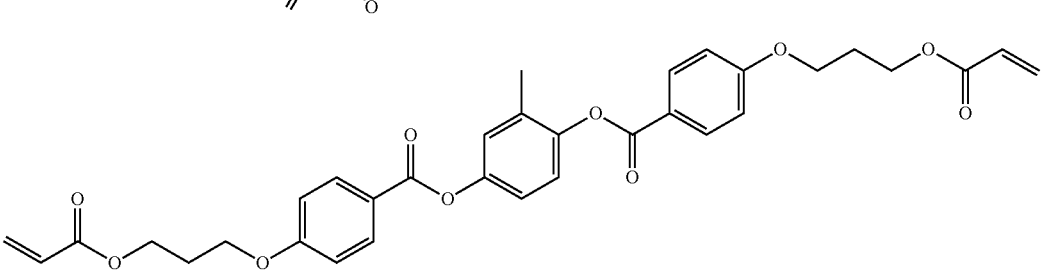 RM-33
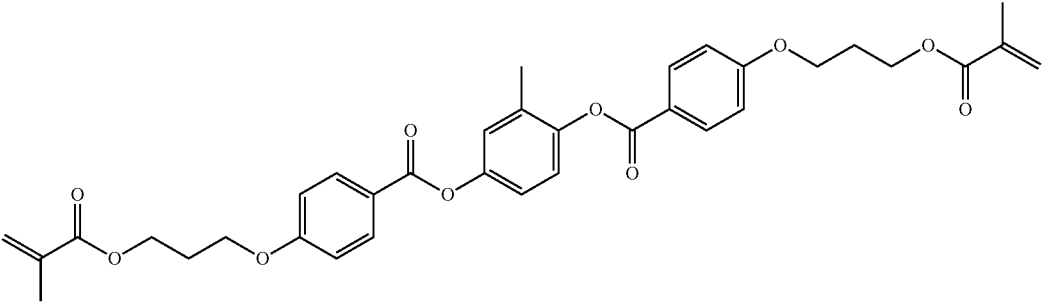 [SMILES: C=C(C)C(=O)OCCCOc1ccc(C(=O)Oc2ccc(OC(=O)c3ccc(OCCCOC(=O)C(=C)C)cc3)c(C)c2)cc1] RM-34

TABLE D-continued
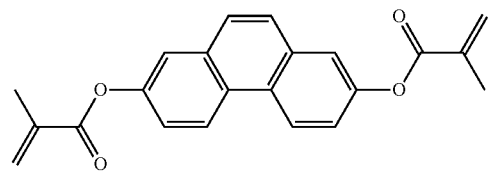 [SMILES: C=C(C)C(=O)Oc1ccc2c(ccc3cc(OC(=O)C(=C)C)ccc32)c1] RM-35
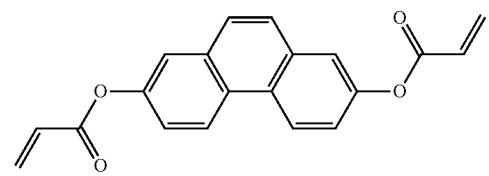 [SMILES: C=CC(=O)Oc1ccc2c(ccc3cc(OC(=O)C=C)ccc32)c1] RM-36
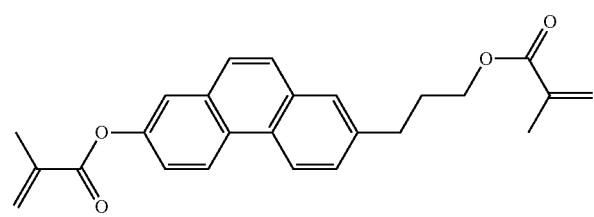 [SMILES: C=C(C)C(=O)OCCCc1ccc2c(ccc3cc(OC(=O)C(=C)C)ccc32)c1] RM-37
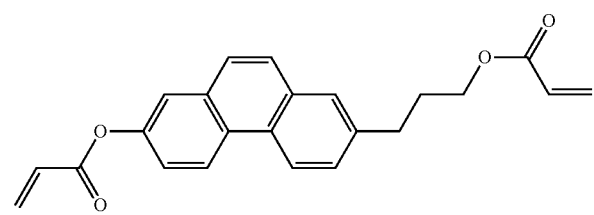 [SMILES: C=CC(=O)OCCCc1ccc2c(ccc3cc(OC(=O)C=C)ccc32)c1] RM-38
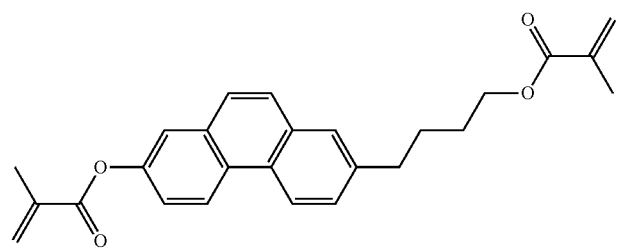 [SMILES: C=C(C)C(=O)OCCCCc1ccc2c(ccc3cc(OC(=O)C(=C)C)ccc32)c1] RM-39
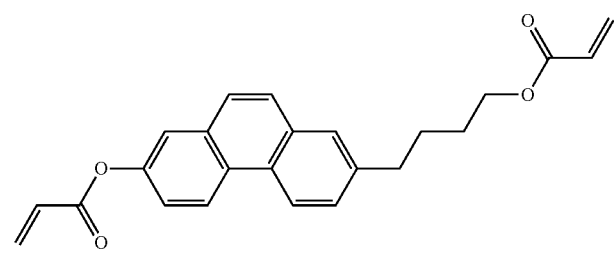 RM-40
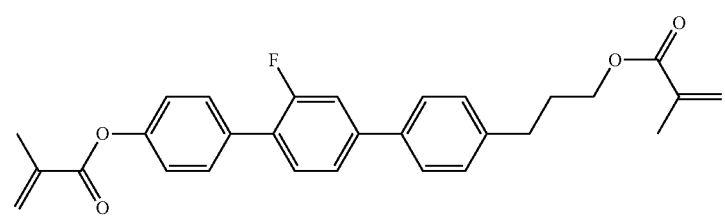 [SMILES: C=C(C)C(=O)OCCCc1ccc(-c2ccc(-c3ccc(OC(=O)C(=C)C)cc3)c(F)c2)cc1] RM-41

TABLE D-continued
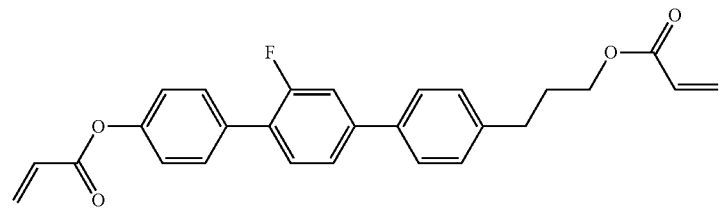 [SMILES: C=CC(=O)OCCCc1ccc(-c2ccc(-c3ccc(OC(=O)C=C)cc3)c(F)c2)cc1]
RM-42
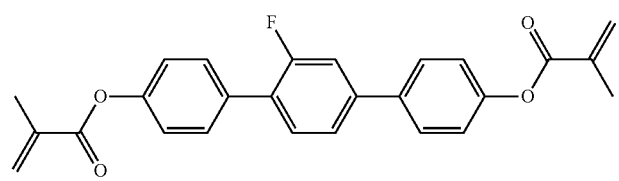 [SMILES: C=C(C)C(=O)Oc1ccc(-c2ccc(-c3ccc(OC(=O)C(=C)C)cc3)c(F)c2)cc1]
RM-43
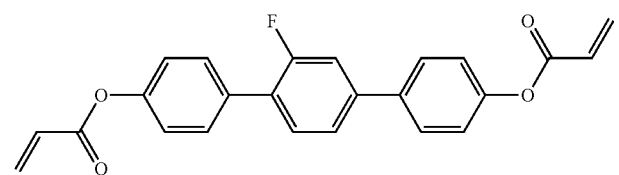
RM-44
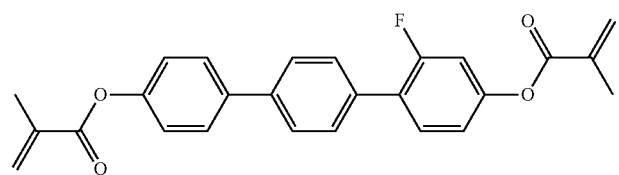
RM-45
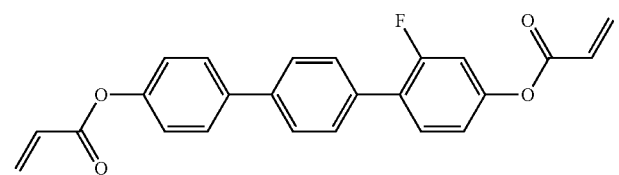
RM-46
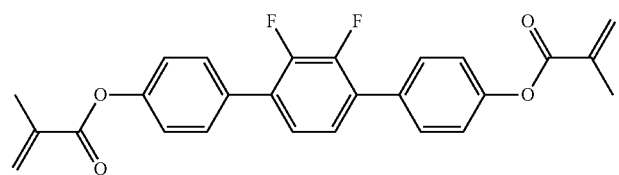 [SMILES: C=C(C)C(=O)Oc1ccc(-c2ccc(-c3ccc(OC(=O)C(=C)C)cc3F)cc2)cc1]
RM-47
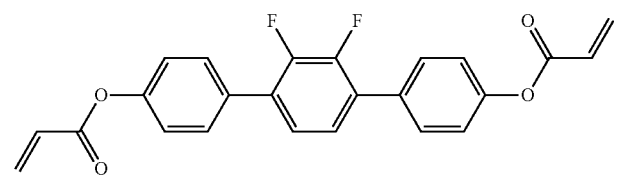 [SMILES: C=CC(=O)Oc1ccc(-c2ccc(-c3ccc(OC(=O)C=C)cc3)c(F)c2F)cc1]
RM-48
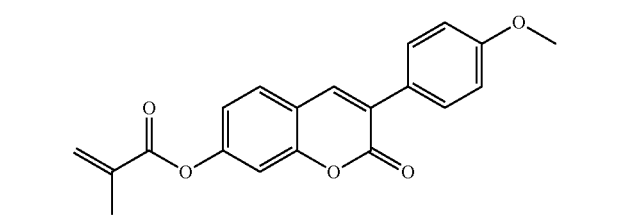 [SMILES: C=C(C)C(=O)Oc1ccc2cc(-c3ccc(OC)cc3)c(=O)oc2c1]
RM-49

TABLE D-continued
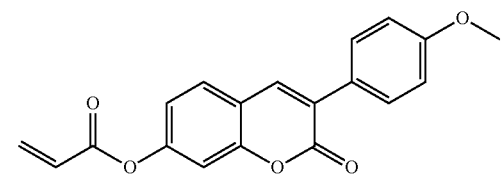 [SMILES: C=CC(=O)Oc1ccc2cc(-c3ccc(OC)cc3)c(=O)oc2c1] RM-50
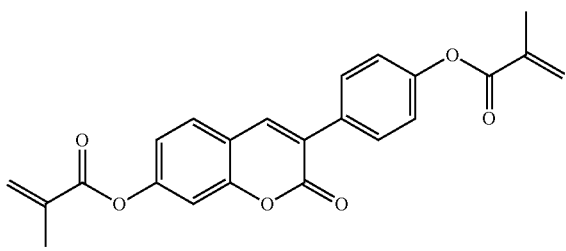 [SMILES: C=C(C)C(=O)Oc1ccc(-c2cc3ccc(OC(=O)C(=C)C)cc3oc2=O)cc1] RM-51
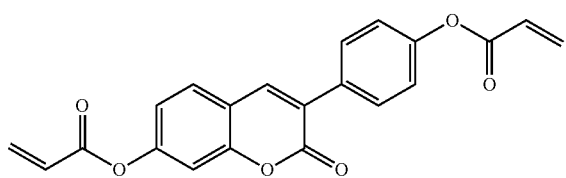 [SMILES: C=CC(=O)Oc1ccc(-c2cc3ccc(OC(=O)C=C)cc3oc2=O)cc1] RM-52
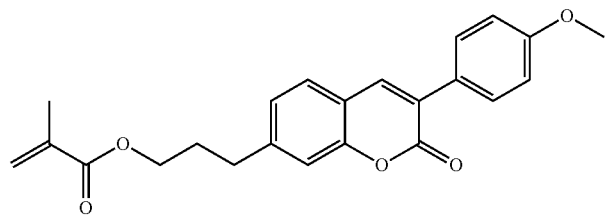 [SMILES: C=C(C)C(=O)OCCCc1ccc2cc(-c3ccc(OC)cc3)c(=O)oc2c1] RM-53
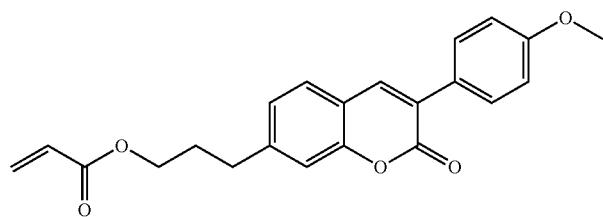 [SMILES: C=CC(=O)OCCCc1ccc2cc(-c3ccc(OC)cc3)c(=O)oc2c1] RM-54
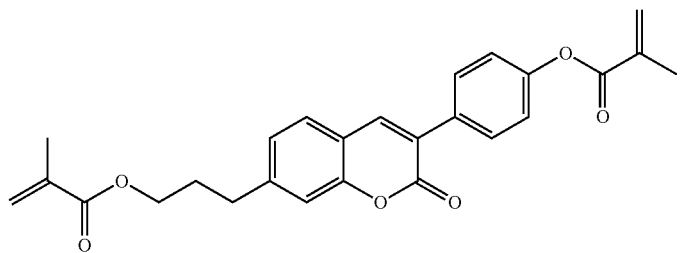 [SMILES: C=C(C)C(=O)OCCCc1ccc2cc(-c3ccc(OC(=O)C(=C)C)cc3)c(=O)oc2c1] RM-55
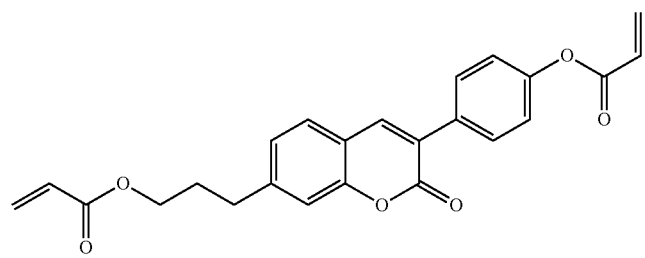 [SMILES: C=CC(=O)OCCCc1ccc2cc(-c3ccc(OC(=O)C=C)cc3)c(=O)oc2c1] RM-56

TABLE D-continued
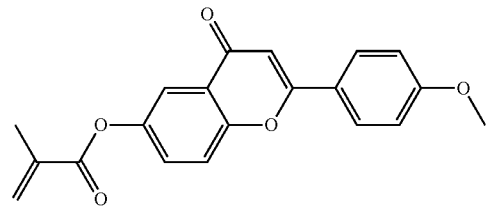 [SMILES: C=C(C)C(=O)Oc1ccc2oc(-c3ccc(OC)cc3)cc(=O)c2c1]
RM-57
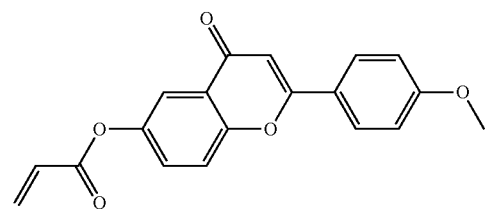 [SMILES: C=CC(=O)Oc1ccc2oc(-c3ccc(OC)cc3)cc(=O)c2c1]
RM-58
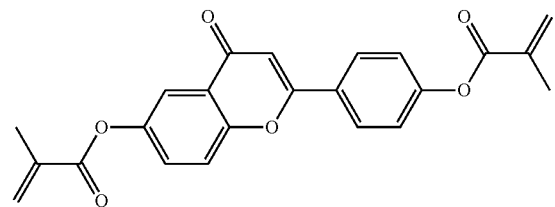 [SMILES: C=C(C)C(=O)Oc1ccc(-c2cc(=O)c3cc(OC(=O)C(=C)C)ccc3o2)cc1]
RM-59
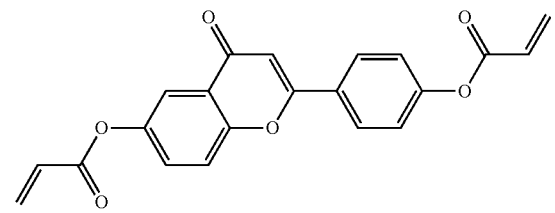 [SMILES: C=CC(=O)Oc1ccc(-c2cc(=O)c3cc(OC(=O)C=C)ccc3o2)cc1]
RM-60
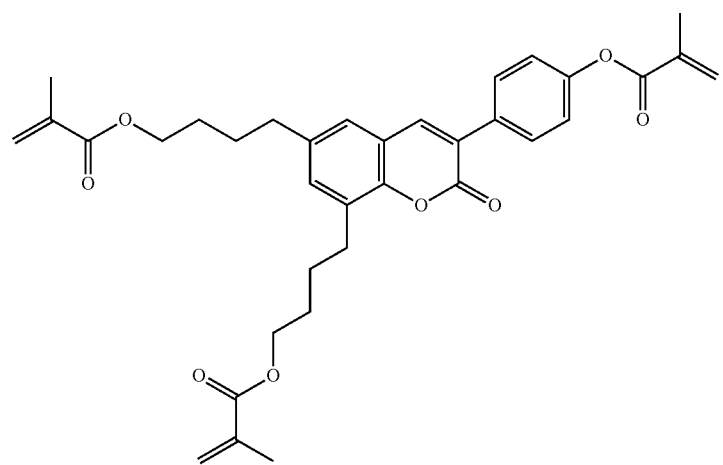 [SMILES: C=C(C)C(=O)OCCCCc1cc(CCCCOC(=O)C(=C)C)c2oc(=O)c(-c3ccc(OC(=O)C(=C)C)cc3)cc2c1]
RM-61

TABLE D-continued
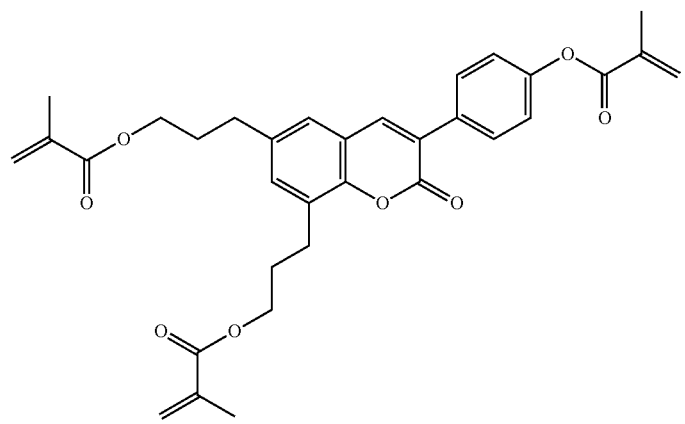 [SMILES: C=C(C)C(=O)OCCCc1cc(CCCOC(=O)C(=C)C)c2oc(=O)c(-c3ccc(OC(=O)C(=C)C)cc3)cc2c1]
RM-62
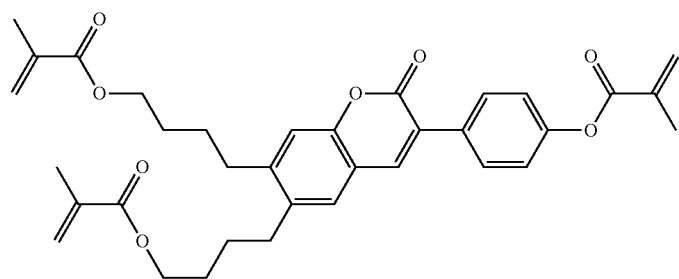 [SMILES: C=C(C)C(=O)OCCCCc1cc2cc(-c3ccc(OC(=O)C(=C)C)cc3)c(=O)oc2cc1CCCCOC(=O)C(=C)C]
RM-63
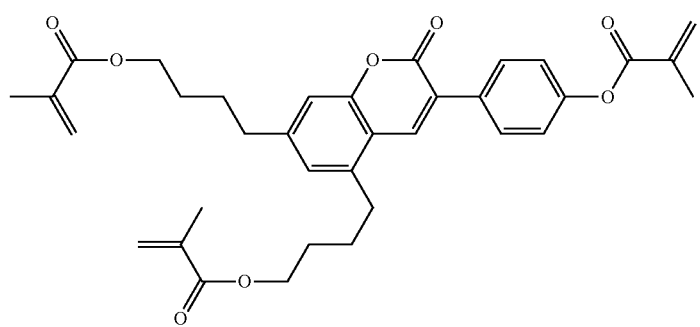 [SMILES: C=C(C)C(=O)OCCCCc1cc(CCCCOC(=O)C(=C)C)c2cc(-c3ccc(OC(=O)C(=C)C)cc3)c(=O)oc2c1]
RM-64
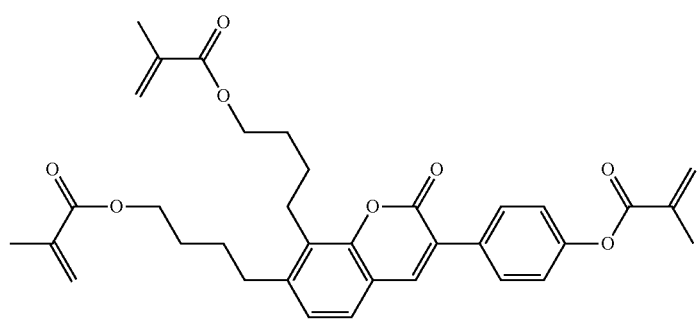 [SMILES: C=C(C)C(=O)OCCCCc1ccc2cc(-c3ccc(OC(=O)C(=C)C)cc3)c(=O)oc2c1CCCCOC(=O)C(=C)C]
RM-65

TABLE D-continued
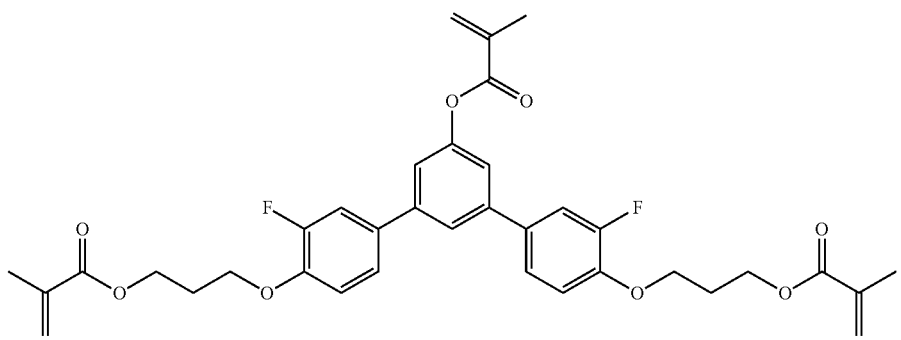 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-66
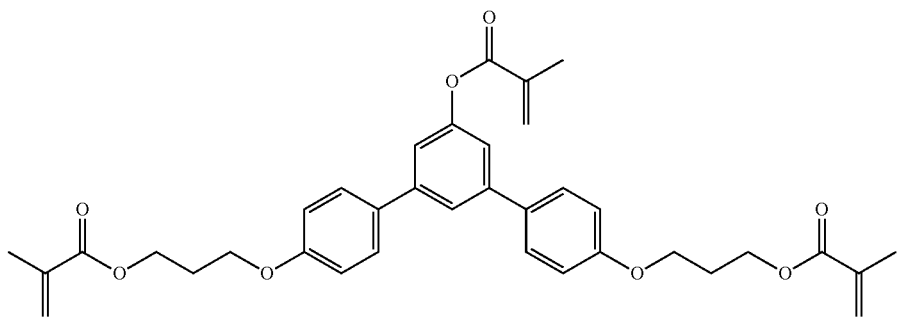 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-67
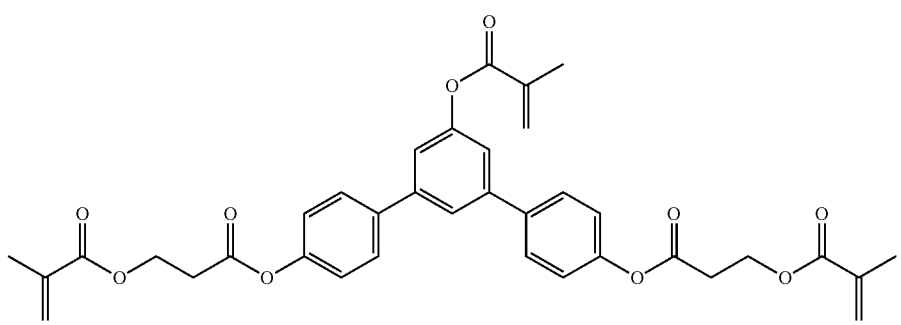 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-68
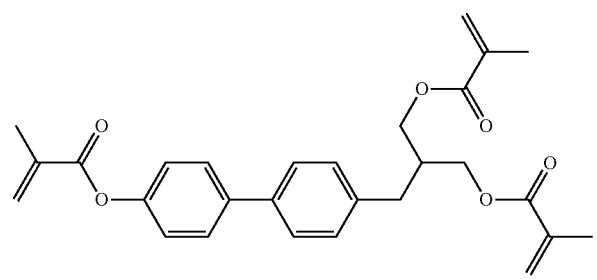 [SMILES: C=C(C)C(=O)OCC(COC(=O)C(=C)C)Cc1ccc(-c2ccc(OC(=O)C(=C)C)cc2)cc1]
RM-69
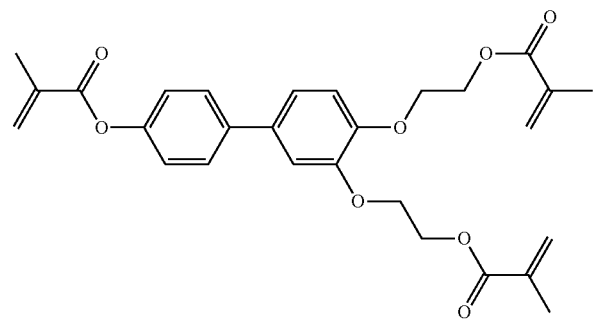 [SMILES: C=C(C)C(=O)OCCOc1ccc(-c2ccc(OC(=O)C(=C)C)cc2)cc1OCCOC(=O)C(=C)C]
RM-70

TABLE D-continued

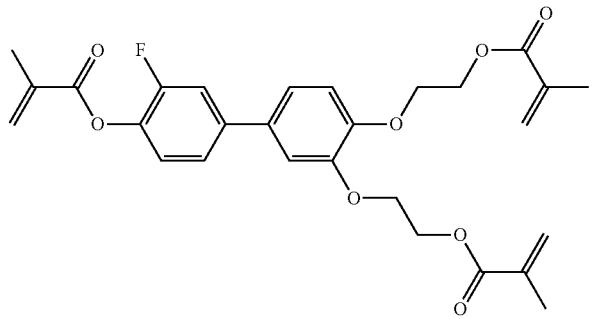 [SMILES: C=C(C)C(=O)OCCOc1ccc(-c2ccc(OC(=O)C(=C)C)c(F)c2)cc1OCCOC(=O)C(=C)C]
RM-71

Table D shows illustrative compounds which can be used in the LC media in accordance with the present invention, preferably as reactive mesogenic compounds.

In a preferred embodiment of the present invention, the mesogenic media comprise one or more compounds selected from the group of the compounds from Table D. Very preferably the LC medium comprises a compound selected from formulae RM-1 to RM-32, most preferably RM-1, RM-15 or RM-17, or a compound selected from formulae RM-41 to RM-48, most preferably RM-41.

In addition, the following abbreviations and symbols are used:
$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\in_\perp$ dielectric permittivity perpendicular to the director at 20° C. and 1 kHz,
$\in_\parallel$ dielectric permittivity parallel to the director at 20° C. and 1 kHz,
$\Delta\in$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents. Unless explicitly noted otherwise, the expression "x % of compound Y are added to the mixture" means that the concentration of compound Y in the final mixture, i.e. after its addition, is x %.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\in$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 µm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 µm, each of which has on the inside an electrode layer and a polyimide alignment layer on top, where the two polyimide layers are rubbed antiparallel to one another and effect a homeotropic edge alignment of the liquid-crystal molecules.

The polymerizable compounds are polymerized in the display or test cell by irradiation with UVA light of defined intensity for a prespecified time, with a voltage simultaneously being applied to the display (usually 10 V to 30 V alternating current, 1 kHz). In the examples, unless indicated otherwise, a metal halide lamp and an intensity of 50 mW/cm$^2$ is used for polymerization. The intensity is measured using a standard UVA meter (Hoenle UV-meter high end with UVA sensor).

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerizable monomeric compound is added to the LC host mixture, and the resultant mixture is introduced into VA-VHR test cells which comprise an unrubbed VA-polyimide alignment layer. The LC-layer thickness d is approx. 6 µm, unless stated otherwise. The VHR value is determined before and after UV exposure at 1 V, 60 Hz, 64 µs pulse (measuring instrument: Autronic-Melchers VHRM-105).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding European Application No. 15001984.2, filed Jul. 2, 2015, are incorporated by reference herein.

LC HOST MIXTURES

COMPARISON EXAMPLE 1

The nematic LC host mixture NC1 is formulated as follows.

| | | | |
|---|---|---|---|
| CY-3-O2 | 15.00% | cl.p. | 75.5° C. |
| CCY-4-O2 | 9.50% | $\Delta n$ | 0.1075 |
| CCY-5-O2 | 5.00% | $\Delta \varepsilon$ | −3.0 |
| CPY-2-O2 | 9.00% | $\varepsilon_\parallel$ | 3.5 |
| CPY-3-O2 | 9.00% | $K_{11}$ | 12.9 |
| CCH-34 | 9.00% | $K_{33}$ | 13.0 |
| CCH-23 | 22.00% | $\gamma_1$ | 115 mPa s |
| PYP-2-3 | 7.00% | $\gamma_1/K_{33}$ | 8.85 |
| PYP-2-4 | 7.50% | | |
| PCH-301 | 7.00% | | |

The mixture does not contain a compound of formula A.

COMPARISON EXAMPLE 2

The nematic LC host mixture NC2 is formulated as follows.

| | | | |
|---|---|---|---|
| B-2O-O5 | 4.00% | cl.p. | 75.0° C. |
| BCH-32 | 3.00% | $\Delta n$ | 0.1096 |
| CC-3-V1 | 9.00% | $\Delta \varepsilon$ | −3.09 |
| CCH-301 | 2.00% | $\varepsilon_\parallel$ | 3.5 |
| CCH-34 | 8.00% | $K_{11}$ | 13.6 |
| CCH-35 | 8.00% | $K_{33}$ | 16.3 |
| CCP-V2-1 | 5.00% | $\gamma_1$ | 109 mPa s |
| CCY-3-O2 | 1.50% | $\gamma_1/K_{33}$ | 6.69 |
| CPY-2-O2 | 8.00% | | |
| CPY-3-O2 | 8.00% | | |
| CY-3-O2 | 6.50% | | |
| PCH-301 | 17.50% | | |
| PY-3-O2 | 9.50% | | |
| CLY-3-O2 | 10.00% | | |

The mixture contains 10% of compound CLY-3-O2 of formula A.

COMPARISON EXAMPLE 3

The nematic LC host mixture NC3 is formulated as follows.

| | | | |
|---|---|---|---|
| B-2O-O5 | 4.00% | cl.p. | 74.4° C. |
| BCH-32 | 8.00% | $\Delta n$ | 0.1087 |
| CC-3-V1 | 9.00% | $\Delta \varepsilon$ | −3.08 |
| CCH-301 | 2.00% | $\varepsilon_\parallel$ | 3.6 |
| CCH-34 | 8.00% | $K_{11}$ | 14.3 |
| CCH-35 | 7.00% | $K_{33}$ | 16.5 |
| CCP-3-1 | 8.00% | $\gamma_1$ | 107 mPa s |
| CCY-3-O2 | 4.00% | $\gamma_1/K_{33}$ | 6.48 |
| CCY-4-O2 | 2.50% | | |
| CPY-3-O2 | 2.00% | | |
| CY-3-O2 | 8.50% | | |
| PCH-301 | 11.00% | | |
| PY-3-O2 | 16.00% | | |
| CLY-3-O2 | 10.00% | | |

The mixture contains 10% of compound CLY-3-O2 of formula A.

COMPARISON EXAMPLE 4

The nematic LC host mixture NC4 is formulated as follows.

| | | | |
|---|---|---|---|
| B-2O-O5 | 4.00% | cl.p. | 74.1° C. |
| BCH-32 | 8.00% | $\Delta n$ | 0.1090 |
| CC-3-V1 | 9.00% | $\Delta \varepsilon$ | −3.09 |
| CCH-301 | 2.00% | $\varepsilon_\parallel$ | 3.6 |
| CCH-34 | 9.00% | $K_{11}$ | 14.2 |
| CCH-35 | 7.00% | $K_{33}$ | 16.5 |
| CCP-3-1 | 8.50% | $\gamma_1$ | 109 mPa s |
| CCY-3-O2 | 11.00% | $\gamma_1/K_{33}$ | 6.61 |
| CPY-3-O2 | 7.00% | | |
| CY-3-O2 | 10.00% | | |
| PCH-301 | 9.00% | | |
| PY-3-O2 | 15.50% | | |

The mixture does not contain a compound of formula A.

COMPARISON EXAMPLE 5

The nematic LC host mixture NC5 is formulated as follows.

| | | | |
|---|---|---|---|
| CC-3-V | 15.00% | cl.p. | 74.4° C. |
| CC-3-V1 | 9.00% | $\Delta n$ | 0.1086 |
| CCH-23 | 8.00% | $\Delta \varepsilon$ | −3.2 |
| CCH-34 | 7.50% | $\varepsilon_\parallel$ | 3.5 |
| CCY-3-O2 | 10.00% | $K_{11}$ | 14.3 |
| CCY-5-O2 | 8.00% | $K_{33}$ | 15.7 |
| CPY-2-O2 | 3.00% | $\gamma_1$ | 102 mPa s |
| CPY-3-O2 | 8.50% | $\gamma_1/K_{33}$ | 6.50 |
| CY-3-O2 | 7.00% | | |
| PY-3-O2 | 16.00% | | |
| PYP-2-3 | 8.00% | | |

The mixture does not contain a compound of formula A.

EXAMPLE 1

The nematic LC host mixture N1 is formulated as follows.

| | | | |
|---|---|---|---|
| B-2O-O5 | 4.00% | cl.p. | 74.2° C. |
| BCH-32 | 8.00% | $\Delta n$ | 0.1088 |
| CC-3-V1 | 9.00% | $\Delta \varepsilon$ | −3.10 |
| CCH-301 | 2.00% | $\varepsilon_\parallel$ | 3.6 |
| CCH-34 | 9.00% | $K_{11}$ | 14.1 |
| CCH-35 | 7.00% | $K_{33}$ | 16.5 |
| CCP-3-1 | 8.50% | $\gamma_1$ | 109 mPa s |
| CCY-3-O2 | 11.49% | $\gamma_1/K_{33}$ | 6.61 |
| CPY-3-O2 | 6.50% | | |
| CY-3-O2 | 10.00% | | |
| PCH-301 | 9.00% | | |
| PY-3-O2 | 15.50% | | |
| CLY-3-O2 | 0.01% | | |

The mixture contains 0.01% of compound CLY-3-O2 of formula A.

EXAMPLE 2

The nematic LC host mixture N2 is formulated as follows.

| | | | |
|---|---|---|---|
| B-2O-O5 | 4.00% | cl.p. | 74.2° C. |
| BCH-32 | 8.00% | $\Delta n$ | 0.1085 |
| CC-3-V1 | 9.00% | $\Delta \varepsilon$ | −3.09 |
| CCH-301 | 2.00% | $\varepsilon_\parallel$ | 3.6 |
| CCH-34 | 9.00% | $K_{11}$ | 14.2 |
| CCH-35 | 7.00% | $K_{33}$ | 16.5 |
| CCP-3-1 | 8.50% | $\gamma_1$ | 109 mPa s |
| CCY-3-O2 | 11.45% | $\gamma_1/K_{33}$ | 6.61 |
| CPY-3-O2 | 6.50% | | |
| CY-3-O2 | 10.00% | | |
| PCH-301 | 9.00% | | |
| PY-3-O2 | 15.50% | | |
| CLY-3-O2 | 0.05% | | |

The mixture contains 0.05% of compound CLY-3-O2 of formula A.

EXAMPLE 3

The nematic LC host mixture N3 is formulated as follows.

| B-2O-O5 | 4.00% | cl.p. | 74.2° C. |
|---|---|---|---|
| BCH-32 | 8.00% | Δn | 0.1088 |
| CC-3-V1 | 9.00% | Δε | −3.10 |
| CCH-301 | 2.00% | $\varepsilon_\parallel$ | 3.6 |
| CCH-34 | 9.00% | $K_{11}$ | 14.2 |
| CCH-35 | 7.00% | $K_{33}$ | 16.5 |
| CCP-3-1 | 8.50% | $\gamma_1$ | 109 mPa s |
| CCY-3-O2 | 11.40% | $\gamma_1/K_{33}$ | 6.61 |
| CPY-3-O2 | 6.50% | | |
| CY-3-O2 | 10.00% | | |
| PCH-301 | 9.00% | | |
| PY-3-O2 | 15.50% | | |
| CLY-3-O2 | 0.10% | | |

The mixture contains 0.10% of compound CLY-3-O2 of formula A.

EXAMPLE 4

The nematic LC host mixture N4 is formulated as follows.

| B-2O-O5 | 4.00% | cl.p. | 74.2° C. |
|---|---|---|---|
| BCH-32 | 8.00% | Δn | 0.1089 |
| CC-3-V1 | 9.00% | Δε | −3.10 |
| CCH-301 | 2.00% | $\varepsilon_\parallel$ | 3.6 |
| CCH-34 | 9.00% | $K_{11}$ | 14.1 |
| CCH-35 | 7.00% | $K_{33}$ | 16.5 |
| CCP-3-1 | 8.50% | $\gamma_1$ | 109 mPa s |
| CCY-3-O2 | 11.00% | $\gamma_1/K_{33}$ | 6.61 |
| CPY-3-O2 | 6.50% | | |
| CY-3-O2 | 10.00% | | |
| PCH-301 | 9.00% | | |
| PY-3-O2 | 15.50% | | |
| CLY-3-O2 | 0.50% | | |

The mixture contains 0.5% of compound CLY-3-O2 of formula A.

EXAMPLE 5

The nematic LC host mixture N5 is formulated as follows.

| B-2O-O5 | 4.00% | cl.p. | 74.2° C. |
|---|---|---|---|
| BCH-32 | 8.00% | Δn | 0.1094 |
| CC-3-V1 | 9.00% | Δε | −3.08 |
| CCH-301 | 2.00% | $\varepsilon_\parallel$ | 3.6 |
| CCH-34 | 9.00% | $K_{11}$ | 14.2 |
| CCH-35 | 7.00% | $K_{33}$ | 16.5 |
| CCP-3-1 | 8.50% | $\gamma_1$ | 108 mPa s |
| CCY-3-O2 | 10.50% | $\gamma_1/K_{33}$ | 6.55 |
| CPY-3-O2 | 6.50% | | |
| CY-3-O2 | 10.00% | | |
| PCH-301 | 9.00% | | |
| PY-3-O2 | 15.50% | | |
| CLY-3-O2 | 1.00% | | |

The mixture contains 1.00% of compound CLY-3-O2 of formula A.

EXAMPLE 6

The nematic LC host mixture N6 is formulated as follows.

| B-2O-O5 | 4.00% | cl.p. | 74.2° C. |
|---|---|---|---|
| BCH-32 | 8.00% | Δn | 0.1091 |
| CC-3-V1 | 9.00% | Δε | −3.09 |
| CCH-301 | 2.00% | $\varepsilon_\parallel$ | 3.6 |
| CCH-34 | 8.00% | $K_{11}$ | 14.5 |
| CCH-35 | 7.00% | $K_{33}$ | 16.5 |
| CCP-3-1 | 8.00% | $\gamma_1$ | 108 mPa s |
| CCP-V2-1 | 5.00% | $\gamma_1/K_{33}$ | 6.55 |
| CCY-3-O2 | 10.50% | | |
| CPY-3-O2 | 2.50% | | |
| CY-3-O2 | 11.50% | | |
| PCH-301 | 5.50% | | |
| PY-3-O2 | 18.00% | | |
| CLY-3-O2 | 1.00% | | |

The mixture contains 1.00% of compound CLY-3-O2 of formula A.

Polymerizable Mixtures

Polymerizable mixtures are prepared by adding reactive mesogen M1 to each of nematic LC host mixtures NC1-NC5 and N1-N6, respectively, at a concentration of 0.2-0.35% by weight.

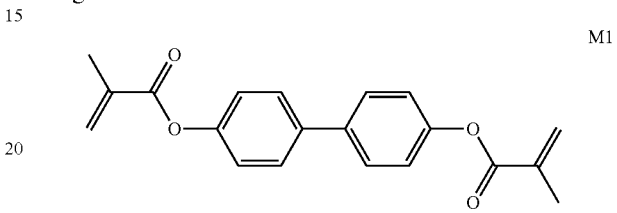

M1

The compositions of the polymerizable mixtures are shown in Table 1 below.

TABLE 1

Polymerizable Mixture Compositions

| Mixture No. | LC Host | Concentration of CLY-3-O2 (%) in LC Host* | Concentration of M1 (%)** |
|---|---|---|---|
| C1 | NC1 | 0 | 0.20 |
| C2 | NC2 | 10.00 | 0.30 |
| C2a | NC2 | 10.00 | 0.35 |
| C3 | NC3 | 10.00 | 0.30 |
| C3a | NC3 | 10.00 | 0.35 |
| C4 | NC4 | 0 | 0.30 |
| C5 | NC5 | 0 | 0.30 |
| P1 | N1 | 0.01 | 0.30 |
| P2 | N2 | 0.05 | 0.30 |
| P3 | N3 | 0.1 | 0.30 |
| P3a | N3 | 0.1 | 0.35 |
| P4 | N4 | 0.5 | 0.30 |
| P5 | N5 | 1.0 | 0.30 |
| P5a | N5 | 1.0 | 0.35 |
| P6 | N6 | 1.0 | 0.35 |

*The % values of CLY-3-O2 refer to the host mixture without reactive mesogen M1. The concentration in % of CLY-3-O2 in the final polymerizable mixture, which additionally contains 0.20-0.35% of M1, is therefore slightly lower (for example as in mixture P7 below).
**The % values of M1 refer to the final polymerizable mixture.

EXAMPLE P7

The polymerizable mixture P7 is formulated as follows.

| B-2O-O5 | 3.97% | cl.p. | 74.5° C. |
|---|---|---|---|
| BCH-32 | 7.95% | Δn | 0.1104 |
| CC-3-V1 | 8.94% | Δε | −3.07 |
| CCH-301 | 1.99% | $\varepsilon_\parallel$ | 3.6 |
| CCH-34 | 7.95% | $K_{33}$ | 16.4 |
| CCH-35 | 6.95% | $\gamma_1$ | 111 mPa s |
| CCP-3-1 | 7.95% | | |
| CCP-V2-1 | 4.98% | | |
| CCY-3-O2 | 10.43% | | |
| CPY-3-O2 | 2.48% | | |
| CY-3-O2 | 11.43% | | |
| PCH-301 | 5.46% | | |
| PY-3-O2 | 17.88% | | |
| CLY-3-O2 | 0.99% | | |

-continued

| PPGU-3-F | 0.30% |
| M1 | 0.35% |

USE EXAMPLES

VHR, Reliability

The VHR values of the polymerizable LC media are measured with and without contact with a black matrix (BM) material. The experiment is carried out as follows:

The polymerizable LC medium is contacted with BM powder material extracted from a BM coated substrate at the rate of 100 to 0.8. The resultant sample is heated at 100° C. for 2 hours. The sample is filtered through a membrane filter and is introduced into VA-VHR test cells which comprise an unrubbed VA-polyimide alignment layer. The VHR value is determined before and after UV exposure at 1 V, 60 Hz, 64 µs pulse (measuring instrument: Autronic-Melchers VHRM-105).

The VHR values are shown in Table 2.

TABLE 2

| | VHR (%) | C1 | C2 | C3 | C4 | P1 | P2 | P3 | P4 | P5 |
|---|---|---|---|---|---|---|---|---|---|---|
| No BM contact | UV 0 min | 98.8 | 98.3 | 98.5 | 98.4 | 98.3 | 98.4 | 98.4 | 98.4 | 98.7 |
| | UV 20 min | 98.1 | 95.6 | 95.1 | 97.8 | 97.8 | 97.9 | 98.0 | 97.9 | 98.0 |
| | UV 40 min | 98.1 | 94.7 | 93.8 | 97.9 | 97.9 | 97.8 | 97.9 | 97.8 | 97.8 |
| Contact with BM | UV 0 min | 98.5 | 97.3 | 97.4 | 97.6 | 97.5 | 97.4 | 97.8 | 97.8 | 98.0 |
| | UV 20 min | 92.2 | 95.1 | 94.7 | 95.4 | 95.9 | 96.8 | 96.9 | 97.3 | 97.2 |
| | UV 40 min | 83.8 | 93.8 | 93.1 | 73.6 | 77.9 | 86.9 | 90.8 | 96.6 | 96.7 |

| | VHR (%) | C1 | C2a | C5 | P6 |
|---|---|---|---|---|---|
| No BM contact | UV 0 min | 98.2 | 97.2 | 97.9 | 97.1 |
| | UV 20 min | 98.3 | 96.1 | 97.7 | 97.4 |
| | UV 40 min | 98.3 | 95.7 | 96.8 | 97.5 |
| Contact with BM | UV 0 min | 97.7 | 92.7 | 96.2 | 94.2 |
| | UV 20 min | 90.7 | 94.7 | 74.0 | 95.8 |
| | UV 40 min | 83.2 | 93.8 | 53.1 | 93.0 |

From Table 2 it can be seen that the mixtures P1-P6 according to the present invention, which contain a small amount of the compound CLY-3-O2 of formula A, maintain a relatively high VHR value after UV exposure, either with or without being in contact with the BM material.

Compared thereto, mixtures C1, C4 and C5 without compound CLY-3-O2 of formula A show a stronger decrease of the VHR after UV exposure when being in contact with the BM material, while mixtures C2, C2a and C3, which contain approx. 10% of compound CLY-3-O2 of formula A, show a stronger decrease of the VHR after UV exposure without contact with the BM material.

Therefore, mixtures P1-P6 are best suitable for maintaining a high VHR after UV exposure either with or without contact with the BM material.

Pretilt Angle

Polymerizable mixtures according to the invention and polymerizable comparison mixtures are each inserted into a VA e/o test cell. The test cells comprise a VA-polyimide alignment layer (JALS-2096-R1) which is rubbed antiparallel. The LC-layer thickness d is approx. 4 µm.

The pretilt angle is determined after UV irradiation with 50 mW/cm$^2$ for 120s (6J) by a crystal rotation experiment (Autronic-Melchers TBA-105).

The pretilt angles are shown in Table 3.

TABLE 3

| | Pretilt angles | | | | | | | | | |
|---|---|---|---|---|---|---|---|---|---|---|
| | C1 | C2 | C2a | C3a | C4 | C5 | P3 | P3a | P5 | P5a |
| pretilt (°) | 86.2 | 87.6 | 86.8 | 87.1 | 86.6 | 84.6 | 86.7 | 86.1 | 87.2 | 86.7 |

| | C5 | C2a | P6 |
|---|---|---|---|
| pretilt (°) | 84.6 | 87.2 | 86.6 |

From Table 3 it can be seen that, independently of the RM concentration, the mixtures P3, P5 and P6 according to the present invention, which contain a small amount of the compound CLY-3-O2 of formula A, show a tilt angle which is better than that of comparative mixtures C2 and C3 with approx. 10% of compound CLY-3-O2, and similar to comparative mixtures C1, C4 and C5 without compound CLY-3-O2.

Residual RM

In order to determine the polymerization rate, the residual content of unpolymerized RM (in % by weight) in the test cells is measured by HPLC after polymerization in the test cell by UV exposure for 80 min at 60° C. using a fluorescent UV lamp type C (305 nm~355 nm). For this purpose the polymerized mixture is then rinsed out of the test cell using MEK (methyl ethyl ketone) and measured.

The residual concentration of the RM in the mixture after 40 min and 80 min UV irradiation is shown in Table 4.

TABLE 4

Residual RM content

| RM (%) | C1 | C2 | C2a | C3a | C4 | C5 | P3 | P3a | P5 | P5a |
|---|---|---|---|---|---|---|---|---|---|---|
| UV 40 min | 0.0000 | 0.0433 | 0.0479 | 0.0541 | 0.0088 | 0.0044 | 0.0155 | 0.0121 | 0.0267 | 0.0240 |
| UV 80 min | 0.0000 | 0.0140 | 0.0134 | 0.0130 | 0.0000 | 0.0000 | 0.0000 | 0.0000 | 0.0000 | 0.0000 |

| RM (%) | C5 | C2a | P6 |
|---|---|---|---|
| UV 40 min | 0.0015 | 0.0444 | 0.0322 |
| UV 80 min | 0.0000 | 0.0160 | 0.0084 |

From Table 4 it can be seen that, independently of the RM concentration, the mixtures P3, P5 and P6 according to the present invention, which contain a small amount of the compound CLY-3-O2 of formula A, show a complete polymerization with low amount of residual RM, which is lower than that of comparative mixtures C2 and C3 with approx. 10% of compound CLY-3-O2, and similar to comparative mixtures C1, C4 and C5 without compound CLY-3-O2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystalline medium comprising
a polymerizable component A) comprising one or more polymerizable compounds, and
a liquid-crystalline host mixture component B), comprising one or more mesogenic or liquid-crystalline compounds,
wherein component B) comprises from 0.01 to 2% of one or more compounds of formula A

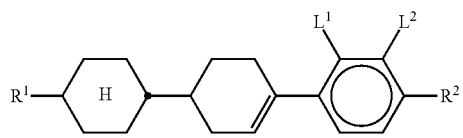

in which the individual radicals, on each occurrence identically or differently, and each, independently of one another, have the following meaning:
$R^1$, $R^2$ are alkyl, alkoxy, oxaalkyl or alkoxyalkyl having 1 to 9 C atoms or alkenyl or alkenyloxy having 2 to 9 C atoms, all of which are optionally fluorinated,
$L^1$, $L^2$, $L^3$ are F or Cl.

2. The liquid crystalline medium of claim 1, wherein the compounds of formula A are of the formula:

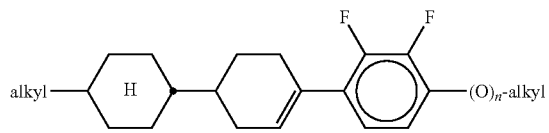

wherein alkyl denotes a straight-chain alkyl radical having 1-6 C atoms, and n is 0 or 1.

3. The liquid crystalline medium of claim 1, wherein component B) comprises from 0.01 to 1% of compounds of formula A.

4. The liquid crystalline medium according to claim 1, wherein component A) comprises one or more polymerizable compounds of formula I $$R^a\text{—}B^1\text{—}(Z^b\text{—}B^2)_m\text{—}R^b \qquad \text{I}$$

in which the individual radicals, on each occurrence identically or differently, and each, independently of one another, have the following meaning:
$R^a$ and $R^b$ are P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if B$^1$ and/or B$^2$ contain a saturated C atom, R$^a$ and/or R$^b$ may also denote a radical which is spiro-linked to this saturated C atom,
wherein at least one of the radicals R$^a$ and R$^b$ denotes or contains a group P or P-Sp-,
P is a polymerizable group,
Sp is a spacer group or a single bond,
B$^1$ and B$^2$ are an aromatic, heteroaromatic, alicyclic or heterocyclic group, which may also contain fused rings, and which is unsubstituted, or mono- or polysubstituted by L, $Z^b$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, R$^0$ and R$^{00}$ is H or alkyl having 1 to 12 C atoms, m is 0, 1, 2, 3 or 4, n1 is 1, 2, 3 or 4, L is P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, Y$^1$ is halogen, and R$^x$ is P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

5. The liquid crystalline medium according to claim 4, wherein the polymerizable compounds of formula I B$^1$ and B$^2$ each, independently of one another, are 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L.

6. The liquid crystalline medium according to claim 4, wherein the polymerizable compounds of formula I are:

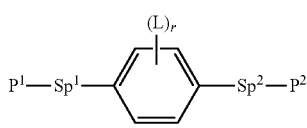
M1

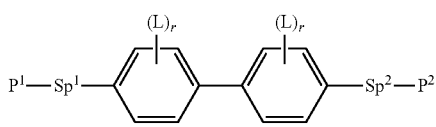
M2

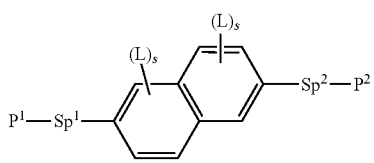
M3

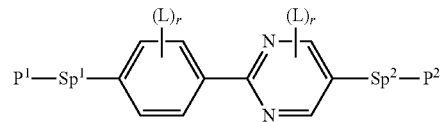
M4

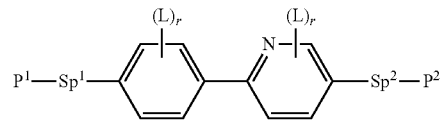
M5

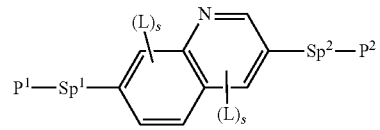
M6

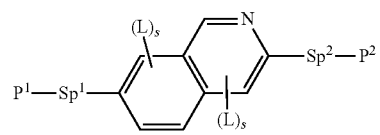
M7

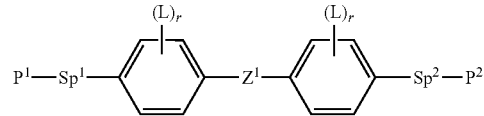
M8

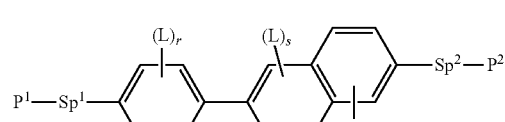
M9

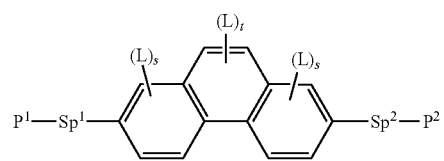
M10

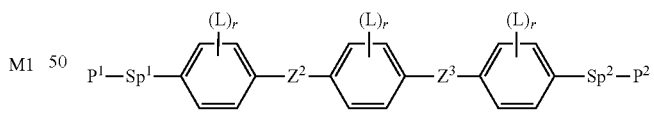
M11

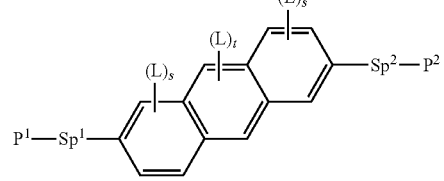
M12

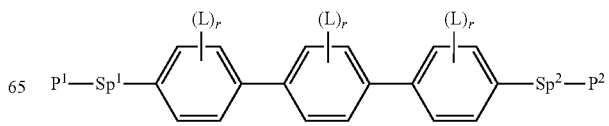
M13

-continued
M14
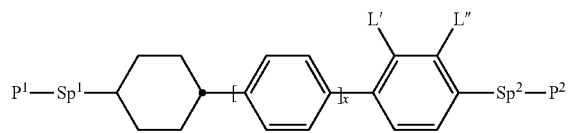
M15
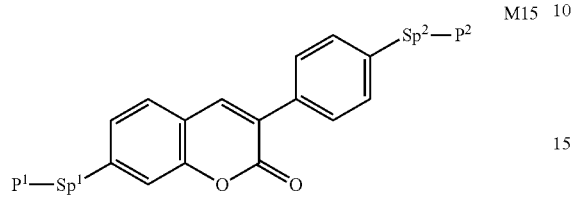
M16
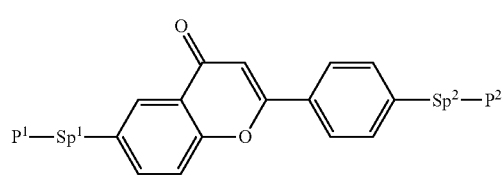
M17
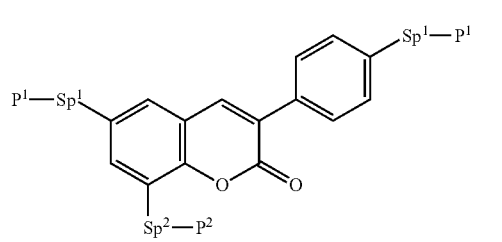
M18
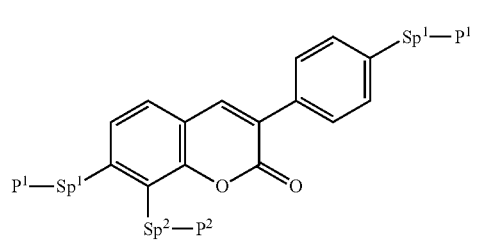
M19
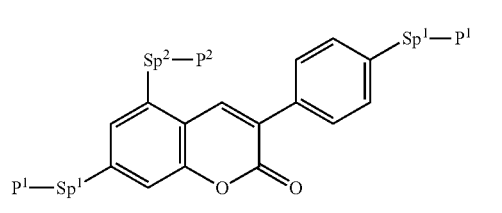
M20
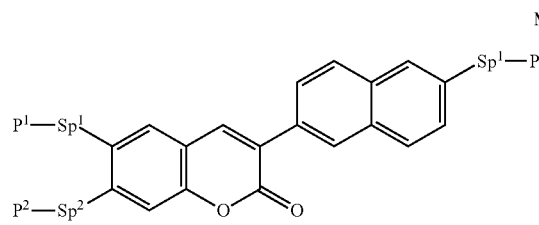
-continued
M21
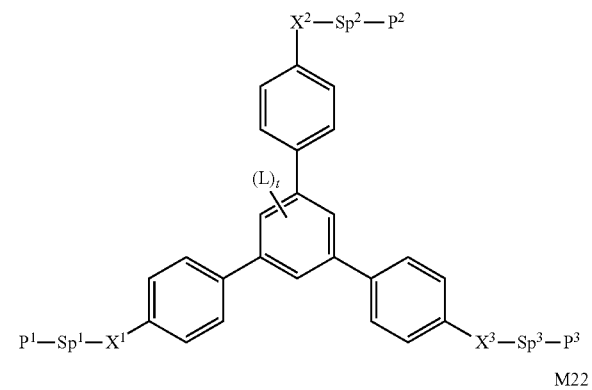
M22
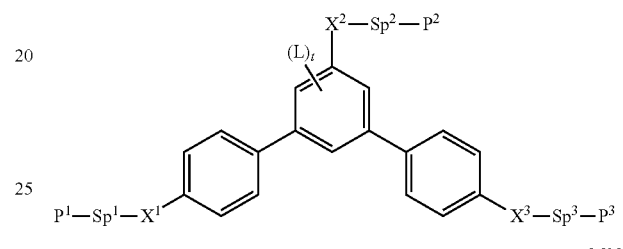
M23
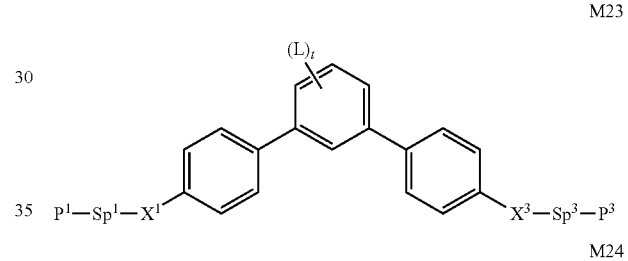
M24
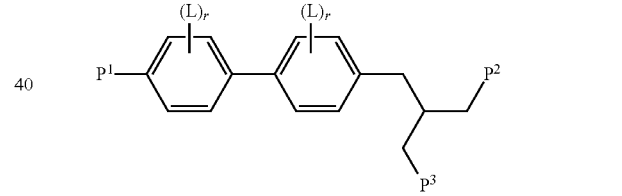
M25
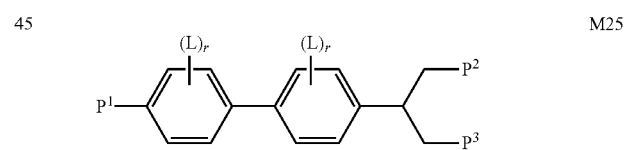
M26
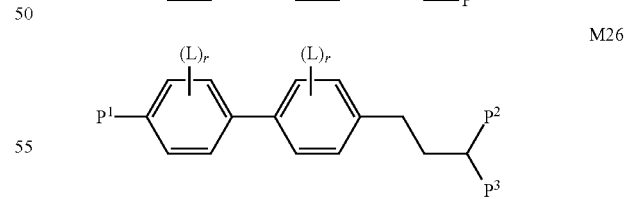
M27
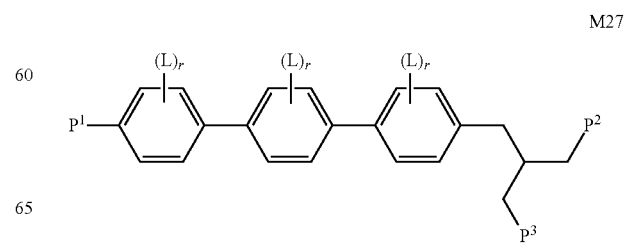

-continued

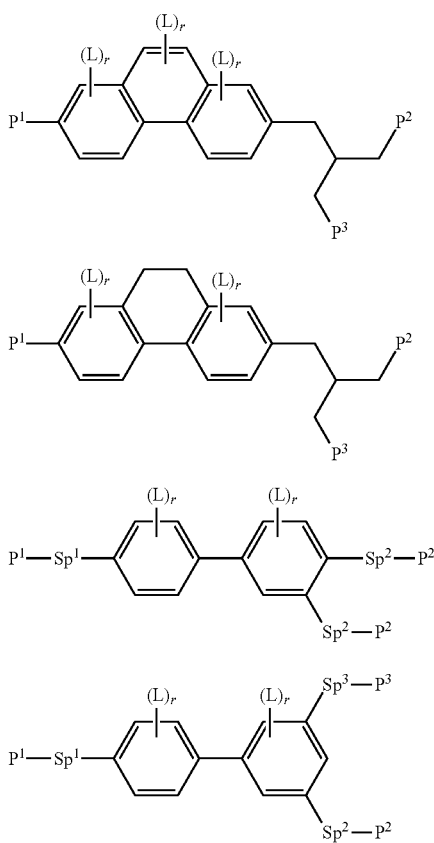

M28

M29

M30

M31 in which the individual radicals, on each occurrence identically or differently, and each, independently of one another, have the following meaning:

$P^1$, $P^2$, $P^3$ are a vinyloxy, acrylate, methacrylate, fluoroacrylate, chloroacrylate, oxetane or epoxy group, $Sp^1$, $Sp^2$, $Sp^3$ are a single bond or a spacer group where, in addition, one or more of the radicals $P^1$-$Sp^1$-, $P^1$-$Sp^2$- and $P^3$-$Sp^3$- may also denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ is H, F, Cl, CN or straight-chain or branched alkyl having 1 to 25 C atoms, in which, in addition, one or more non-adjacent CH$_2$ groups may each be replaced, independently of one another, by —C(R$^0$)═C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ H or alkyl having 1 to 12 C atoms, $R^y$ and $R^z$ H, F, CH$_3$ or CF$_3$, $X^1$, $X^2$, $X^3$ —CO—O—, —O—CO— or a single bond, $Z^1$ —O—, —CO—, —C(R$^y$R$^z$)— or —CF$_2$CF$_2$—, $Z^2$, $Z^3$ —CO—O—, —CO—, —CH$_2$O—, —OCH$_2$—, —CF$_2$O—, —OCF$_2$— or —(CH$_2$)$_n$—, where n is 2, 3 or 4, L F, Cl, CN or straight-chain or branched, optionally mono- or poly-fluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, r 0, 1, 2, 3 or 4, s 0, 1, 2 or 3, t 0, 1 or 2, x 0 or 1.

7. The liquid crystalline medium according to claim 6, wherein the polymerizable compounds of formula I are of the formulae M2, M13, M17, M22, M23, M24 or M30.

8. The liquid crystalline medium according to claim 1, wherein the component B) additionally comprises one or more compounds of formulae AN or AY which are different from formula A:

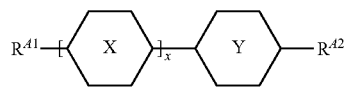

AN

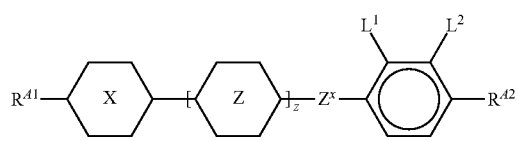

AY in which the individual radicals, on each occurrence identically or differently, and each, independently of one another, have the following meaning:

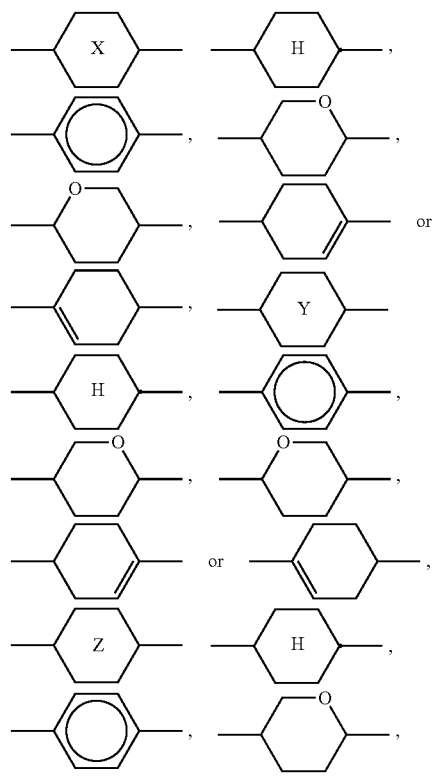

-continued

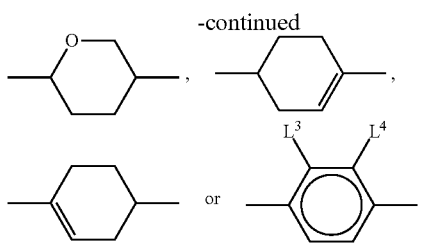

$R^{A1}$ is alkenyl having 2 to 9 C atoms or, if at least one of the rings X, Y and Z denotes cyclohexenyl, also can have one of the meanings of $R^{A2}$, $R^{A2}$ is alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^x$ is —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$—, or a single bond, $L^{1-4}$ is H, F, Cl, $OCF_3$, $CF_3$, $CH_3$, $CH_2F$ or $CHF_2H$, x is 1 or 2, and z is 0 or 1.

9. The liquid crystalline medium according to claim 1, wherein the component B) additionally comprises one or more compounds of the formulae CY or PY:

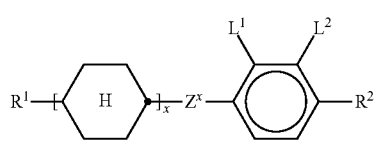  CY

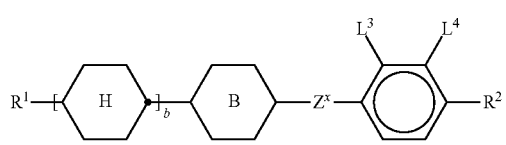  PY in which the individual radicals have the following meanings:

a denotes 1 or 2,
b denotes 0 or 1,

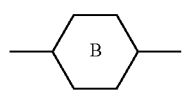

denotes

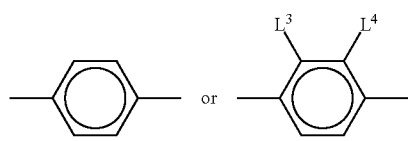

$R^1$ and $R^2$ each, independently of one another, denote alkyl having 1 to 12 C atoms, where, in addition, one or two non-adjacent $CH_2$ groups may be replaced by —O—, —CH=CH—, —CO—, —O—CO— or —CO—O— in such a way that O atoms are not linked directly to one another, $Z^x$ denotes —CH=CH—, —$CH_2O$—, —$OCH_2$—, —$CF_2O$—, —$OCF_2$—, —O—, —$CH_2$—, —$CH_2CH_2$— or a single bond, $L^{1-4}$ each, independently of one another, denote F, Cl, $OCF_3$, $CF_3$, $CH_3$, $CH_2F$, $CHF_2$.

10. The liquid crystalline medium according to claim 1, wherein component B) additionally comprises one or more compounds of formulae ZK or DK:

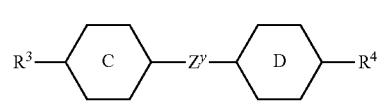  ZK

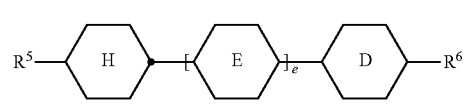  DK in which the individual radicals on each occurrence, identically or differently, have the following meanings:

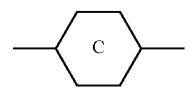

denotes

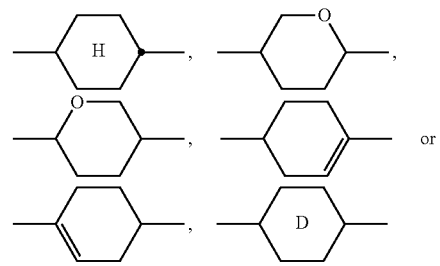

denotes

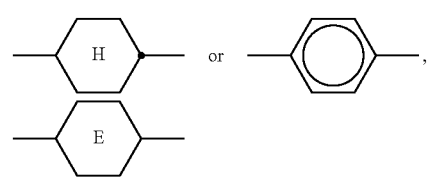

denotes

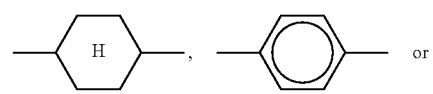

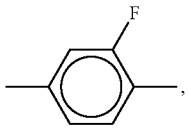

and

R³ and R⁴ each, independently of one another, denote alkyl having 1 to 12 C atoms, in which, in addition, one or two non-adjacent CH₂ groups may be replaced by —O—, —CH=CH—, —CO—, —O—CO— or —CO—O— in such a way that O atoms are not linked directly to one another, $Z^y$ denotes —CH₂CH₂—, —CH=CH—, —CF₂O—, —OCF₂—, —CH₂O—, —OCH₂—, —COO—, —OCO—, —C₂F₄—, —CF=CF— or a single bond, R⁵ and R⁶ each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, and e denotes 1 or 2.

11. The liquid crystalline medium according to claim 1, wherein component B) additionally comprises one or more compounds of formula PY2:

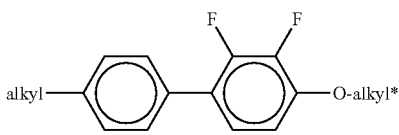

in which alkyl and alkyl* each, independently of one another, denote a straight-chain alkyl radical having 1-6 C atoms.

12. The liquid crystalline medium according claim 1, wherein component B) additionally comprises one or more compounds of formula BF1:

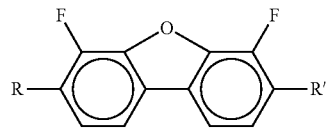

in which R and R' each, independently of one another, denote a straight-chain alkyl or alkoxy radical having 1-7 C atoms.

13. The liquid crystalline medium according to claim 1, wherein the polymerizable compounds are polymerized.

14. An liquid crystalline display comprising a liquid crystalline medium as defined in claim 1.

15. The liquid crystalline display of claim 14, which is a PSA display.

16. The liquid crystalline display of claim 15, which is a PS-VA, PS-IPS, PS-FFS or PS-UB-FFS display.

17. The liquid crystalline display of claim 15, comprising two substrates, at least one which is transparent to light, an electrode provided on each substrate or two electrodes provided on only one of the substrates, and located between the substrates a layer of the liquid crystalline medium wherein the polymerizable compounds are polymerized between the substrates of the display.

18. A process for the production of a liquid crystalline display according to claim 17, comprising providing the liquid crystalline medium between the substrates of the display, and polymerizing the polymerizable compounds.

19. A process of preparing an LC medium according to claim 1, comprising mixing one or more compounds of formula A or an LC component B), with one or more of the polymerizable compounds and optionally with further liquid crystalline compounds and/or additives.

20. The liquid crystalline medium of claim 2, wherein component B) comprises from 0.01 to 1% of compounds of formula A1.

* * * * *